United States Patent
Macpherson et al.

(10) Patent No.: US 12,510,695 B2
(45) Date of Patent: Dec. 30, 2025

(54) OPTICAL DEVICES COMPRISING MICROLENSES AND LASER-FABRICATED PATTERNS OR STRUCTURES, THEIR MANUFACTURE AND USE

(71) Applicants: Bank of Canada, Ottawa (CA); The Governing Council of the University of Toronto, Toronto (CA)

(72) Inventors: Charles Douglas Macpherson, Santa Barbara, CA (US); Badr Omrane, Ottawa (CA); Sean Magnus Malmberg, Ottawa (CA); Peter Herman, Toronto (CA); Stephen Paulchi Ho, Richmond Hill (CA); Ehsan Alimohammadian, Toronto (CA)

(73) Assignees: Bank of Canada, Ottawa (CA); The Governing Council of the University of Toronto, Toronto (CA)

( * ) Notice: Subject to any disclaimer, the term of this patent is extended or adjusted under 35 U.S.C. 154(b) by 207 days.

(21) Appl. No.: 18/267,572

(22) PCT Filed: Dec. 16, 2021

(86) PCT No.: PCT/CA2021/051817
§ 371 (c)(1),
(2) Date: Jun. 15, 2023

(87) PCT Pub. No.: WO2022/126270
PCT Pub. Date: Jun. 23, 2022

(65) Prior Publication Data
US 2024/0168202 A1  May 23, 2024

Related U.S. Application Data

(60) Provisional application No. 63/126,741, filed on Dec. 17, 2020.

(51) Int. Cl.
*G02B 3/00* (2006.01)
*B42D 25/328* (2014.01)
(Continued)

(52) U.S. Cl.
CPC ......... *G02B 3/0056* (2013.01); *B42D 25/328* (2014.10); *B42D 25/351* (2014.10);
(Continued)

(58) Field of Classification Search
CPC .. G02B 3/0056; G02B 5/1814; G02B 5/1857; B42D 25/328; B42D 25/351; B42D 25/41
(Continued)

(56) References Cited

U.S. PATENT DOCUMENTS

2010/0194091 A1   8/2010  Heim et al.
2022/0258523 A1*  8/2022  Macpherson .......... B23K 26/40
2025/0147300 A1*  5/2025  Brassard ............. B42D 25/342

FOREIGN PATENT DOCUMENTS

WO   2006125224 A2   11/2006

* cited by examiner

*Primary Examiner* — Daniel A Hess
(74) *Attorney, Agent, or Firm* — Banner & Witcoff, Ltd.

(57) ABSTRACT

Disclosed are optical devices suitable as security devices for document authentication, which comprise at least one array of patterns such as laser-fabricated patterns, or other structures, optionally formed for example from elongate laser-modified tracks extending within a document substrate. The patterns are combined with at least one array of microlenses to cause certain optical effects. Also disclosed are the use of such devices for document authentication, and methods for their production.

22 Claims, 35 Drawing Sheets

PET with filament grating arrays       Micro-lens array

(51) Int. Cl.
*B42D 25/351* (2014.01)
*B42D 25/41* (2014.01)
*G02B 5/18* (2006.01)

(52) U.S. Cl.
CPC ........... *B42D 25/41* (2014.10); *G02B 5/1814* (2013.01); *G02B 5/1857* (2013.01)

(58) Field of Classification Search
USPC ........................................................ 359/558
See application file for complete search history.

PET with filament grating arrays

Micro-lens array

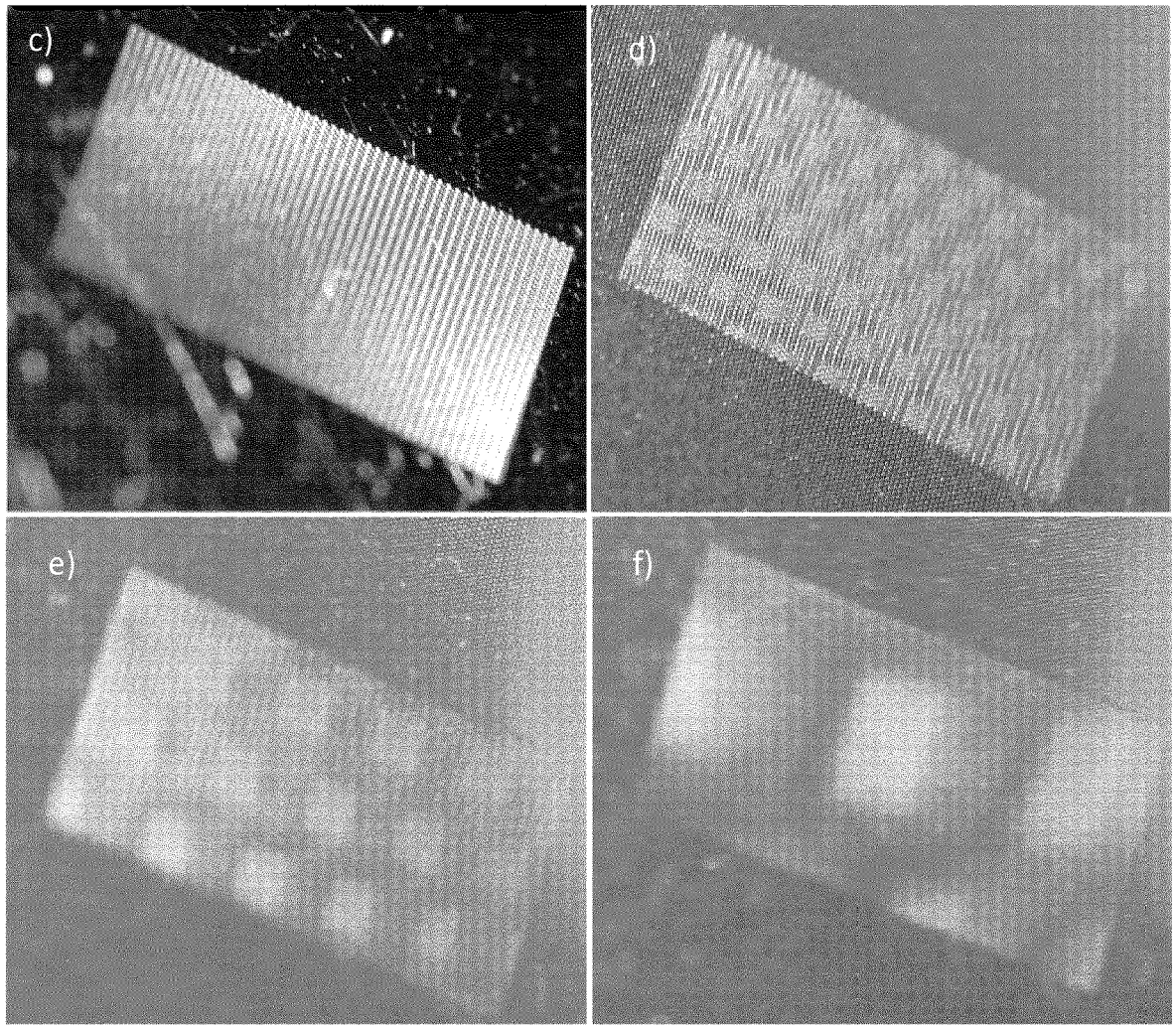
Fig. 13c-f

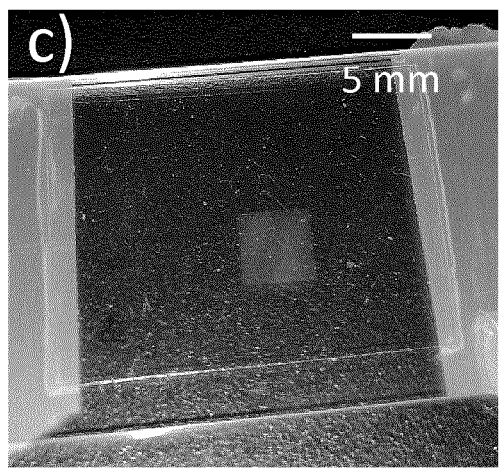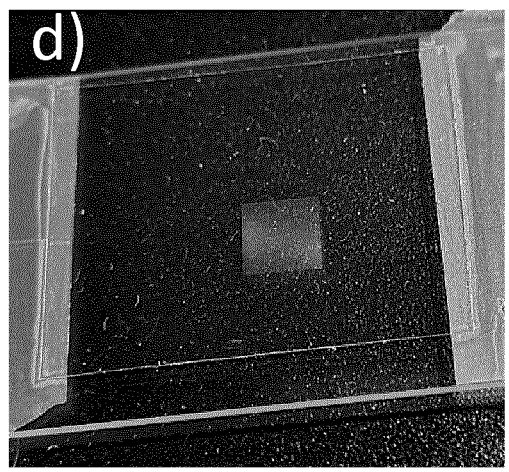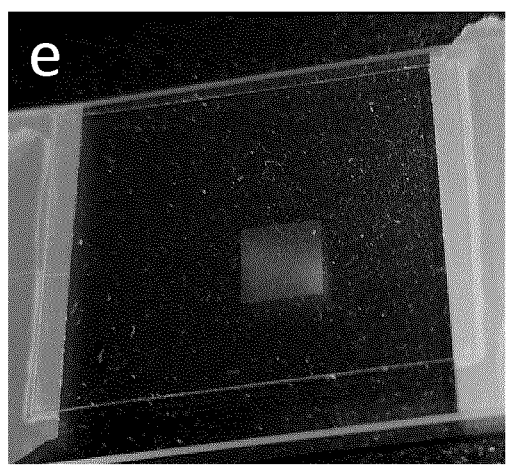
Fig. 15c-e

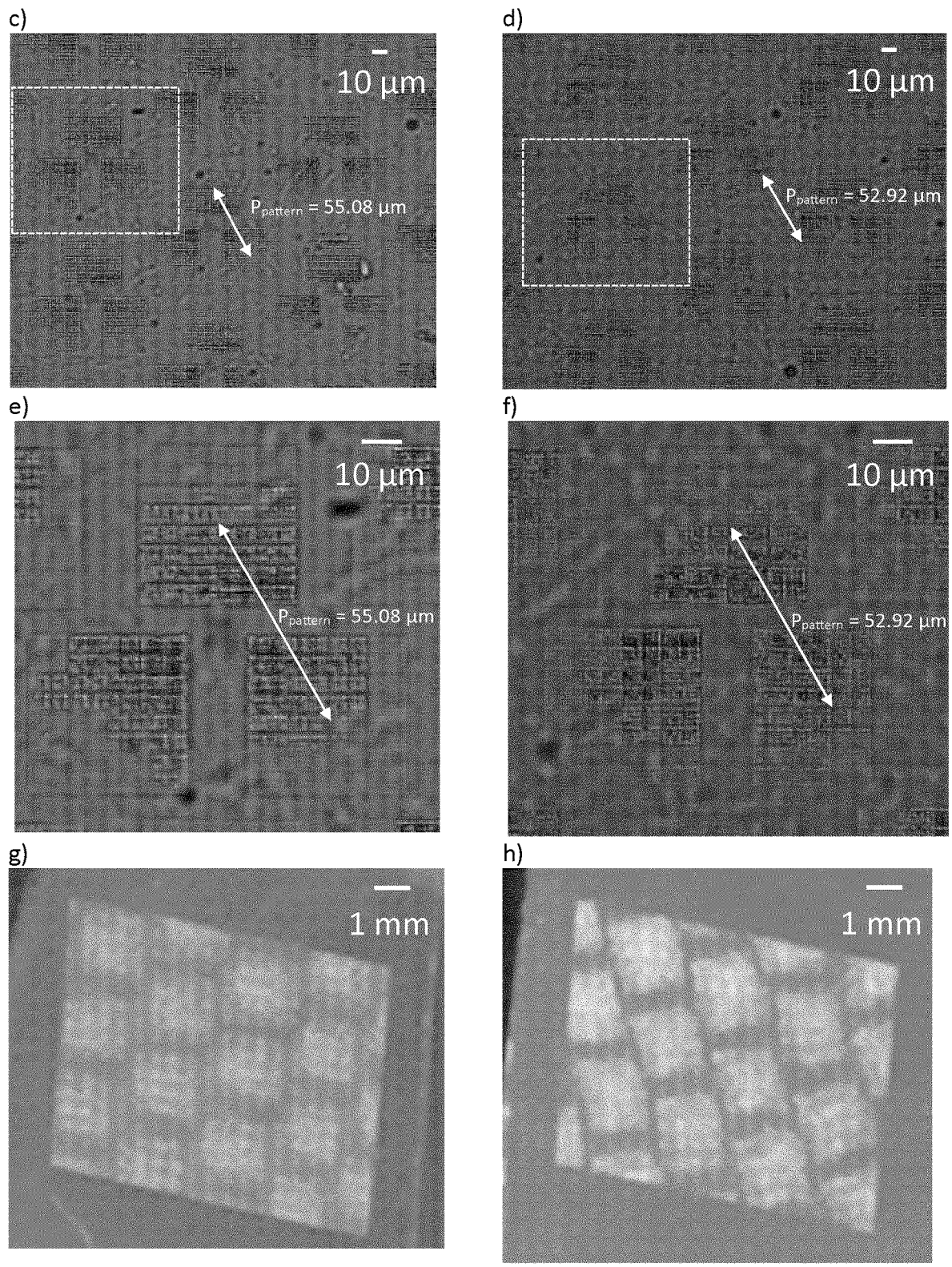
Fig. 16c-h i) Imaged at z = ~+3.5 mm
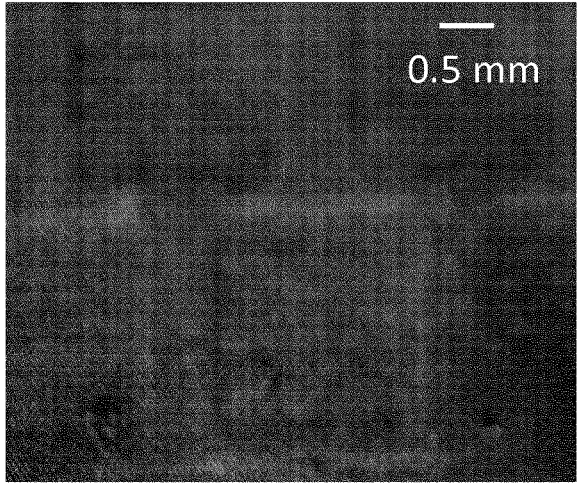
j) Imaged at z = ~+3.5 mm
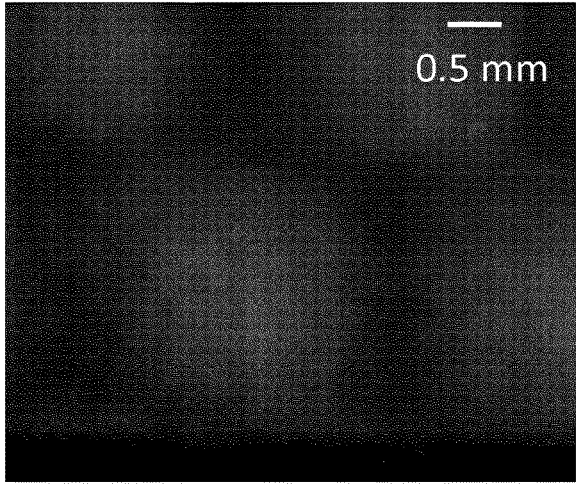
k) Imaged at z = 0 mm
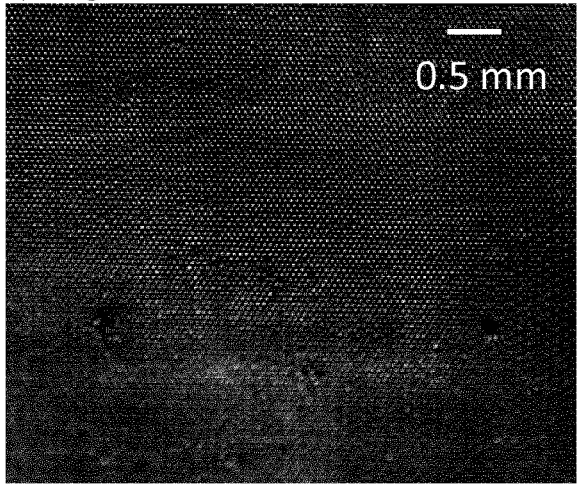
l) Imaged at z = 0 mm
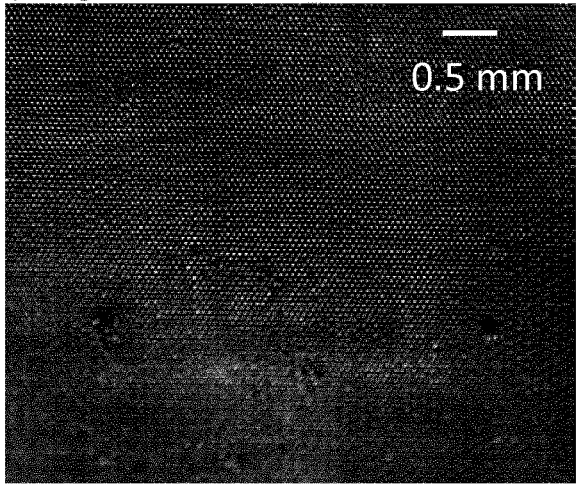
m) Imaged at z = ~-3.5 mm
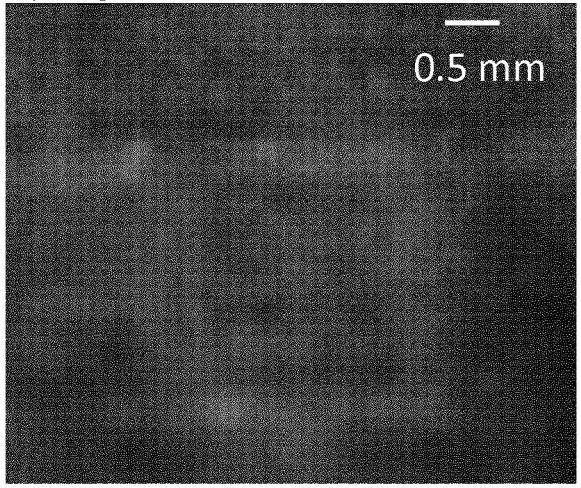
n) Imaged at z = ~-3.5 mm
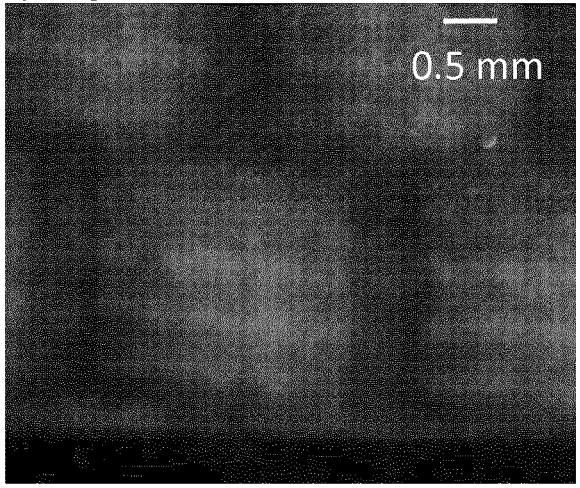
Fig. 16i-n a) Reflection
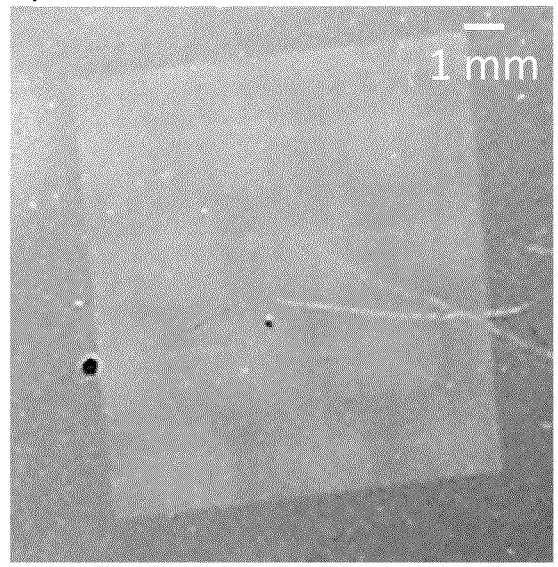
b) Transmission
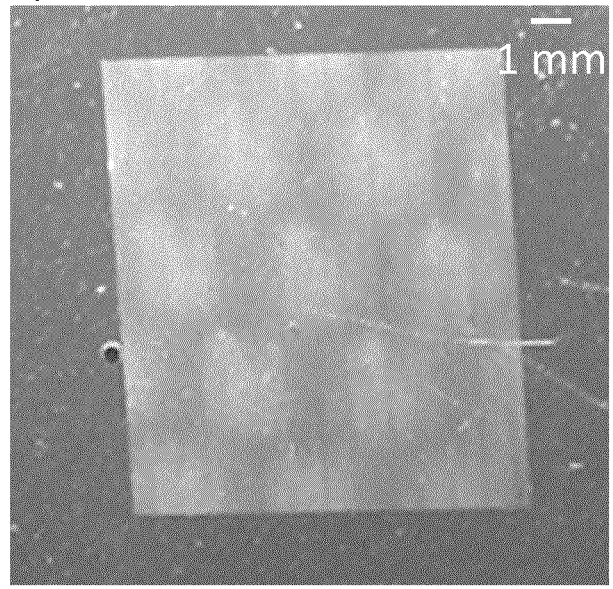
Fig. 17a-b a) $\theta_i = 0°; \theta_o = {\sim}26°; \Phi_i = \Phi_o = 0°$
white background;
dark squares

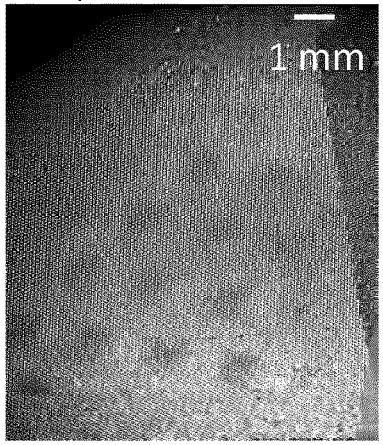

b) $\theta_i = {\sim}15°; \theta_o = {\sim}26°; \Phi_i = \Phi_o = 0°$
dark background;
white squares

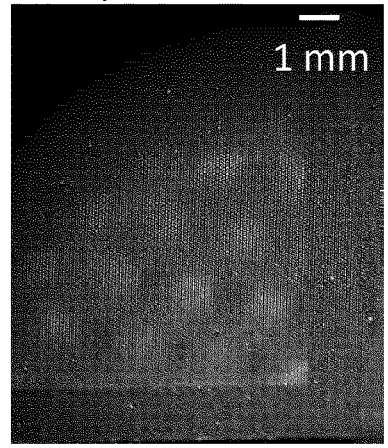

c) $\theta_i = {\sim}20°; \theta_o = {\sim}26°; \Phi_i = \Phi_o = 0°$
green background;
partially white squares

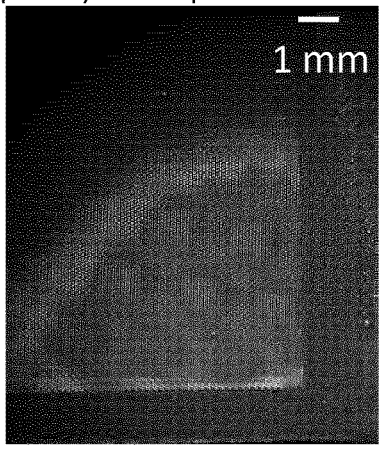

d) $\theta_i = {\sim}26°; \theta_o = {\sim}26°; \Phi_i = \Phi_o = 0°$
yellow background;
partially white squares

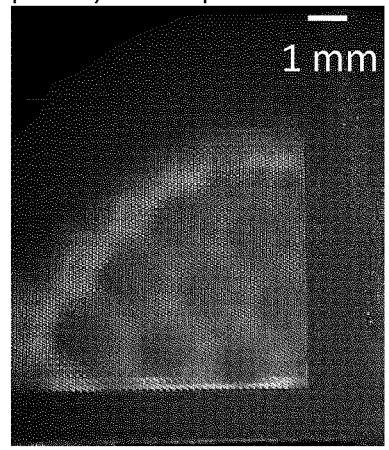

e) $\theta_i = {\sim}30°; \theta_o = {\sim}26°; \Phi_i = \Phi_o = 0°$
orange red background;
partially white squares

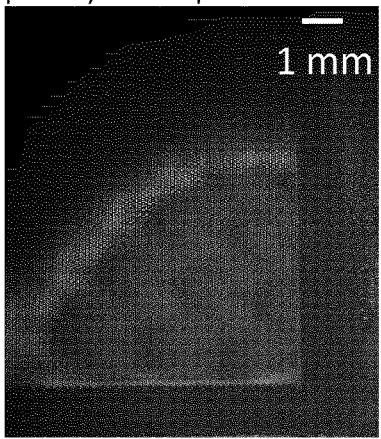

f) $\theta_i = {\sim}35°; \theta_o = {\sim}26°; \Phi_i = \Phi_o = 0°$
deep red background;
partially white squares

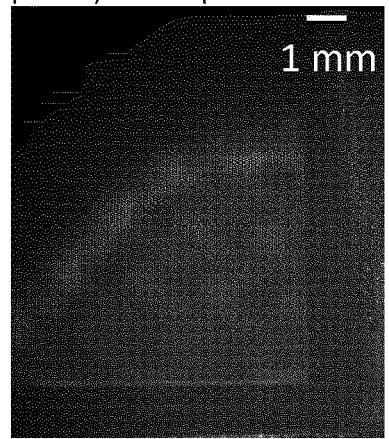

Fig. 18a-f a) Patterns at z = + 25 μm
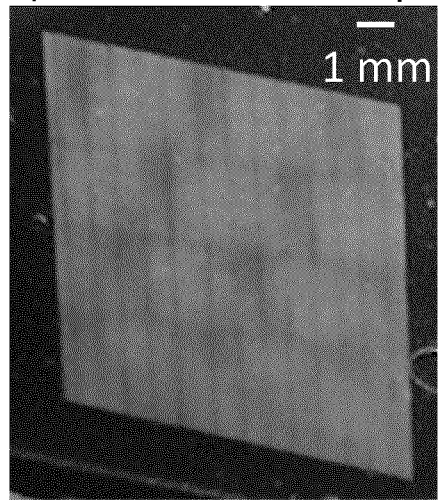
b) Patterns at z = 0 μm
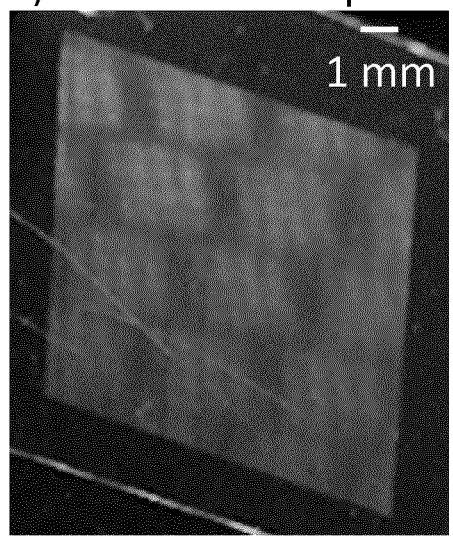
c) Patterns at z = -75 μm
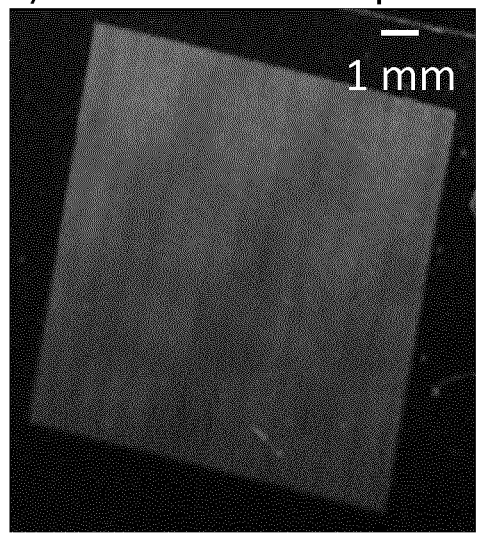
Fig. 19a-c

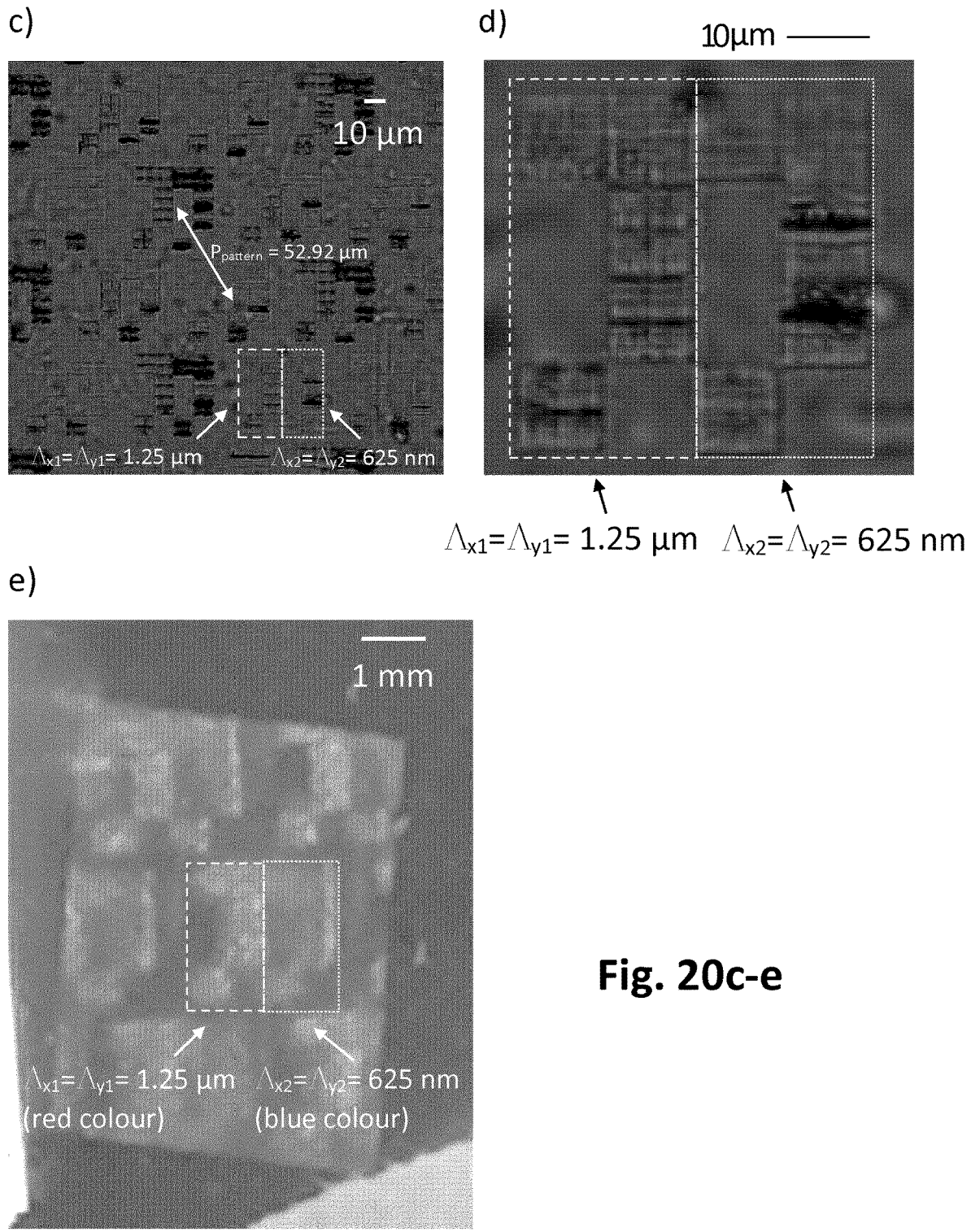
Fig. 20c-e f)
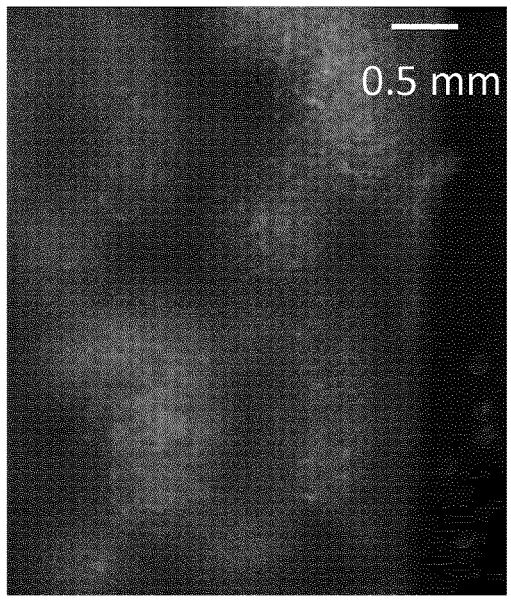
g)
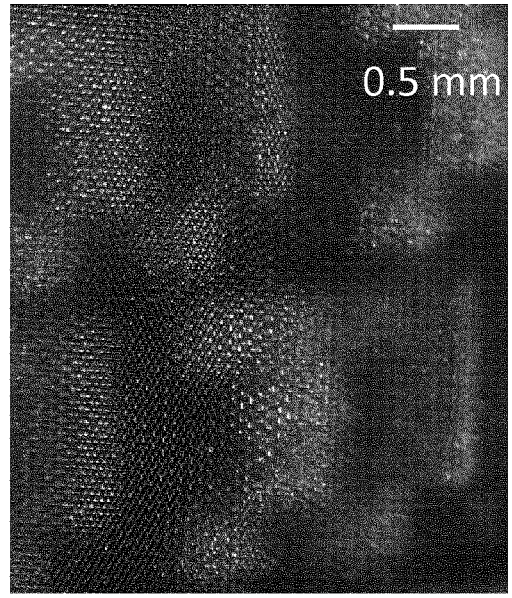
h)
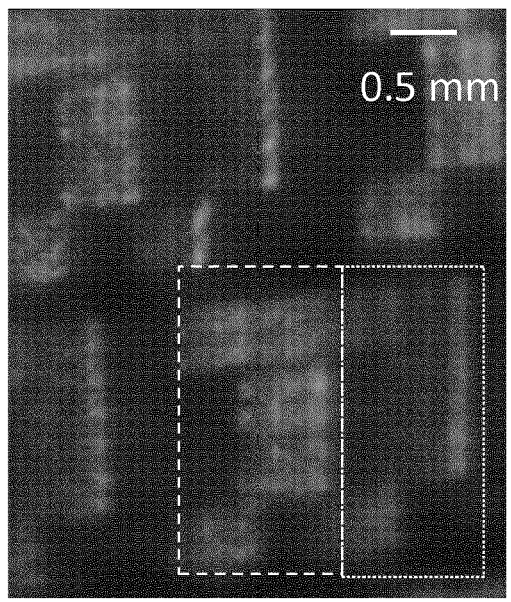
$\Lambda_{x1} = \Lambda_{y1} = 1.25$ μm   $\Lambda_{x2} = \Lambda_{y2} = 625$ nm
(red colour)   (blue colour)
Fig. 20f-h

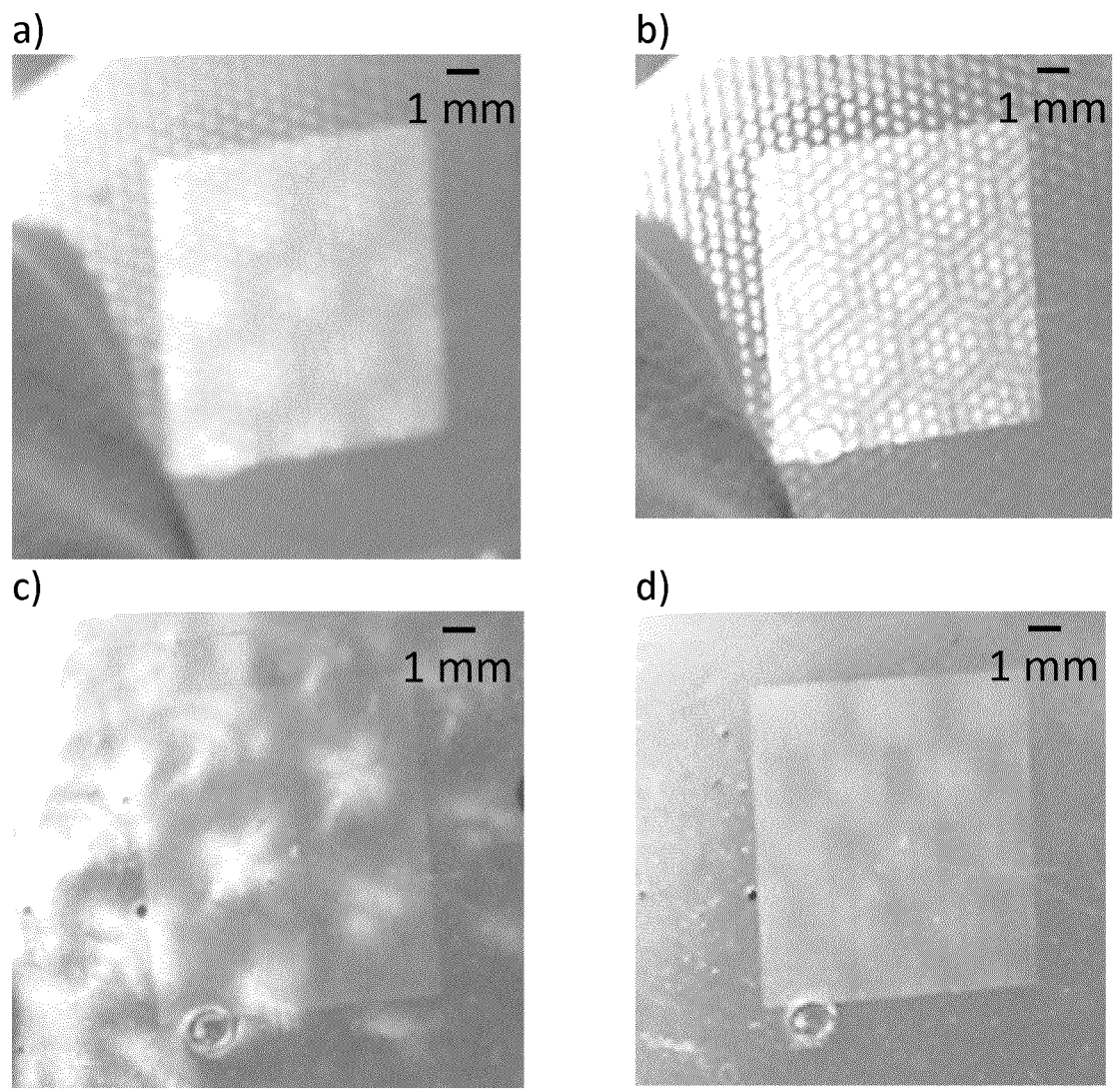
Fig. 21a-d a) Pattern without Microlens Array
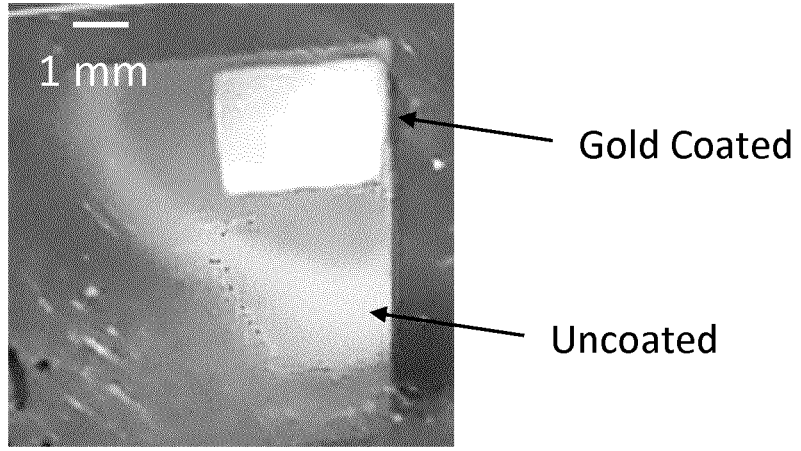
b) Pattern with Microlens Array in Transmission Mode
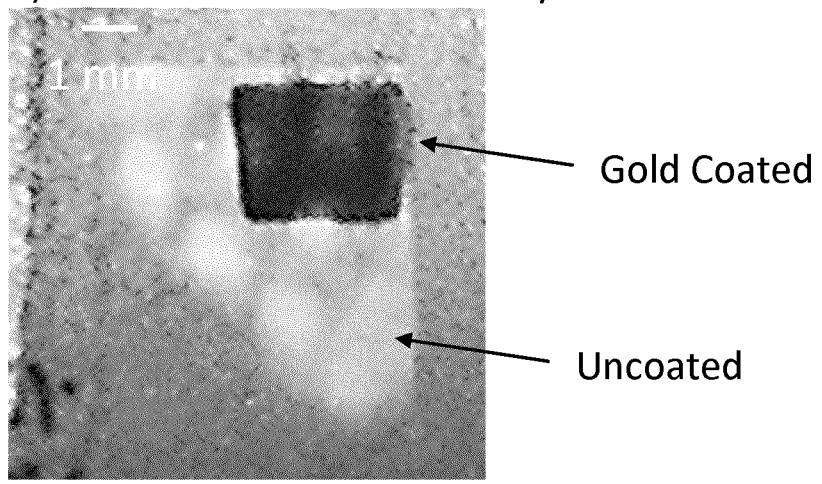
c) Pattern with Microlens Array in Reflection Mode
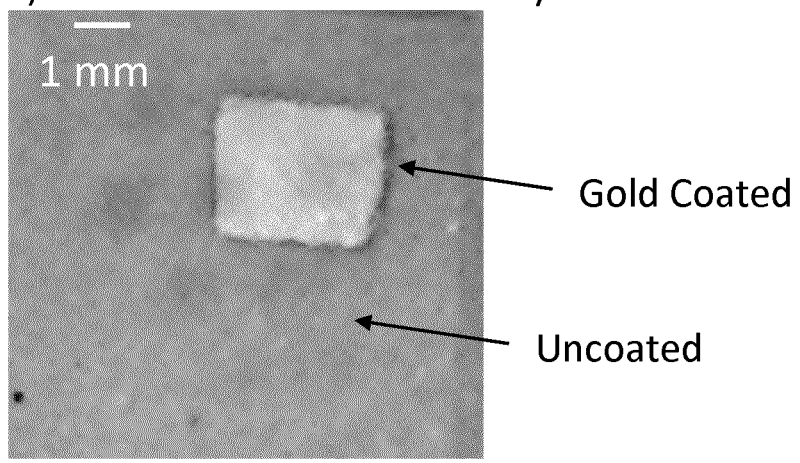
Fig. 23a-c

OPTICAL DEVICES COMPRISING MICROLENSES AND LASER-FABRICATED PATTERNS OR STRUCTURES, THEIR MANUFACTURE AND USE

RELATED APPLICATIONS

This application is a National Stage Application under 35 U.S.C. 371 of PCT application PCT/CA2021/051817 designating the United States and filed Dec. 16, 2021; which claims the benefit of U.S. Application No. 63/126,741 and filed Dec. 17, 2020, each of which are hereby incorporated by reference in their entireties.

FIELD OF THE INVENTION

The present invention relates to the field of optical devices, particularly flexible optical devices comprising substrates such as polymer substrates that may be used, for example, as security features of documents and bank notes for document authentication.

BACKGROUND

Documents of importance or high value are susceptible to counterfeit. Such documents often include specific features or devices that are difficult for counterfeiters to replicate. Typically, such devices are applied or adhered to the substrate of the document. Generally, they must be very thin so that they do not protrude from the substrate, and flexible so that they can bend and flex with the substrate during normal use. Examples of such devices include holograms, thin films, and micro-optical features.

In the case of micro-optical features, such devices are typically known to comprise two-dimensional arrays of convex microlenses in association with an array of printed or etched images, wherein a design or offset nature of the images relative to the microlenses may give rise to moiré effects, including depth perception, floating effects, sinking effects, or motion of the perceived images, derived from combined optical output and observation of the microlenses.

There are risks associated with the application or adherence of such features or optical devices upon document substrates. With such devices, the security and integrity of the document is dependent upon maintaining proper adherence of the device to the document substrate and an overall device thickness that is within the range of downstream print processes. Adhesives may degrade over time or during document use and fatigue resulting in unintentional partial or total detachment of the device, thus compromising the security value of the document. Even if the adhesive remains intact, surface-applied security features may be more susceptible to wearing or abrasive forces experienced during the lifetime of the document. In some instances, the device is integrated into a bank note through soft embossing to alleviate the use of adhesive. This approach requires changes to the polymer substrate chemistry which make it incompatible with most of the applied security offerings from the industry.

Increasingly, polymers and plastics are used as substrates for security documents. For example, central banks often look to use such plastic or polymer substrates for new generations of bank notes. However, polymer and plastic substrates are known in the art to present certain limitations for security feature integration. With the notable exception of clear polymer windows, the security features of polymer bank notes are typically more confined to those than can be adhered to the polymer surface, or to those that can be printed or embossed upon the polymer surface.

More recent efforts have included modifying the polymer substrate directly, to generate certain optical effects. For example, international patent publications WO2019/077316 and WO2019/077317, both published Apr. 25, 2019, disclose limited laser marking of polymer substrates.

There remains a need in the art for improved security features and devices for application to or integration into a document substrate. In particular, there is a need for security features and devices better suited to polymer and plastic substrates, which provide optical effects that are difficult to deconstruct or replicate.

SUMMARY

It is one object, at least for selected embodiments, to provide an optical device suitable as a security device upon or integral with a polymer substrate material. Selected embodiments provide such security devices.

It is another object, at least in selected embodiments, to provide an optical device for use in or upon polymer and plastic substrates, which provides optical effects that are difficult to deconstruct or replicate.

It is another object, at least in selected embodiments, to provide a method to check whether an item or document is a legitimate or counterfeit version. Selected embodiments provide such methods.

Selected embodiments provide an optical device comprising:
  a periodic array of microlenses; and
  a periodic array of distinct patterns, wherein the patterns are the same or different from one another, and each pattern comprises a structure selected from: a periodic array of continuous or non-continuous laser-modified tracks in a substrate material, such as a polymer substrate material, a diffraction grating, and a photonic crystal;
  wherein the patterns, together with the microlenses, collectively provide an optical effect.

The following embodiments are exemplary only.

Embodiment 1: An optical device comprising:
  a periodic array of microlenses; and
  a periodic array of distinct laser-fabricated patterns, wherein the patterns are the same or different from one another, and each pattern comprises a periodic array of continuous or non-continuous laser-modified tracks in a substrate material, such as a polymer substrate material;
  wherein the patterns, together with the microlenses, collectively provide an optical effect.

Embodiment 2: the optical device of embodiment 1, wherein the array of microlenses and the array of laser-fabricated patterns overlie one another such that the position of the microlenses relative to the laser-fabricated patterns contributes to the optical effect.

Embodiment 3: the optical device of embodiment 1 or 2, wherein the optical effect comprises one or more of:
  a moiré effect;
  a float effect;
  a sink effect;
  a depth effect;
  a motion effect;
  a colour change effect; and
  an emission angle effect;
  upon the laser-fabricated patterns.

Embodiment 4: the optical device of embodiment 1, wherein the device comprises a polymer sheet, and the microlenses are individually selected from:
- refractive microlenses each comprising a polymer or cross-polymerized UV resin protrusion extending from the polymer substrate on one side thereof, or applied to one side thereof; and
- refractive microlenses each comprising a refractive Fresnel lens comprising a polymer or cross-polymerized UV resin protrusion extending from the polymer substrate on one side thereof, or applied to one side thereof,
- wherein the microlenses collectively focus light incident upon said one side into a focal plane between a surface of the lens and a surface of the polymer material opposite the microlenses.

Embodiment 5: the optical device of embodiment 1, wherein the device comprises a polymer sheet, and the microlenses comprises diffractive microlenses with lens-like properties (which in some embodiments are optionally akin to Fresnel microlenses) formed within a polymer material of the polymer sheet.

Embodiment 6: the optical device of embodiment 5, where each diffractive optic such as a Fresnel lens is laser-fabricated in the polymer material from one or more two-dimensional arrays of laser-modified tracks within the polymer, optionally with concentric rings of polymer substrate comprising laser-modified tracks, with adjacent concentric rings having different effective refraction indices or properties relative to one another, thereby to change a refraction index or diffractive angle or other property of portions of the polymer material in a diffractive pattern to form the microlens.

Embodiment 7: the optical device of any one of embodiments 1 to 6, wherein independently each laser-fabricated pattern comprises laser-modified tracks within the polymer material that, relative to the array of microlenses, extend in one or more of the following ways:
- across, crossing through or spanning the focal plane of the microlenses;
- between the focal plane and the microlenses;
- within the microlenses, optionally extending to a surface thereof; or on a side of the focal plane opposite the microlenses, optionally extending to a surface of the device opposite the microlenses.

Embodiment 8: the optical device of embodiment 1, wherein at least one laser-fabricated pattern comprises multiple laser-fabricated sub-patterns each with distinct or slightly varying diffractive properties relative to one another.

Embodiment 9: the optical device of embodiment 8, wherein independently each laser-fabricated sub-pattern comprises laser-modified tracks within the polymer material that, relative to the array of microlenses, extend in one or more of the following ways:
- across, crossing through or spanning the focal plane of the microlenses;
- between the focal plane and the microlenses;
- within the microlenses, optionally extending to a surface thereof; or on a side of the focal plane opposite the microlenses, optionally extending to a surface of the device opposite the microlenses.

Embodiment 10: the optical device of any one of embodiments 1 to 9, further comprising a metalized surface layer on one or both of:
- a side of the device that comprises, or is adjacent, the two-dimensional periodic array of microlenses; and
- a side of the device opposite the side that comprises, or is adjacent, the two-dimensional periodic array of microlenses.

Embodiment 11: the optical device of embodiment 10, wherein one or both of the metalized surface layers is/are laser-patterned, for example to modify opacity/transparency of the device and/or render an optical visual pattern.

Embodiment 12: the optical device of embodiment 1, wherein the substrate material has a general refractive index n, each laser-fabricated pattern comprising at least one ordered two-dimensional array of discrete laser-modified tracks in the substrate material generated by a beam-shaped laser with laser light distributed along and/or about a laser propagation path extending within the substrate material,
- each laser-modified track comprising a continuous or discontinuous elongate volume of modified polymer material at least 4 times longer than its narrowest width extending at least partially across a thickness of the substrate sheet, that comprises a modified form of the polymer material, that has a refractive index that is different to the general refractive index n of the polymer material from which each laser-modified track originated from, wherein for each two-dimensional ordered array the laser-modified tracks collectively diffract light impinging on the optical device;
- and wherein optionally the modified substrate material comprises displaced polymer chains to create an elongated void, such that selected laser-modified tracks each comprise one or more voids extending generally non-parallel to the surfaces of the polymer material, thereby to cause each of said laser-modified tracks to have a different refractive index relative to the general refractive index n for the unmodified polymer material.

Embodiment 13: the optical device of embodiment 12, where the microlenses comprise diffractive microlenses formed in the polymer sheet, each diffractive microlens comprising at least one further ordered two-dimensional array of discrete continuous or non-continuous laser-modified tracks in the polymer material generated by a beam-shaped laser with laser light distributed along and/or about a laser propagation path extending within the polymer material, with
- each laser-modified track comprising an elongate volume of modified polymer material at least 4 times longer than its narrowest width extending at least partially across a thickness of the polymer material, that comprises a modified form of the polymer material, that has a refractive index that is different to the general refractive index n of the polymer material from which each laser-modified track originated from, wherein the two-dimensional ordered array or arrays of each diffractive microlens collectively diffract incident light into a focal plane;
- and wherein optionally the modified polymer material comprises displaced polymer chains to create periodic voids, such that selected laser-modified tracks each comprise one or more voids extending generally non-parallel to the surfaces of the polymer material, thereby to cause each of said tracks to have a different refractive index relative to the general refractive index n for the unmodified polymer material.

Embodiment 14: the optical device of embodiment 13, wherein the laser-modified tracks of the laser-fabricated patterns, and the laser-modified tracks of the diffractive microlenses, are formed concurrently in the polymer material by the beam-shaped laser.

Embodiment 15: the optical device of any one of embodiments 12 to 14, wherein for each laser-modified track the elongate volume of modified substrate material is at least 5 times, preferably at least 8 times, preferably at least 10 times, preferably at least 15 times, more preferably at least 20 times, longer than its narrowest width, and optionally the laser propagation path within the substrate sheet is linear, curved, or helical.

Embodiment 16: the optical device of any one of embodiments 1 to 15, wherein each of the laser-modified tracks are generated by a femtolaser, such as a femtolaser with a pulse duration in the range of 0.1 fs to 100 ps for each laser pulse, with beam-shaping of the femtolaser beam prior to or upon its interaction with the substrate.

Embodiment 17: the optical device of embodiment 1, having an average thickness of 10-3000 µm, preferably of 50-150 µm.

Embodiment 18: the optical device of embodiment 1, wherein the polymer material comprises polycarbonate, BOPP, BOPET, PEN, PP, PVDF or related co-polymers such as PVDF-TrFE, or Nylon-55 or 66 or other derivatives.

Embodiment 19: the optical device of any one of embodiments 12 to 15, wherein each elongate volume of modified substrate material of each laser-modified track is from 1-5000 nm in width on average, extending partially or entirely through the polymer material.

Embodiment 20: the optical device of any one of embodiments 1 to 19, comprising at least one array of laser-modified tracks that are separated from one another by a periodicity of from 0.01 to 1000 µm, preferably 0.05-10 µm, more preferably 0.1-5 µm, on average by the material of the unmodified polymer.

Embodiment 21: the optical device of any one of embodiments 1 to 20, wherein the laser-fabricated patterns, or if present the laser-fabricated sub-patterns, comprise arrays of laser-modified tracks in the polymer material that have different periodicities, lengths, shapes or orientations compared to the laser-modified tracks of at least one other laser-fabricated pattern or sub-pattern, such that the optical diffractive emissions from different laser-fabricated patterns or sub-patterns differ from one another, when the same or equivalent incident light concurrently impinges thereupon.

Embodiment 22: the optical device of embodiment 1, wherein at least one array of laser-modified tracks comprises laser-modified tracks that are one or more of:
- continuous within the polymer material;
- discontinuous within the polymer material;
- parallel or non-parallel to one another;
- extend perpendicular to the array of microlenses or to a focal plane thereof;
- extend non-perpendicular or oblique to the array of microlenses or to a focal plane thereof; and
- linear, non-linear or helical.

Embodiment 23: the optical device of embodiment 1, comprising laser-fabricated patterns at different depths relative to one another and the array of microlenses.

Embodiment 24: the optical device of embodiment 23, wherein a first array of laser-fabricated patterns at least partially overlies a second array of laser-fabricated patterns in the optical device relative to the array of microlenses, when the optical device is viewed in plane view thereof.

Embodiment 25: the optical device of embodiment 24, wherein the optical diffractive output of one of the first and second arrays is further diffracted by the other of the first and second arrays, when the substrate material is exposed to incident light. In some such examples, three or more arrays may diffract light with select pairs of arrays at different "depths" within the device self-selected by wavelength bands (i.e., red light passing through a densely period diffractive layer designed for short wavelength blue light) to provide differing wavelength effects, for independent layer-by-layer chromaticity control.

Embodiment 26: the optical device of embodiment 24, wherein the optical diffractive output of the first and second arrays, when viewed concurrently, exhibits an interference or diffractive optical effect, such as Littrow configuration or grating layers aligned on Talbot self image planes.

Embodiment 27: the optical device of any one of embodiments 24 to 26, comprising overlapping arrays of laser-fabricated patterns at different depths within the polymer material relative to the microlenses or a focal plane thereof, formed concurrently by a single laser pulse with laser energy distributed along a laser beam longitudinal axis extending through the polymer material focused at said different depths within the substrate sheet.

Embodiment 28: the optical device of any one of embodiments 1 to 27, further comprising one or more additional layers that partially or entirely overlay the substrate material, the one or more additional layers each independently selected from a polymer layer, a reflective layer, a refractive layer, a diffractive filter, a transmissive filter, a protective layer, an overcoat, an adhesion promoter layer, an ink, an optical interference layer and an optical interference stack.

Embodiment 29 provides the optical device of any one of embodiments 1 to 28, further comprising a further periodic array of microlenses on a side of the periodic array of distinct laser-fabricated patterns opposite to the periodic array of microlenses, such that the periodic array of distinct laser-fabricated patterns extends within the device between the periodic array of microlenses and the further periodic array of microlenses, wherein the array of laser-fabricated patterns, together with the further periodic array of microlenses, collectively provide a further optical effect from at least one side of the optical device, and optionally from a side of the optical device nearest the further periodic array of microlenses.

Embodiment 30 provides the optical device of embodiment 29, wherein the optical effect and/or the further optical effect are influenced by both of the period array of microlenses and the further periodic array of microlenses.

Embodiment 31 provides an optical device comprising:
two or more periodic arrays of distinct laser-fabricated patterns, wherein in each periodic array the patterns are the same or different from one another, and each pattern comprises a periodic array of continuous or non-continuous laser-modified tracks in a substrate material, such as a polymer substrate material;
wherein the patterns overlie one another to provide an optical effect.

Embodiment 32 provides the optical device of embodiment 31, wherein the optical effect is a moiré effect.

It should be noted that any of the embodiments relevant to embodiment 1, or other embodiments, may be applied to embodiments 31 and 32. Accordingly, in any embodiment herein described that includes an array of microlenses, the microlenses may optionally, and in the alternative, be substituted by a periodic array of laser fabricated patterns that may or may not exhibit lensing effects.

Embodiment 31 provides a use of the optical device of any one of embodiments 1 to 30 as a security feature of a security document, or as a security document.

Embodiment 32 provides a security document comprising or consisting of, as a security feature, the optical device of any one of embodiments 1 to 30.

Embodiment 33 provides a diffractive lens, optionally simulating a Fresnel lens, comprising a polymer material, with one or more diffractive features in the polymer material, to change a refractive index of at least portions of the polymer material, thereby to form the diffractive lens.

Embodiment 34 provides the diffractive lens of embodiment 33, wherein the diffractive features are the same or different from one another, and each individual feature is selected from a two-dimensional periodic array of continuous or non-continuous laser-modified tracks in the polymer material, a diffraction grating or a photonic crystal.

Embodiment 35 provides the diffractive lens of embodiment 34, wherein the laser-modified tracks are formed in the polymer material by a beam-shaped femtolaser.

Embodiment 36 provides the diffractive lens of embodiment 34 or 35, comprising concentric rings in the polymer material, each containing a two-dimensional array of laser-modified tracks in the polymer material, with adjacent concentric rings having differing refractive indices or diffractive properties from one another caused by differences in a configuration, periodicity, shape, or orientation of the laser-modified tracks.

Embodiment 37: provides a microlens, comprising concentric rings of at least partially transparent substrate material shaped to provide the refractive properties of the Fresnel lens, wherein the substrate material of at least one concentric ring of the substrate material comprises an array of laser-modified tracks as herein described.

Embodiment 38 provides the microlens of embodiment 37, wherein the substrate material of the Fresnel lens comprises a polymer.

Embodiment 39 provides the diffractive lens or microlens of any one of embodiments 33 to 38, in the form of or to simulate a Fresnel lens.

BRIEF DESCRIPTION OF THE DRAWINGS

In FIG. 7, $\theta_o$ and $\phi_o$ define the observation direction in the observation co-ordinate system for transmittance through the diffractive pattern. $\theta_r$ and $\theta_r$ define the observation direction in the observation co-ordinate system for reflectance from the diffractive optic. $\theta_i$ and $\phi_i$ define the illumination direction in the source co-ordinate system. The normal to the sample when $\phi_o=0$, $\phi_i=0$ or $\phi_r=0$ becomes equivalent to $z_o$, $z_i$ or $z_r$, respectively.

FIG. 13c shows an optical image of a hexagonal arrangement of distinct diffractive elements in a PET film, aligned on a periodicity of $P_{pattern}=100$ μm=~102% of $P_{lens}$ according to FIG. 13a, wherein each diffractive element consists of laser-modified tracks formed with a pulse energy of 132 nJ in a periodic array with a period of 1.5 μm extending over a 50-μm-by-50-μm area.

FIGS. 13d, 13e, and 13f are optical images of the laser patterned PET film of diffractive elements (FIG. 13c) when overlaid with an array of micro-lenses having $P_{lens}=$~98 μm pitch, and viewed with changes to the relative offset of diffractive elements to microlenses and with angular changes to the rows of diffractive elements relative to the rows of diffractive optics, to provide moiré magnification and floating optical effects for the arrays of laser-modified tracks.

FIG. 15c, 15d, 15e are optical images recorded with a cellular phone under white LED illumination, captured by diffractive reflection from different substrate angles, of the array of diffractive elements shown in FIG. 15b.

FIGS. 16c and 16d show optical microscope images of a portion of BOPP film modified with multiple pulses (64 exposures) of a femtolaser, generated by the combination of SLM beam splitting (16 spots, FIG. 16a) and galvanometer scanning (FIG. 16b), yielding diffractive optical elements with elemental periodicity of $\Lambda_x=\Lambda_y=1.25$ µm, formed into hexagonal arrays with periodicity $P_{pattern}=55.08$ µm in FIG. 16c and $P_{pattern}=52.92$ µm in FIG. 16d that provide moiré float and moiré sink effects, respectively, when combined with a hexagonal microlens array with periodicity of $P_{lens}=54$ µm. A pulse energy of 7.7 nJ was delivered to each modification spot.

FIGS. 16e and 16f show enlarged optical microscope images of the laser modified BOPP film recorded from the dashed rectangles in FIGS. 16c and 16d, respectively. FIGS. 16g and 16h show camera-captured images of BOPP samples in FIGS. 16c and 16d, respectively, when overlaid with a film of microlens array having periodicity $P_{lens}=54$ µm, with the diffractive optical layer in the BOPP positioned at the focal plane of the lens (z=0) and with illumination in back lighting with a broadband white light source, demonstrating moiré optical effects.

FIGS. 16i and 16j show higher magnification camera images captured with a zoom lens of the combined BOPP and microlens films in FIGS. 16g and 16h, respectively, under similar illumination, with lens imaging positioned in front of the diffractive optical plane at position z=~+3.5 mm; the FIG. 16i image is sharp demonstrating the moiré float effect for $P_{pattern}/P_{lens}=1.02$ while the FIG. 16j image appears blurred and out of focus due to an expected moiré sink condition with $P_{pattern}/P_{lens}=0.98$.

FIGS. 16k and 16l show similar magnified optical images of the BOPP and microlens array as in FIGS. 16i and 16j, respectively, but with the zoom lens imaging positioned at the diffractive optical layer, z=0 mm. Both diffractive element images in FIGS. 16k and 16l are blurry and out of focus due to the expected moiré float and sink effects, respectively.

FIGS. 16m and 16n show similar magnified optical images of the BOPP and microlens array in FIGS. 16i and 16j, respectively, but with the zoom lens imaging positioned at behind the diffractive optical layer at z=~−3.5 mm;

The FIG. 16m image appears blurred and out of focus due to an expected moiré float effect for $P_{pattern}/P_{lens}=1.02$ while the FIG. 16n image appears sharp and in focus due to an expected moiré sink condition with $P_{pattern}/P_{lens}=0.98$.

FIGS. 17a and 17b show camera images recorded in reflection and transmission, respectively, of a broadband white light source illumination of BOPP film of 10 mm by 12 mm area, with diffractive optical elements fabricated by a femtolaser as in FIG. 16a (7.7 nJ energy per spot, $P_{pattern}=55.08$ µm, and $\Lambda_x=\Lambda_y=1.25$ µm) and aligned below a sheet of microlens arrays ($P_{lens}=54$ µm) as in FIG. 16g with the laser-structured diffractive optical layer positioned in the focal plane of the lens (z=0 mm).

FIGS. 18a, 18b, 18c, 18d, 18e, and 18f show images captured with a camera and zoom imaging optics, recording white light transmission through a combination of a microlens sheet of $P_{lens}=98$ µm aligned with laser fabricated patterns in BOPP film, generated with a pulse energy per spot of 5.8 nJ, patterned in arrays with periodicity of $P_{pattern}=100$ µm, and having diffractive element periodicities of $\Lambda_x=\Lambda_y=1.25$ µm. The irradiation and observation angles through the sample were recorded at angles of (a) $\theta_i=0°$ and $\theta_o=$(b) $\theta_i=\sim15°$ and $\theta_o=$(c) $\theta_i=\sim20°$ and $\theta_o=$(d) $\theta_i=\sim26°$ and $\theta_o=\sim26°$, (e) $\theta_i=\sim30°$ and $\theta_o=\sim26°$, and (f) $\theta_i=\sim35°$ and $\theta_o=\sim26°$, with azimuth approximately set at $\phi_i$ and $\phi_o$ at 0°. A moiré magnification effect is complemented with diffractive optical colour filtering and diffractive coupling to film waveguide as noted by a (a) white background with dark squares in the grating zones, (b) dark background with white squares in the grating zones, (c) green background with partially white squares in the grating zones, (d) yellow background with partially white squares in the grating zones, (e) orange-red background with partially white squares in the grating zones, and (f) deep red background with partially white squares in the grating zones.

FIGS. 19a, 19b, and 19c show camera-captured images recorded in transmission of a broadband white light source through a combination of a microlens sheet with hexagonal lens arrays on periodicity $P_{lens}=54$ µm laid over a femtolaser modified BOPP film wherein diffractive optical elements were embedded with $\Lambda_x=\Lambda_y=1.25$ µm periodicity, and formed in hexagonal arrays on periodicity of $P_{pattern}=52.92$ µm, with each element formed with a pulse energy per spot of 7.7 nJ; the diffractive optical layer being positioned at z=+25 µm, z=0 µm, and z=−75 µm, respectively, with respect to the focal plane of the lens. The moiré magnified images show blurry images in FIGS. 19a and 19c, and a sharp image in FIG. 19b, yielding a moiré sink effect.

Figure 20A:
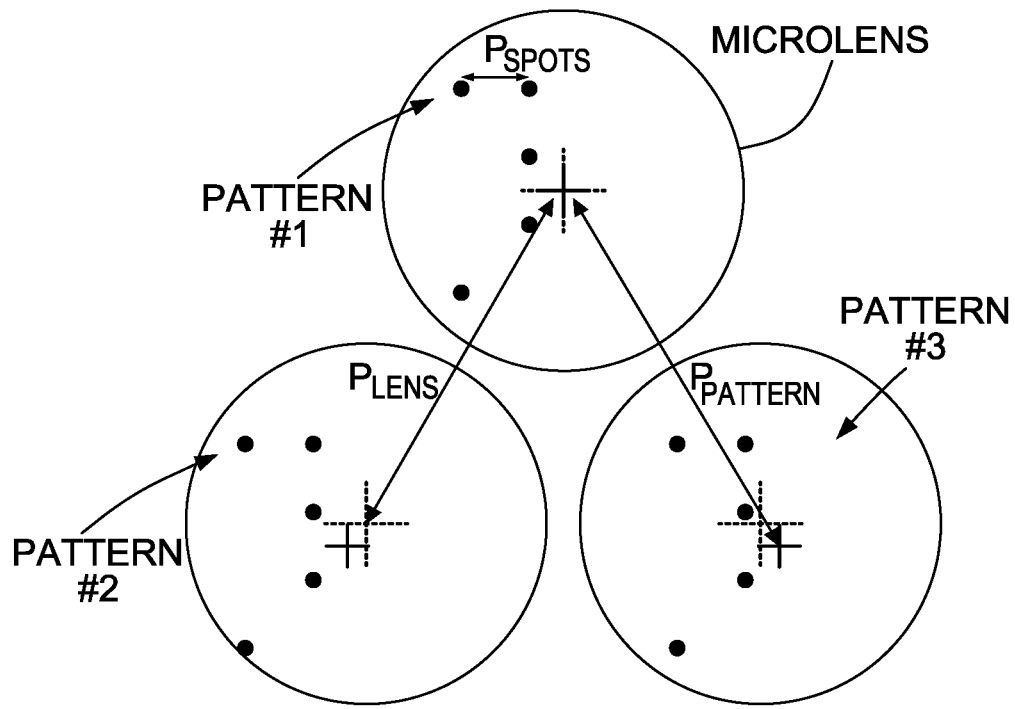

FIG. 20a illustrates schematically a matrix of laser focal spots generated from a single pulse after modulation by a SLM, forming in a plane inside of a transparent substrate. The pattern comprises of three similar arrays of 5 spots each, arranged hexagonally on a pitch of $P_{pattern}$ (centered on solid crosses) and with laser-to-laser pitch of $P_{spot}$ in each array. The circles represent the position of microlenses, also on a hexagonal pattern but with a smaller pitch of $P_{lens}$ (centered on dashed crosses).

Figure 20B:
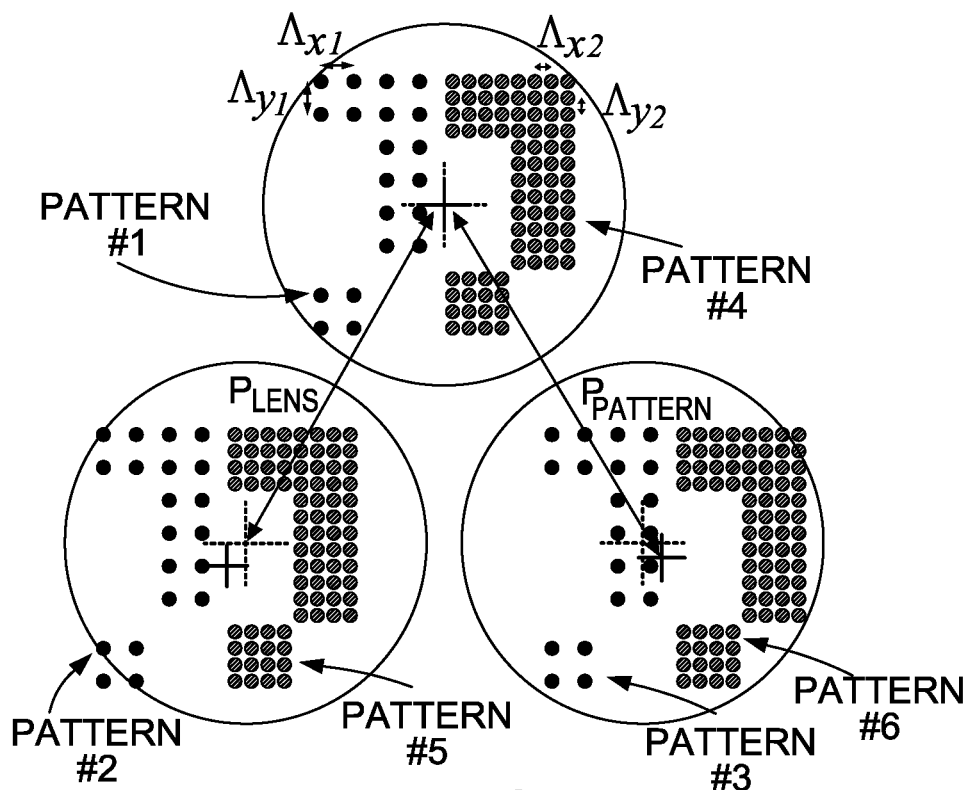

FIG. 20b illustrates schematically a pattern of laser modified spots formed in a transparent substrate following multiple laser pulse exposures of the arrangement in FIG. 20a applied while scanning both x- and y-axes of a mirror galvanometer system to sub-divide the SLM pattern on periodicity $P_{spots}$ (FIG. 16a) into finer periodic structure with periodicity of $\Lambda_{x1}$ and $\Lambda_{y1}$ in the x and y directions, respectively, yielding Patterns #1, #2, and #3 on the left half of the microlens aperture (solid circle) and shifted to the right half of the microlens aperture to generate a finer periodicity of $\Lambda_{x2}$ and $\Lambda_{y2}$ in the x and y directions, respectively, yielding Patterns #4, #5, and #6.

FIG. 20c shows an optical microscope image of the laser fabricated pattern embedded inside of the BOPP film, forming a large diffractive optic array with the combination of SLM beam splitting and galvanometer scanning, yielding low and high resolution patterns, written side by side in the lens aperture with periods of $\Lambda_{x1}=\Lambda_{y1}=1.25$ μm on the left, and $\Lambda_{x2}=\Lambda_{y2}=625$ nm on the right. The SLM separated the laser spots to a period of $P_{spots}=10$ μm, and the diffractive array was patterned in hexagonal arrangement on periodicity $P_{pattern}=0.98 \times P_{lens}=52.92$ μm. The pulse energies per spot were 12 nJ and 7 nJ for the left ($\Lambda_{x1}=\Lambda_{y1}=1.25$ μm) and right ($\Lambda_{x2}=\Lambda_{y2}=625$ nm) patterns, respectively.

FIG. 20d shows an enlarged optical microscope image of the laser-modified BOPP film recorded inside the area marked by the dash rectangular box in FIG. 20c; the single lens area pattern encompassing two diffraction zones with low resolution of $\Lambda_{x1}=\Lambda_{y1}=1.25$ μm (dashed rectangular box) and high resolution of $\Lambda_{x2}=\Lambda_{y2}=625$ nm (dotted rectangular box), defining a two-period diffractive optical device.

FIG. 20e shows the camera-captured image of the moiré optical effects observed in transmission from a broadband white light source through the laser modified BOPP sample in FIG. 20c or 20d of 5 mm by 6 mm area, when overlaid with a sheet of microlens array with hexagonal arrangement on mismatched period $P_{lens}=54$ μm. The image shows moiré magnification of about 50 times. A red and blue colour tone were filtered by the combined films corresponding to diffraction from the left ($\Lambda_{x1}=\Lambda_{y1}=1.25$ μm) and right ($\Lambda_{x2}=\Lambda_{y2}=625$ nm) half-field patterns in each microlens aperture, respectively.

FIGS. 20f, 20g, and 20h show a camera-captured image of white light transmission through the combination of laser-patterned BOPP film and microlens array as in FIG. 20e, with the diffractive optical layer in the BOPP aligned to the focal plane of the microlenses. The illumination angle ($\theta_i=0°$) was perpendicular to the sample, and the observation angle (O s) was at ~30 degrees with respect to the normal of the sample. The image was captured with azimuthal angles of $\phi_i$ and $\phi_o$ at 0°. The zoom imaging optics were focussed to align in front of the diffraction layer (z=~+3.5 mm), at the diffraction layer (z=~0 mm), and behind the diffraction layer (z=~-3.5 mm) for the respective cases of FIGS. 20f, 20g, and 20h. In FIG. 20f, blurry patterns with red ($\Lambda_{x1}=\Lambda_{y1}=1.25$ μm) and blue ($\Lambda_{x2}=\Lambda_{y2}=625$ nm) diffractive colouring on the left and right lens fields, respectively, were observed as expected due to focussing in front of a moiré sink sample.

In FIG. 20g, the red ($\Lambda_{x1}=\Lambda_{y1}=1.25$ μm) and blue ($\Lambda_{x2}=\Lambda_{y2}=625$ nm) diffractive colouring zones remained blurry, however, imagining of the lens array were partially in focus at the z=0 positioning. In FIG. 20h, the red ($\Lambda_{x1}=\Lambda_{y1}=1.25$ μm) and blue ($\Lambda_{x2}=\Lambda_{y2}=625$ nm) diffraction colouring zones have come into sharpest focus, at the expected z=~-3.5 mm imaging plane for the case of moiré sink with the mismatched periodicity $P_{pattern}=0.98 \times P_{lens} \sim 52.92$ μm.

FIGS. 21a, 21b, 21c, and 21d show camera-captured images of white light illumination through of a BOPP film of a 10 mm by 12 mm area, modified with a femtolaser to form a diffractive optical array in hexagonal patterns of periodicity $P_{pattern}=55.08$ μm, with square shaped diffraction zones patterned on $\Lambda_x=\Lambda_y=1.25$ μm period, forming with a pulse energy per spot of 7.7 nJ, and sandwiched between two sheets identical films of microlens arrays on hexagonal patterns with periodicity of $P_{lens}=54$ prin. FIGS. 21a and 21b were captured with a fixed arrangement of the two microlens array sheets misaligned with the diffractive optical pattern in the BOPP film. A different combination of moiré magnification effects between the laser fabricated diffraction pattern and the two microlens arrays are noted where FIG. 21a captures a moiré pattern formed by the laser patterned BOPP and the microlens sheet and a different imaging depth in FIG. 21b capturing a moiré pattern formed by the two misaligned microlens sheets. In both cases, a base of the square-shaped diffractive optic pattern is recorded, but more highly modulated in FIG. 21b. FIG. 21c was captured with the two microlens array sheets slightly misaligned, yielding a large moiré magnification between the two misaligned microlens array sheets dominating in the light pattern. FIG. 21d was captured with the two microlens array sheets aligned with respect to each other, and with the diffraction pattern in the BOPP film, eliminating the microlens-to-microlens moiré effects and enhancing the moiré magnification with the laser patterned BOPP film.

Figure 22:
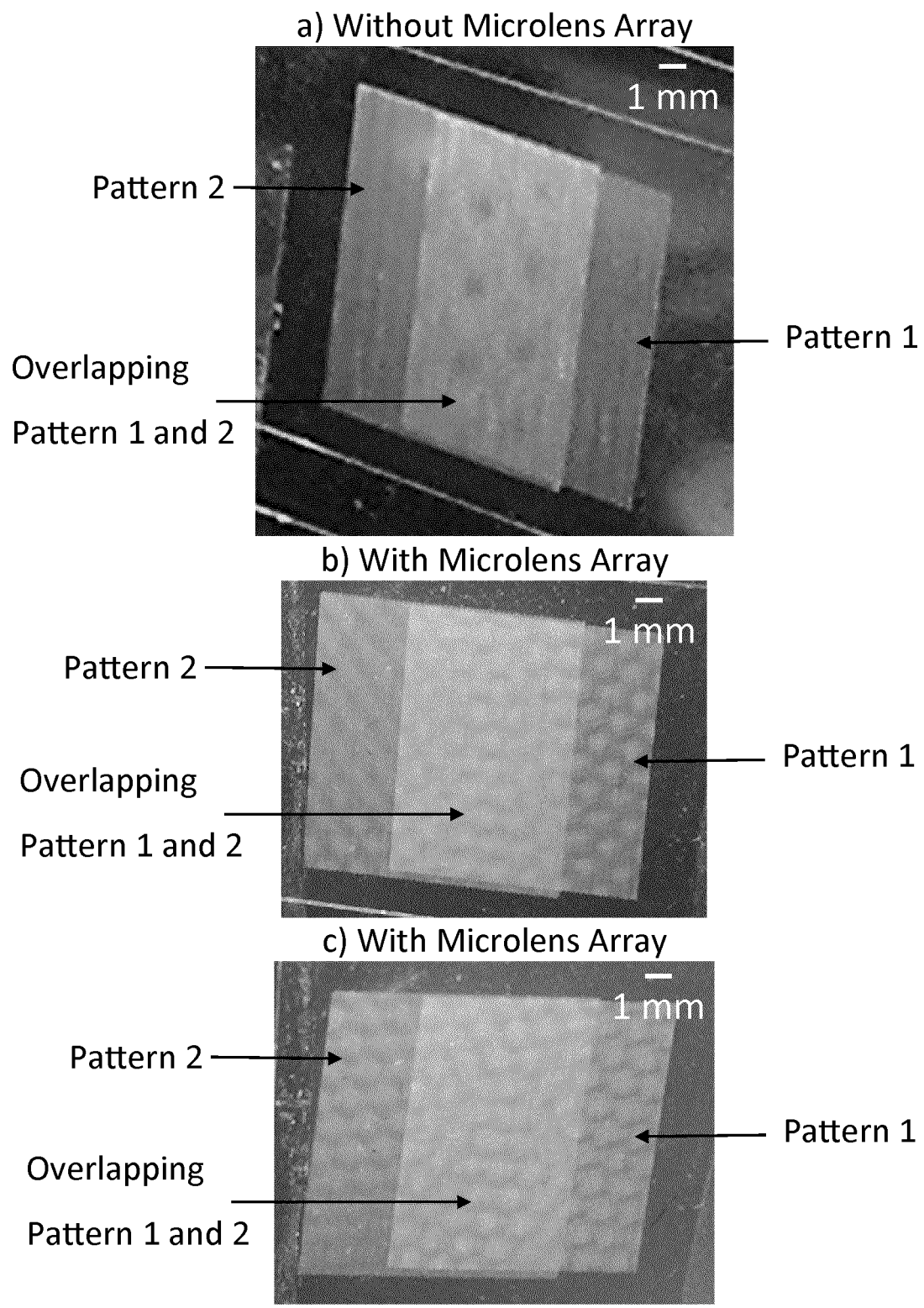

FIG. 22a illustrate a camera captured image of white light transmission through two partially overlapping BOPP films that have been femtolaser structured with uniform grating structures ($\Lambda_x=\Lambda_y=1.25$ μm) formed in square areas of 40 μm by 40 μm, and patterned in hexagonal grids with differing periods of $P_{pattern}=52.92$ μm (i.e., moiré sink diffractive optic in FIG. 16d) and $P_{pattern}=55.08$ μm (i.e., moiré float diffractive optic in FIG. 16c), with pulse energy exposure of 7.7 nJ per spot applied as described in FIG. 16. The overlapping diffractive optical films in the middle of the image unveil moiré optical effects without the use of a microlens array.

FIGS. 22b and 22c illustrate further moiré effects with camera-captured images of white light transmission through the two overlapping BOPP samples, described in FIG. 22a, overlayed and aligned with a single layer of microlens arrays, following a hexagonal pattern with periodicity of $P_{lens}=54$ μm. FIG. 22b was captured by imaging behind the film layers, capturing sharp images only of the moiré effects from the BOPP film with periodicity $P_{pattern}=52.92$ μm, demonstrating moiré magnification and sink effects.

FIG. 22c was captured by imaging in front of the film layers, capturing sharp images only of the moiré effects from the BOPP film with periodicity $P_{pattern}=55.08$ demonstrating Moiré magnification and float effects.

FIG. 23a provides a camera-captured image of white light illumination of a partially gold-coated BOPP sample that was laser patterned with 50-μm square areas of diffractive optical zones in hexagonal patterns, formed with a pulse energy per spot of 5.8 nJ, a hexagonal periodicity of $P_{pattern}=100$ μm, and diffraction grating zones with periodicity $\Lambda_x=\Lambda_y=1.25$ μm. The gold coating induces reflected light with a gold colour that passes through the diffractive optical layer, while a green colour reflection is noted lower in the film that arises from grating back-diffraction at the higher observation angle.

FIGS. 23b and 23c illustrate camera-captured images of the partially gold-coated BOPP film described in FIG. 23a, overlaid with a sheet of a microlens array, with hexagonal patterning on periodicity of $P_{lens}=98$ μm, illustrating moiré optical effects when the light has been (b) partially transmitted and filtered through the gold film and (c) reflected by the gold film, passing twice through the diffractive optical layer.

DEFINITIONS

Beam shaping: refers to any technique for changing a shape, focus, direction, or optical properties of a laser beam, as described herein.

Diffractive optic elements (DOE): are optical components that impart varying degrees of manipulation to the light wave and result in a tailored redirecting or reshaping of the forward propagating light into a desired two- or three-dimensional intensity pattern. DOEs can optionally operate in the reflective or transmissive mode. DOEs include non-active (hard) optics that generated a fixed beam pattern or active devices such as spatial light modulators (SLMs) that can flexibly tune the beam shaping. DOEs can optionally be used not only to shape the beam into the desired pattern but also to focus the beam into a magnified or de-magnified pattern of the required size in the fabrication volume, and may replace the final focusing lens (i.e. fabrication lens). For example, the desired pattern can optionally be a matrix of individual and isolated laser spots positioned in pre-defined x, y, z locations that assemble in the far-field diffraction provided by the DOE. A desirable factor for manufacturing is to replicate the diffractive pattern from an SLM with a hard optic DOE that better tolerates high level laser exposure. In other embodiments, DOEs may encompass the assembly of laser modified tracks that also result in a tailored redirecting or reshaping of forward propagating light into reflective or transmissive modes.

Femtolaser: is a pulsed laser wherein the individual pulses emitted by the laser have a short pulse duration encompassing a range of 1 to 1000 femtoseconds. However, the present context of femtolaser extends to consider other short pulse duration lasers with pulse duration in the range of 1 to 100 picoseconds or 100 to 1000 attoseconds. The context of a pulse duration here further considers different temporal profiles (Gaussian, Lorentzian) or modulations or burst trains, etc, forming during the delivery of the femtosecond or picosecond laser pulse.

Laser-modified track: refers in the context of the present application to any modification, abrogation, aberration, or generally elongate modified portion of or within a substrate such as a polymer substrate, that runs generally non-parallel with the surfaces of the substrate, formed by any method including but not limited to melting, sublimation, decomposition, deformation, micro-explosion or displacement of the substrate. Each laser-modified track may comprise any form of modified substrate, or region or elongate volume of modified substrate material, wherein the modification results in a different refractive index to the modified material of the substrate prior to its modification. Typically, such laser-modified tracks may be formed for example by laser pulses upon the substrate, where the shape and elongate direction of the laser-modified track generally conforms to or is consistent with the direction of the laser and its interaction with the material of the substrate, typically with the laser and the substrate stationary or not moving relative to one another, or moving very little relative to one another, during the duration of a laser pulse. Typically, in some embodiments, the elongate nature of the laser-modified track in the substrate is generated using a laser with beam-shaping of the laser light so that the incident laser light becomes focused in a distributed manner along a laser beam longitudinal axis that extends through the substrate sheet. In this way, the energy of the laser beam is not focussed in a particular location or depth in the substrate, but instead the energy of the laser beam is distributed in a controlled manner along a line path extending within and optionally through the substrate generally coaxial with a direction of the laser. The laser beam may thus be caused to modify the document substrate along a defined one-dimensional section of its 'track' or beam path as the distributed focussed portion of the laser interacts with and passes partially or entirely through the document substrate. In some embodiments the wavelength and pulse duration of the laser may be favourably selected to activate photothermal versus photochemical reactions at low energy exposure, or drive nano-explosion from a shaped absorption volume with higher laser pulse energy. In some embodiments, the modification zone may be fully formed by a single laser pulse or a burst-train of pulses at high repetition rate (i.e. 10 kHz to 100 GHz), wherein the latter enables accumulative substrate effects over multiple pulses to result in favourable benefits such as from thermal cycling, large heat-affected zones, and defect generation in the material. In some embodiments, laser-modified tracks may comprise regions or portions of modified polymer where polymer chains of the polymer are caused to generally align with the direction of the laser, and optionally may additionally form voids or amorphous regions (typically elongate voids or elongate amorphous regions) within the substrate material. Laser-modified tracks may comprise a volume of modified substrate material that is 1-5000 nm in width, and 0.1-3000 μm in length. For example, laser-modified tracks may be "elongated" if they comprise a volume of modified substrate that is at least 4 times longer (typically in direction extending in line with the laser beam) than their individual width. Further, laser-modified tracks may extend perpendicular or non-perpendicular (but generally not parallel with) the substrate surface, or shaped to follow curved or helical path. Optionally, any laser-modified track may be further modified by chemical treatments, added layers, or thermal annealing as required according to any specific embodiment. In some embodiments, the term "laser-modified track" is used interchangeably with the term "filament", and in some embodiments an array of laser modified tracks may be referred to as a "filament grating" or a diffractive optical element (DOE). Laser-modified tracks may be formed with any configuration, periodicity, shape, angle, or orientation of the laser-modified tracks, wherein "angle" refers to angle of attack—e.g. oblique, relative to the focal plane, and wherein "orientation" refers to orientation relative to or about a central axis perpendicular to the focal plane. Arrays of laser-modified tracks may optionally be arranged in layers at different depths within a substrate. Further to the diffractive properties of the laser modified layers that are designed to change the propagation directions/angle according to wavelength, the patterns may be flexibly directed into reflective or transparent directions, or combinations thereof, enabled by underlying properties (i.e. Talbot, volume grating, photonic stop band, 3D lattice, Bragg reflection); a multiplicity of viewing options thus are available on selecting reflection, see-through, or combination of two, for the device that may present similar or differing optical effects and security features dependent on the illumination/viewing condition. Further, the diffractive effects may appear differently by angular rotation, or by colour/wavelength variation of the source, or be invisible to the eye, and apparent with sensors in the ultraviolet, near-infrared or infrared spectrum.

Microlens: refers to any optical device that is able to focus incident light upon the lens, by diffraction or refraction, wherein dimensions of the lens are less than 1000 microns, less than 100 microns, preferably less than 50 microns, or less than 25 microns, or less than 10 microns across or in diameter. The lens height and/or thickness of the lens may optionally be less than 300 microns, preferably less than 25 microns, or less than 1 microns, across or in diameter. In general, the diameter may dictate the perceived resolution, whereas the thickness of the lens may dictate suitability of the feature for application to various substrates such as ID cards, paper, polymer bank notes, etc. In some embodiments, a refractive microlens may extend from or provide a protrusion to a substrate material. Such microlenses may be convex or similar, and be comprised of the same material as the substrate material, may be comprised of the substrate material, or may comprise a different material to the substrate material. Other microlenses as herein disclosed may be diffractive microlenses integral with or formed within the substrate material. For example, the substrate material may be modified to comprise laser-modified tracks arranged to fabricate a diffractive lens within the substrate. The array or arrays or laser-modified tracks may be formed with varying periodicity or structural design such that the diffractive properties of the substrate vary. Selected diffractive microlenses may simulate or form Fresnel-type lenses comprising circular arrays of microlenses with differing diffractive properties, thereby to provide a diffractive structure with diffractive properties varying radially from a centre of the lens position. Other microlenses may comprise a more traditional Fresnel structure, for example, with circular grooves, or circular ridges formed with binary, multilevel or continuous varying surface relief. Other microlenses may convey focusing and imaging effects induced by 1D or 2D diffractive volumes of laser-modified tracks wherein the local 'fine-scale' periodic structure that induces diffraction is oscillating (sinusoidal) on larger scale periodicity (e.g. relating to oscillating positive/negative spatial frequency chirps) to induce varying diffractive properties, that over larger area assemble into imaging or focusing effects akin to a microlens, and that repeating on an even larger scale, assemble into a micro-lens or micro-imaging array effect. Other microlenses may comprise periodic oscillation of local diffraction patterns to induce lens/imaging effects or narrow to annular rings or circular arrays, to conform to a more traditional Fresnel lensing concept. Yet further examples may comprise elliptical and other non-circular shapes or arrays that induce astigmatic, aberrative, chromatic, aliasing, and other imaging effects.

Further versions and type of microlenses will be apparent to one of skill in the art from the present disclosure as well as common knowledge in the art. All such microlenses are encompassed within the present definition.

Motion: refers, with respect to observable or perceptible optical phenomena, especially regarding but not limited to moiré effects, including "rolling", "parallactic", "orthoparallactic" motions, etc.

Pattern: any shape, arrangement, image, icon, art-form, character, letter, number, symbol formed in a substrate material as described herein. In select embodiments the patterns may be formed by laser techniques such as those described herein. Patterns may be two or three dimensional, and may be visible or invisible to the naked eye, or may only be detectable or observable with the assistance of a screening tool, magnification means, lens arrays, or other means for their observation or detection. Accordingly, each pattern may have any dimensions, but in some embodiments may be small enough to form icons suitable to generate a virtual image by moiré magnification of microlenses. A pattern may have any material and/or structure, including but not limited to those manufactured by laser, diffraction gratings, photonics crystals, and other suitable materials and structures.

Periodic/periodicity: refers to regular interval separation of laser-modified tracks of a substrate sheet, typically defined within a two-dimensional array of such tracks within the substrate sheet, or a portion thereof, as described herein. A volume grating may optionally further have a structural modification with periodicity arising along a third axis (i.e., period 'c' defining the Talbot plane-to-plane separation or Bragg plane-to-plane separation), with a modulation direction appreciably aligning perpendicular (−45° to +45°) to the substrate surface. Typically, the term refers to the general or average, regular, ordered separation of the laser-modified tracks that have been modified post-production of the substrate sheet to exhibit a change of refractive index of the substrate sheet material, separated by unmodified areas or portions of the substrate sheet that retain their original refractive index from the original materials of, and original manufacture of, the substrate sheet. In some embodiments, a periodicity for a small area of a two-dimensional array of said laser-modified tracks may optionally or typically be at least substantially constant, but the periodicity for a larger area of the two-dimensional array of said tracks may optionally change within or across the array, or be different between adjacent arrays, according to the specific embodiment. Typical or average periodicity, in terms of average separation of laser-modified tracks and their constituent modified substrate material, within a two-dimensional array of laser-modified tracks, may for example comprise tracks that are separated from one another, or separated from a nearest adjacent track, by from 0.01-50 µm, or from 0.05-10 µm, more preferably 0.1-5 µm, on average by unmodified material of the substrate sheet that retains its original general refractive index. For example, two-dimensional arrays may include periodicity intervals of separation between the regions of the array that may give rise to optical diffractive effects, or which may be too large or too small to give rise to observable optical diffractive effects, within the visible light spectrum. For example, without wishing to be bound by theory, regions that are separated from one another by 0.1-5 µm on average by the unmodified material of the substrate sheet may be preferred to give rise to observable optical diffractive effects within the visible light spectrum. Selected embodiments may optionally comprise random variation in periodicity, chirping of the spatial frequencies, superposition of gratings with different periods and/or shapes.

Polymer: refers to any polymer or polymer-like substance suitable to form a substrate material e.g. in the form of a sheet-like or roll-like configuration to be formed or cut into a size suitable for use as in security documents. The polymer may be a substantially uniform sheet of polymer material, or may take the form of a laminate structure with layers or polymer film adhered together for structural integrity, such as disclosed for example in international patent publication WO83/00659 published Mar. 3, 1983, which is incorporated herein by reference. Polymers may include but are not limited to UV curable resins, polypropylene, PMMA, polycarbonate, polytetrafluoroethene (PTFE), PET, BOPP, BOPET, PEN, PP, PVDF and related co-polymers such PVDF-TrFE.

Region (of a substrate): refers to a part of a substrate that includes a specific or defined portion of the substrate that has a refractive index that differs from that of the remainder of the substrate due to substrate post-production modification. Such a region may comprise for example a laser-modified track as described herein, or any modified substrate, polymer, voids, abrogation, or anomaly that achieves the change in refractive index for the material of the region or a part thereof. In selected embodiments the net effect of the material modification is to redirect the propagation of light by optical means of refraction, Fresnel reflection, Rayleigh or Mie scattering, or induction of localized absorption zone. In selected embodiments the collective response of such optical effects from an array of similar modification zones is to induce diffractive and interference effects then aimed to spectrally filter and redirect light with controlled ranges of wavelength and diffraction angles.

Security document: refers to any polymer- and/or non-polymer-based document of importance or value. In selected embodiments, a security document may include features or devices intended to show that the document is a genuine, legitimate or authentic document, and not a non-genuine, illegitimate or counterfeit copy of such a document. For example, such security documents may include security features such as those disclosed herein. Such security documents may include, but are not limited to, identification documents such as passports, citizenship or residency documents, drivers' licenses, bank notes, cheques, credit cards, bank cards, and other documents of monetary value.

Security device or feature: refers to any device or feature that may be added to or incorporated into a security document for the purposes of making that security document more difficult to copy, replicate, or counterfeit, including structures or features incorporated into the substrate material or substrate sheet of the security document, or resulting from modification of the substrate material or substrate sheet. Substrate sheet/substrate material: refers to any material or combination of materials used to form the main structure or sheet of a security document. The material is typically formed into a sheet or planar member and may be composed of at least one substance selected from but not limited to paper, plastic, polymer, resin, fibrous material, metal, or the like or combinations thereof. The substrate sheet may comprise more than one material, layered, interwoven, or adhered together. The material may be smooth or textured, fibrous or of uniform consistency. Moreover, the material may be rigid or substantially rigid, or flexible, bendable or foldable as required by the security document. The core material may be treated or modified in any way in the production of the final security document. For example, the material may be printed on, coated, impregnated, or otherwise modified in any other way as described herein. The substrate material may be transparent and include materials selected from, but not limited to, polymers, dielectrics, semiconductor wafers (silicon is transparent in infrared), glass windshields, architectural glass, display glass, ultrathin flexible glass), etc.

Talbot effect: in some embodiments refers to the preferential alignment or misalignment of grating planes on axial periodic spacing, c, that matches or mismatches, respectively, with the Talbot self-imaging distance in multibeam interference. The objective of matching and mismatching is to enhance or diminish, respectively, the diffraction efficiency, working with or against, respectively, with interference generated solely by the single grating layer. The combination of these effects from multilayered, three-dimensional volume gratings affords more degrees of freedom in controlling direction and spectral content of light flowing through the grating. These effects in at least some embodiments relate also to Bragg reflection and the optics of photonic crystals.

DETAILED DESCRIPTION OF SELECTED EMBODIMENTS

The present disclosure encompasses optical devices that in selected embodiments combine a two-dimensional array of microlenses together with a two-dimensional array of laser-fabricated patterns or structures. In selected embodiments each laser-fabricated pattern or structure is a three-dimensional laser-fabricated pattern or structure. In some embodiments, the laser-fabricated patterns or structures are formed within a substrate material such as a polymer, by exposure of the material to a laser. The microlenses may take any form suitable to generate an optical effect corresponding to observation of the laser-fabricated patterns or structures through the microlenses.

In certain embodiments, the microlenses and/or the laser-fabricated patterns or structures are at least partially or fully incorporated directly into, or fabricated within, a substrate material or substrate sheet of a security document, for example by modification of a substrate material or substrate sheet, rather than being applied to or adhered to a substrate material or substrate sheet of the security document. The partial or complete fabrication of such optical devices into or within the substrate sheet of a security document presents certain advantages, depending upon the embodiment, as herein described.

For example, by at least partial incorporation of elements of the security device or feature into the substrate of the security document, problems associated with adhered or applied security devices may be substantially avoided. Incorporated or embedded security devices and features, which form an integral structural feature of the document substrate, cannot be readily removed from the substrate material either intentionally or unintentionally without disrupting the integrity of the substrate. Accordingly, such security devices and features are typically more robust and less susceptible to damage or wear during document use.

Selected embodiments provide security devices and features that are at least partially formed within a polymer substrate post-production of the polymer into a sheet material. In certain examples, a security substrate polymer is modified using a specifically adapted laser source with certain defined properties. In this way, it is possible to generate embedded or partially embedded, optically discernable security features within polymer sheets, with certain advantageous optical properties, which to date have been difficult to achieve. For example, by way of certain methods and optical devices herein described, certain types of diffractive effects may be introduced into a security document substrate directly without necessarily involving or requiring the addition of other layers or additives. In some embodiments, the optical effects present advantages over those previously known in the art. Methods to produce such security devices and features are also disclosed, which in selected embodiments may be employed for large scale document manufacture suitable, for example, for bank note production.

Other embodiments, however, include modified sheets of material such as polymer sheets as described herein, that are themselves applied or adhered to a substrate of a security document such as a bank note.

Accordingly, selected embodiments provide an optical device comprising:
 a periodic array of microlenses; and
 a periodic array of distinct patterns, wherein the patterns are the same or different from one another, and each pattern comprises a structure selected from: a periodic array of continuous or non-continuous laser-modified tracks in a substrate material, such as a polymer substrate material, a diffraction grating, and a photonic crystal;

wherein the patterns, together with the microlenses, collectively provide an optical effect.

In other embodiments the patterns may take other forms and structures other than those limited to periodic arrays of continuous or non-continuous laser-modified tracks in a substrate material, such as a polymer substrate material, diffraction gratings, and photonic crystals. Embodiments of the invention encompass all such variants.

Further selected embodiments provide an optical device comprising:
  a periodic array of microlenses; and
  a periodic array of distinct laser-fabricated patterns, wherein the patterns are the same or different from one another, and each pattern comprises a periodic array of continuous or non-continuous laser-modified tracks in a substrate material, such as a polymer substrate material;
  wherein the patterns, together with the microlenses, collectively provide an optical effect.

In certain embodiments, such optical devices comprise laser-fabricated patterns or structures that are distinct from two-dimensional, etched or printed images. Instead, each laser-fabricated pattern or structure may comprise a three-dimensional structure or form, within which are one or more two-dimensional arrays of patterns that may be the same or different from one another. The relative structural complexity of such three-dimensional structures of laser-modified patterns is such that they are generally fabricated by exposure of a substrate material to a laser such as a beam-shaped laser or femtolaser, independent to the presence, production, positioning, or layering upon the substrate material of the two-dimensional array of microlenses. In this way, the laser-fabricated patterns within the substrate material may be positioned and oriented within the substrate material independent to the properties such as the focus, refractive index or focal plane of the microlenses. Therefore, the patterns may exist, for example, across or separate to the focal plane of the microlenses depending upon the desired optical effect, as will be apparent from the foregoing description and examples.

In some embodiments the array of microlenses and the array of laser-fabricated patterns may overlie one another such that the position of the microlenses relative to the laser-fabricated patterns contributes to the optical effect. For example, in some embodiments the resulting optical effect upon the laser-fabricated patterns may comprise, but is not limited to, one or more of: a moiré effect; a float effect; a sink effect; a depth effect; a motion effect; a colour change effect; and an emission angle effect.

The microlenses may take any form depending upon the embodiment. For example, wherein the device comprises a polymer sheet, the microlenses may be individually selected from: refractive microlenses each comprising a polymer or cross-polymerized UV resin protrusion extending from the polymer substrate on one side thereof, or applied to one side thereof; and refractive microlenses each comprising a refractive Fresnel lens comprising a polymer or cross-polymerized UV resin protrusion extending from the polymer substrate on one side thereof, or applied to one side thereof. Such refractive microlenses may therefore collectively focus light incident upon said one side into a focal plane between a surface of the lens and a surface of the polymer material opposite the microlenses.

However, in other embodiments the optical device may comprise a polymer sheet with diffractive microlenses formed, optionally within a polymer material of the polymer sheet. For example, each of such diffractive lenses may be laser-fabricated within the polymer material from one or more two-dimensional arrays of laser-modified tracks as described herein within the polymer. In some such embodiments, the configuration of the diffractive lens may comprise concentric "rings" of regions or polymer material comprising laser-modified tracks, with the spacing and configuration of the laser-modified tracks within adjacent concentric rings giving rise to different effective refraction indices or diffractive properties for the rings relative to one another. In this way, an effective refraction index or diffractive property of different portions of the polymer material in a diffractive pattern may optionally form the diffractive lens akin to a diffractive Fresnel lens. In any event, independent to the nature and structure of the microlenses, each laser-fabricated pattern may in selected embodiments comprise laser-modified tracks (as herein defined) within the polymer material that, relative to the array of microlenses, extend in one or more of the following ways: across the focal plane of the microlenses; between the focal plane and the microlenses; within the microlenses, optionally extending to a surface thereof; or on a side of the focal plane opposite the microlenses, optionally extending to a surface of the device opposite the microlenses. The "depth" of the laser-modified tracks, as well as the length, shape and orientation of the tracks within each laser-fabricated pattern, may influence the observable optical effect generated by the optical device.

Further embodiments comprise an optical device as herein described, wherein at least one laser-fabricated pattern or structure comprises multiple laser-fabricated sub-patterns each with distinct diffractive properties relative to one another. In other words, each laser-fabricated pattern may itself comprise a few or a multiplicity of sub-sections each with distinct optical properties relative to one another, to provide further variations to the observed optical effects. For example, independently each laser-fabricated sub-pattern may comprise laser-modified tracks within the polymer material that, relative to the array of microlenses, extend in one or more of the following ways: across the focal plane of the microlenses; between the focal plane and the microlenses; within the microlenses, optionally extending to a surface thereof; or on a side of the focal plane opposite the microlenses, optionally extending to a surface of the device opposite the microlenses.

In related embodiment, the diffractive microlenses may alternatively be formed by the femtolaser into a diffractive optical element wherein the beam propagation is not simply defined by a lensing effect. In some embodiments, a periodic modulation of the laser-fabricated DOE pattern may induce the resulting optical effect when overlaid with another laser modification pattern such that the position of the first DOE pattern relative to the second laser-fabricated pattern contributes to the optical effect. For example, in some embodiments the resulting optical effect upon the dual or multi-layering of laser-fabricated patterns may comprise, but is not limited to, one or more of: a moiré effect; a float effect; a sink effect; a depth effect; a motion effect; a colour change effect; and an emission angle effect.

In further embodiments, the optical devices may comprise a metalized surface layer on one or both of: a side of the device that comprises, or is adjacent, the two-dimensional periodic array of microlenses; and a side of the device opposite the side that comprises, or is adjacent, the two-dimensional periodic array of microlenses. Optionally, where present, one or both of the metalized surface layers may comprise laser-patterns. In any of the embodiments described herein or related thereto, the optical devices may optionally further comprise any one or more additional layers that partially or entirely overlay the polymer material, the one or more additional layers each independently selected from a polymer layer, a reflective layer, a refractive layer, a diffractive filter, a transmissive filter, a protective layer, an overcoat, an adhesion promoter layer, an ink, an optical interference layer and an optical interference stack.

Laser-modified tracks provide a particularly useful and optically adaptable option to generate laser-fabricated patterns and structures within a substrate such as a polymer substrate. Such laser-modified tracks are described for example in U.S. patent application 60/866,693 filed Jun. 26, 2019 and International Patent Application PCT/CA2020/050884 filed Jun. 25, 2020 (and published on Dec. 30, 2020 as WO2020/257935), both of which are incorporated herein by reference. For example, in selected embodiments the laser-modified tracks may be defined as follows. If the polymer material has a general refractive index n, each laser-fabricated pattern may comprise at least one ordered two-dimensional array of discrete laser-modified tracks in the polymer material generated by a beam-shaped laser with laser light distributed along and/or about a laser propagation path extending within the polymer material. Each laser-modified track may, in some embodiments, comprise a continuous or discontinuous elongate volume of modified polymer material at least 4 times longer than its narrowest width extending at least partially across a thickness of the substrate sheet. Specifically, the modified polymer material may comprise a modified form of the polymer material, that has a refractive index that is different to the general refractive index n of the polymer material from which each laser-modified track originated from. In this way, each two-dimensional ordered array of the laser-modified tracks collectively diffract light impinging on the optical device to form each laser-fabricated pattern.

Furthermore, the modified polymer material may optionally comprise displaced polymer chains to create periodic voids, such that selected laser-modified tracks each comprise one or more voids extending generally non-parallel to the surfaces of the polymer material. The voids, if present due to the activity or power of the laser, may contribute to the change of refractive index of the modified polymer material for each laser-modified track, relative to the general refractive index n for the unmodified polymer material. Such voids within the substrate sheet may be created post-production of the substrate sheet, by modifying, altering, melting, deforming, displacing or decomposing of a portion of the substrate material. Optionally, such voids may extend entirely within a width of the substrate sheet, or may extend to one or both surfaces of the substrate sheet. The voids may comprise air, gas, amorphous polymer or other materials and their presence may, in certain embodiments, contribute to the optical properties of the two-dimensional array.

Laser-modified tracks, when ordered into an array in a substrate sheet, such as a polymer sheet, provide particularly advantageous results in terms of optical effects, and in certain embodiments allow for more complex and distinct optical features as explained herein. Elongation of focussed laser light to form into a filament type of shape of focussed laser light can be achieved in many different ways known in the art, and such embodiments are not limited in this regard. Various embodiments may employ any technique for beam-shaping or re-focussing of laser light, and any combination of those techniques, as required. For example, two classes of beam shaping methods can be defined around (1) external optical tools or effects that impose a shaping effect before the light reaches a focus in the material, and/or (2) material response effects such as non-linear optics that further distort the beam path when propagating in the material. A combination of such effects may also be employed in selected embodiments such that laser energy can be dissipated into a myriad of three-dimensional (3D) shapes that deviate far from the typical Gaussian-shaped focal volume.

Accordingly, the optical properties of each two-dimensional array of laser-modified tracks, or sections or portions of the two-dimensional array, may be modelled, selected or tuned to meet the specific requirements of the application. For example, different parts of the substrate may be modified in a different manner in different sections of the device to generate the modified regions. Selective laser focusing and shaping of the laser beam, including modification of the beam prior to interaction with the substrate material, may generate regions of modified refractive index having the following example variations, all of which are encompassed by selected embodiments as disclosed herein:

Different depths for laser-modified tracks extending within the substrate

Different widths for laser-modified tracks

Different lengths for laser-modified tracks extending within the substrate, and optionally to one or both substrate surfaces Different angles for laser-modified tracks extending within the substrate relative to perpendicular to the substrate surfaces Different periodicity of the laser-modified tracks within the two-dimensional array Different lattice geometry of the laser-modified tracks within the two-dimensional array e.g. rhombic lattice, square lattice, hexagonal lattice, rectangular lattice, and parallelogrammic lattice Angle of rotation of the array relative to adjacent arrays, or different angles of rotation of regions within one array.

Regular (e.g. elongate or cylindrical) or non-regular shaping of the laser-modified tracks of the substrate material within the substrate Such additional variations to the laser-modified tracks in the substrate sheet, and/or between the modified regions the substrate sheet permit adaptability and finer tuning of the optical properties of the substrate sheet, either for the entirety of each two-dimension array, or for sub-sets or specific sections of each two-dimensional array. For example, selected embodiments permit the generation of more complex images through two-dimensional arrays of regions as described herein, wherein the regions of the array are produced with different periodicities, spacing, depth, shape, lattice geometry, rotation angle of the array, length, angle, or other modifications that previously have been difficult or impossible to achieve. Accordingly, a single two-dimensional array may comprise a consistent set of laser-modified tracks, or the regions within the two-dimensional array may vary by one or more variable factors as listed above, across and within the two-dimensional array. In this manner, the optical properties of the two-dimensional array, and the optical diffractive output from the two-dimensional array, may vary across and within the same array. Therefore, the methods employed by the inventors to generate laser-modified tracks as described herein, may be adapted and tuned in terms of the laser focus, beam-shaping, and substrate interaction, to achieve a wide variety of optical effects.

In some embodiments any optical device as described herein may further comprise one or more additional layers that partially or entirely overlay at least a portion of at least one two-dimensional array of laser-modified tracks in the substrate. For example, such additional layers may comprise one or more reflective layers, refractive layers, diffractive filters, transmissive filters, optical interference layers or stacks, ink, protective layer, overcoat, adhesion promoter. In any such embodiments, the additional layer or layers may modify incident light that impinges upon the substrate sheet, and/or the optical diffractive output of the substrate sheet, prior to observation or detection by a user.

Selected embodiments further allow the advantage of a single pulse laser exposure to modify an internal volume of substrate material wherein a traditional small laser focal spot is stretched along a preferred axis or axes. Within this shape, the light intensity distribution is controlled to an above threshold value of absorption such that a single laser pulse can induce a preferred elongated geometry of material modification, such as the filament shape to generate laser-modified tracks in the substrate as described herein.

For example, in the case of transparent substrates such as transparent polymer substrates, multiphoton absorption, avalanche ionization, above threshold absorption and other nonlinear optical processes may only begin absorbing the laser beam at sufficiently high intensity confined to near the focal volume. The resulting material modification can be readily manipulated to induce refractive index structures, [1] volume nano-gratings, [2-4] nano-voids, [5] elongated filaments, [6] and nano-channels [7] in reproducible ways.

Beginning with external optical tools, surface and lens aberration [8] is one example form of beam distortion that may typically stretch the focal volume longitudinally along the beam propagation direction. Aberration effects are especially pronounced with strongly focusing lenses that offer high numerical aperture to form highly converging beams. Aberration arises when a focusing laser beam enters the flat first surface of the target material, an effect called surface aberration. This effect leads to an elongation of the focus towards the source, that grows with increasing focussing depth in the material and increasing numerical aperture of the focusing beam. This effect can be separated from the target sample for external control and amplification by placing for example a flat optic in the beam path between the lens and the target material. In this way, the plate thickness and refractive index of the material are used to control the length of the track forming in the target material. For example, plates such as silica plates or those made from another material may be from 0.1 mm to 10 mm in thickness, preferably 0.5 mm, 1 mm, 1.5 mm, 2 mm, 2.5 mm, 3 mm, 3.5 mm, 4 mm, 4.5 mm or 5 mm in thickness.

In any spherical lens or combination of lenses, aberration is frequently tuned to a minimum level. Hence, aberration can be readily manipulated and amplified by mismatching optical materials, reversing optical surfaces, and other means that an optical designer normally avoids in trying to make a traditionally 'perfectly' focussing lens system.

Various forms of optics containing non-spherical refracting surfaces are also indicated for selected embodiments, that inhibit focusing of all light rays to a common focus. This includes the axicon, which creates a Bessel-like beam of first order-stretching the beam into a long filament like shape. Mistuning of compensation collar lenses, used in deep focusing [9], may be employed in selected embodiments.

In other embodiments, a spatial light modulator (SLMs) [10-13] provides a high resolution, two-dimensional patterning control of the phase front of the beam, which after passing a focusing lens enables a wide tuning ability of beam shape. With appropriate alignment, the lens completes a Fourier transform of the electric field distribution from the SLM surface to near the focal plane of the lens, which is placed inside of the target sample. Similar effects can be obtained from a liquid crystal panel that attenuates the electric field to produce a high resolution, two-dimension light intensity pattern. Other optional active tools of beam shaping including MEMs mirrors, acousto-optical lenses, diffractive optics, holograms, phase-arrayed beam steering antennas, and flexible membrane mirrors, as non-limiting examples.

In other embodiments, material response effects can significantly redirect the laser beam path once propagating inside of the target sample. The accumulated absorption of laser light during the exposure can result in thermal gradients and physio-chemical modification that may lead to self-lensing or defocusing effects during the laser interaction. In the domain of ultrashort pulse lasers, a high intensity building in the focal volume can induce a wide range of nonlinear optical effects including: intensity clamping that shifts the interaction zone backward with respect to the laser propagation direction, the Kerr effect that draws the focal interaction volume forward, and plasma defocusing that diverges the beam outward. Under the right balance, Kerr effect can induce a stable self-focusing effect that causes or forms long high intensity 'filaments' to form in the material In further examples, spatio-temporal beam shaping may be employed to influence the form of the laser interaction volume, which entails both control of the pulse time and space dimensions at the focal volume. On a simple level, astigmatic beams are an option to form filaments with non-circular cross-section. To this end, cylindrical lenses, slit apertures or SLMs are non-limiting examples of external beam shaping techniques to form filaments with elliptical or planar shapes. Beam shaping permits an accelerated beam to afford the option of 3D shaping of curved filament shapes. Space-time beam properties can be manipulated further to diminish self-focussing effects or induce pulse front tilt effects [21-23] that create asymmetry in the pulse arrival time and shape of the resulting filament. In some embodiments, a combination of external and internal beam shape manipulation is thus anticipated in favourably exerting control over the morphology and structural form of the laser modification volume.

Other selected embodiments may employ parallel processing, wherein a single laser pulse is divided and directed to multiple locations in the sample to form multiple points of modification, thus speeding fabrication rates. As an example, SLMs offer active control in creating multi-focal positions that can be manipulated to new locations in real time [24,25]. Other forms of parallel processing anticipate dividing the beam with diffractive optics, lens arrays and other devices (as those discussed) and projecting an array of similar beams to multiple processing points in one exposure.

For example, laser scanning may in certain embodiments be combined with sample motion to permit high speed scanning of the beam across a more slowly moving sample. Such scanning is typically provided by galvanometer mirrors, rotating mirror polygons, and acousto-optic scanners.

Exemplary laser sources suitable for use in the presently disclosed methods include, but are not limited to, high power fibre lasers, such as any of the following commercially available models (laser wavelength is 1030 nm): Amplitude Systemes Satsuma HP3: pulse duration <350 fs to 10 ps; power >50 W; pulse repetition rate 1 to 40 MHz; pulse energy 40 µl/150 µJ; IPG photonics YLPF-10-500: pulse duration 500 fs; power 10 W; pulse repetition rate 1 MHz; pulse energy 10 µJ, Clark MXR Impulse: pulse duration 250 fs; power 20 W; pulse repetition rate 2 MHz; pulse energy 10 µJ. Another option would be to use a cavity based Yb laser oscillator/amplifier. Other commercially available models include but are not limited to the Spectra-Physics Spirit and the Light Conversion Pharos. In selected embodiments, each of the laser-modified tracks is generated by a femtolaser, such as a femtolaser with a pulse duration in the range of 0.1 fs to 100 ps for each laser pulse, with beam-shaping of the femtolaser beam prior to or upon its interaction with the substrate.

In further embodiments, the exposure of the substrate sheet to a laser may enable fabrication of diffractive microlenses within the polymer sheet. For example, each diffractive microlens may comprise at least one further ordered two-dimensional array of discrete continuous or non-continuous laser-modified tracks in the polymer material generated by a beam-shaped laser with laser light distributed along and/or about a laser propagation path extending within the polymer material. In this way, each laser-modified track may comprise an elongate volume of modified polymer material at least 4 times longer than its narrowest width extending at least partially across a thickness of the polymer material, that comprises a modified form of the polymer material, that has a refractive index that is different to the general refractive index n of the polymer material from which each laser-modified track originated from. Therefore, two-dimensional ordered arrays of laser-modified tracks may be arranged with different optical properties, for example within concentric rings of substrate material, to collectively diffract incident light into a focal plane, thereby to form each diffractive microlens.

Optionally, as before when laser-modified tracks are formed within the substrate material, the modified polymer material may comprise displaced polymer chains to create periodic voids, such that selected laser-modified tracks each comprise one or more voids extending generally non-parallel to the surfaces of the polymer material. Again, the voids themselves may contribute to the change in different refractive index of the polymer material relative to the general refractive index n for the unmodified polymer material.

Therefore, in some embodiments it may be possible, or indeed preferable for production simplicity or efficiency, for the laser-modified tracks of the laser-fabricated patterns, and the laser-modified tracks of the diffractive micro lenses, to be formed concurrently in the polymer material by a beam-shaped laser. Effectively, the laser can be moved, repositioned, or refocused at different depths, or beam-shaped with multiple focusses at different depths, to generate multiple two-dimensional arrays of laser-modified tracks at different depths within the substrate material, with over-lying arrays of laser-modified tracks forming both the diffractive microlenses as well as the laser-fabricated patterns. In some embodiments, the laser-modified tracks of the diffractive microlenses and the laser-fabricated patterns are essentially the same laser-modified tracks, but with unmodified or relatively unmodified substrate remaining between the diffractive Fresnel lenses and the laser-fabricated patterns so that they can be differentiated from one another, resulting from selective beam-shaping and focusing of the laser.

In terms of the structure and configuration of the laser-modified tracks, for each laser-modified track the elongate volume of modified substrate material may optionally be at least 5 times, preferably at least 8 times, preferably at least 10 times, preferably at least 15 times, more preferably at least 20 times, longer than its narrowest width, and optionally the laser propagation path within the substrate sheet is linear, curved, or helical. The precise nature of the laser-modified track, its length, shape and configuration will depend upon the desired optical effect to the generated. In some embodiments, each laser-modified track is generated by a femtolaser, such as a femtolaser with a pulse duration in the range of 0.1 fs to 100 ps for each laser pulse, with optional beam-shaping of the femtolaser beam prior to or upon its interaction with the substrate material.

In selected embodiments, the laser beam is shaped or otherwise modified by any methods or means described herein or otherwise known in the art, in order to modify the laser beam focus. For example, such modification to the laser beam may, in selected embodiments, employ beam-shaping such that laser light incident upon the substrate is focused in a distributed manner along a laser beam longitudinal axis extending through the substrate sheet, thereby to generate laser-modified tracks in the substrate. In this way, in some embodiments each laser-modified track may be generated by a single laser pulse without need to change a focus of the laser within the substrate, or the position of the substrate relative to the laser. Accordingly, such techniques substantially obviate any need to move the laser focus and/or the substrate relative to one another in order to achieve each elongate laser-modified track. The laser-modified tracks thus generated by selected methods of may comprise an elongate volume of modified substrate material, with a tailored shape, orientation or configuration, generated by a single laser pulse by virtue of the linearly or shaped distributed focal energy of the single laser pulse within the substrate. This in itself presents significant advantages over certain laser-marking techniques of the prior art, which prior art methods typically required the substrate to intentionally move in its z-axis (closer to or away from the laser source) during exposure to the laser, relative to the laser focus, in order to generate laser markings with any degree of "depth".

Selected methods disclosed herein, which employ beam-shaping such that laser light incident upon the substrate is focused in a distributed manner along a laser beam longitudinal axis extending through the substrate sheet, also reduce the risk of manufacturing tolerances. Prior art techniques, which typically involve focussed Gaussian laser beams and laser etching or marking, may be prone to manufacturing tolerances or unintentional jitter or motion in the substrate sheet during laser exposure, especially during a continuous manufacturing process, which in turn may lead to inaccurate laser marking or improper depth allocation to such laser marking. Selected methods as herein disclosed provide a more consistent and reliable means to generate laser markings with depth and more complex configurations, including laser markings that are highly elongate such as selected laser-modified tracks described herein. By distributed focusing of laser energy in a desired, pre-selected configuration, by tailored modification of laser light prior to, upon and during interaction with the substrate, more elongate and/or more complex laser-modified tracks and track configurations in the substrate may be achieved. This in turn enables greater flexibility and tunability of optical output characteristics for the devices.

As discussed herein, the disclosed security devices may be formed in some embodiments by exposure of a sheet of substrate material such as a polymer to pulses of laser radiation. For example, short-pulsed lasers (aka ultrafast) with pulse duration in the range of 0.1 fs to 100 ps may, depending upon the laser, be particularly useful for generating appropriately high intensity radiation to form modified regions or laser-modified tracks within the polymer in a laser-modified track shape with a high aspect ratio inside of a polymer sheet. Such pulses of laser radiation are typically focussed by a lens, but a focal beam shape of the laser may be distorted and/or stretched by (1) nonlinear interaction (Kerr effect or self focus) and further elongation by substrate surface aberration when optionally passing the focusing beam first through a thick enough optical plate (e.g. 0.1-10 mm, preferably about 1 mm), with potential further surface aberration at the surface of the substrate. In any event, the depth and/or length of the resulting laser-modified track formed within the polymer substrate may be controlled by surface aberration (plate thickness and Numerical Aperture of focussed beam), and pulse energy, amongst other factors. In this way, the depth, length and potentially shape of each laser-modified track may be fine-tuned to create different optical effects. Further optical effects may be achieved, as described, by adjusting the periodicity of the laser-modified tracks, and/or by the patterning and/or periodicity of the resulting laser-modified tracks, and/or the lattice geometry and rotation of the array.

The laser-modified tracks thus formed in the substrate may be in some embodiments effectively form elongated focal lines or volumes within the substrate resulting from only part of the laser beam focussed at any longitudinal position, so there is aberrated focussing, concentrating light into a small spot diameter, but extended over lengths longer than the typical depth of focus or confocal beam parameter. Efficient propagation through transparent material may be achieved whereby a tight focus of the laser energy is produced by the lens, and elongated focus length produced in a controlled position within the substrate, with energy dissipated only when above a critical energy level, driven by nonlinear absorption in the high intensity portion of the laser beam.

Selected embodiments may also employ a laser beam with distribution of the laser light at more than one depth within the substrate sheet, such that laser-modified tracks are generated by the laser at two or more depths within the substrate. Such embodiments may be useful when generating multiple arrays of laser-modified tracks that overlap one another at different depths in the substrate, when the arrays in the substrate are viewed in plan form. Multiple 'overlapping' arrays of laser-modified tracks may further give rise to interference effects between the arrays, as described herein.

Furthermore, a single laser may be used to generate all regions of modified refractive index within the substrate sheet, such that the sheet may be moved relative to the laser to achieve each of the regions of the two-dimensional array. Alternatively, a single laser beam may be split for example by a suitable filter to apply laser radiation to multiple locations on a substrate sheet simultaneously. Alternatively, multiple lasers may be employed simultaneously or sequentially to modify the substrate sheet. Short pulses of laser radiation may be suitable to achieve suitable modification of selected substrate sheets, such as may be provided, for example, by a femto-laser as described herein.

In any of the substrate sheets disclosed, the laser-modified tracks independently from one another optionally extend within a substrate material such as a polymer sheet from 1% to 100%, preferably from 5% to 90%, of the distance between opposite surfaces of the polymer sheet. Further, in any of the substrate sheets disclosed, any voids present within the substrate sheet may independently from one another optionally extend within the substrate sheet from 5% to 100% of the distance between opposite surfaces of the substrate sheet.

The substrate material itself, in any embodiment, may have any thickness, but typically for the purposes of security documents may have an average thickness of 10-3000 µm, preferably of 50-150 µm. Moreover, where the substrate material comprises a polymer, the polymer material itself may comprise any material suitable for modification by a laser to change its refractive index or diffractive properties in any way such as, for example, polycarbonate, BOPP, BOPET, PEN, PP, PVDF or related co-polymers such as PVDF-TrFE, or Nylon-55 or 66 or other derivatives opaque or none opaque fluoropolymers, non-photo polymers, opaque or none opaque polymers film, opaque or none opaque inorganic and organic coatings etc. Moreover, the substrate material may be opaque, translucent or transparent, but in most practical embodiments is translucent or transparent to achieve desirable optical diffractive effects in combination with the microlenses.

If the laser-modified patterns comprise laser-modified tracks, each elongate volume of modified substrate material of each laser-modified track may, at least in some embodiments, be from 1-5000 nm in width on average, extending partially or entirely through the substrate material. In a two-dimensional array of laser-modified tracks, the tracks may be separated from one another by a periodicity of from 0.01 to 1000 µm, preferably 0.05-10 µm, more preferably 0.1-5 µm, on average by the material of the unmodified polymer. In any event, in selected embodiments the laser-fabricated patterns, or if present the laser-fabricated sub-patterns, may comprise arrays of laser-modified tracks in the polymer material that have different periodicities, lengths, shapes or orientations compared to the laser-modified tracks of at least one other laser-fabricated pattern or sub-pattern, such that the optical diffractive emissions from different laser-fabricated patterns or sub-patterns differ from one another, when the same or equivalent incident light concurrently impinges upon thereupon.

Furthermore, depending upon the optical effect to the achieved, at least one array of laser-modified tracks may comprise laser-modified tracks that are one or more of: continuous within the polymer material; discontinuous within the polymer material; parallel or non-parallel to one another; extend perpendicular to the array of microlenses or to a focal plane thereof; extend non-perpendicular or oblique to the array of microlenses or to a focal plane thereof; and linear, non-linear or helical.

In other embodiments, the optical devices comprise laser-fabricated patterns and/or sub-patterns at different depths relative to one another and the array of microlenses, or relative to a focal plane of the microlenses. In other embodiments a first array of laser-fabricated patterns may at least partially overlie a second array of laser-fabricated patterns in the optical device, relative to the array of microlenses, when the optical device is viewed in plain view thereof. In this way the optical output of two or more arrays of laser-fabricated patterns may be additively or subtractively combined. For example, the optical diffractive output of one of the first and second arrays may be further diffracted by the other of the first and second arrays, when the substrate sheet is exposed to incident light. Alternatively, the optical diffractive output of the first and second arrays, when viewed concurrently, may exhibit an interference or diffractive optical effect, such as Littrow configuration or grating layers aligned on Talbot self imaging planes.

For such embodiments, for simplicity, efficiency, accuracy or convenience of manufacture, overlapping arrays of laser-fabricated patterns at different depths within the polymer material relative to the microlenses, or relative to a focal plane thereof, may optionally be formed concurrently by single laser pulses with laser energy distributed along a laser beam longitudinal axis extending through the polymer material focussed sequentially or concurrently at different depths within the substrate sheet corresponding to the desired depths of the laser-fabricated patterns.

In any of the embodiments disclosed, the optical device may optionally further comprise a further periodic array of microlenses on a side of the periodic array of distinct laser-fabricated patterns opposite to the periodic array of microlenses, such that the periodic array of distinct laser-fabricated patterns extends within the device between the periodic array of microlenses and the further periodic array of microlenses, wherein the array of laser-fabricated patterns, together with the further periodic array of microlenses, collectively provide a further optical effect from at least one side of the optical device, and optionally from a side of the optical device nearest the further periodic array of microlenses. In this way, the device may effectively comprise a "sandwich" of three or more arrays, with an array of laser-fabricated patterns sandwiched (albeit optionally spaced) between two arrays of microlenses on either side thereof. Optionally, in selected embodiments, the optical effect and/or the further optical effect are influenced by both of the periodic array of microlenses and the further periodic array of microlenses.

In still further embodiments there is provided an optical device comprising: two or more periodic arrays of distinct laser-fabricated patterns, wherein in each periodic array the patterns are the same or different from one another, and each pattern comprises a periodic array of continuous or non-continuous laser-modified tracks in a substrate material, such as a polymer substrate material; wherein the patterns overlie one another to provide an optical effect such as, for example, a moiré effect. Notably, such embodiments may produce an optical effect in the absence of an array of microlenses, although an array of microlenses may optionally be additionally present to alter or enhance the optical effect. Accordingly, the multiple arrays of laser-fabricated patterns overlying one another, and their positioning relative to one another, in itself can generate a device with interesting optical properties. Any of the embodiments and definitions relevant to such embodiments, or disclosed herein, or encompassed by the limitations of dependent claims, or any of the methods for fabrication of laser-fabricated patterns, may be applied to such embodiments that do not necessarily comprise an array of microlenses, or which comprise an additional array of laser-fabricated patterns in replacement of, or in addition to, an array of microlenses. Accordingly, in any embodiment herein described that includes an array of microlenses, the microlenses may optionally, and in the alternative, be substituted by a periodic array of laser fabricated patterns that may or may not exhibit lensing effects.

Further embodiments provide a use of any optical device as herein described as a security feature of a security document, or as a security document.

Further embodiments provide a security document comprising or consisting of, as a security feature, any optical device as herein described.

In yet further embodiments there is provided a diffractive Fresnel lens that comprises a polymer material, with one or more diffractive features in the polymer material, to change a refractive index of at least portions of the polymer material, thereby to form the diffractive Fresnel lens. For example, in some embodiments the diffractive features are the same or different from one another, and each individual feature is selected from a two-dimensional periodic array of continuous or non-continuous laser-modified tracks in the polymer material, a diffraction grating or a photonic crystal. Preferably the laser-modified tracks, diffraction gratings, or photonic crystals have different refractive indices relative to one another, or groups of them have different refractive indices relative to one another, thereby to enable the diffractive properties of the formed Fresnel lens.

In further embodiments the Fresnel lens may comprise or consist of a plurality of laser-modified tracks formed in the polymer material by a beam-shaped femtolaser. In still further embodiments the Fresnel lens may comprise concentric rings of the polymer material, each containing a two-dimensional array of laser-modified tracks in the polymer material, with adjacent rings having differing refractive indices or diffractive properties from one another caused by differences in a configuration, periodicity, shape, or orientation of the laser-modified tracks in each ring, thereby to form the diffractive Fresnel lens in the polymer material.

In further embodiments the diffractive features of the diffractive Fresnel lens do not necessarily provide a conventional lensing effect, but induce the desired optical effect when combined with a second or more layers of laser modification tracks. For example, in some embodiments, the diffractive features in the two or more layers are the same or varying, and in accordance with their relative alignment, will produce the optical effects, for example, a moiré effect.

The following examples describe selected embodiments relating to the security devices, optical features, and substrate sheets disclosed herein, their production and use. These are provided for illustrative purposes only and are in no way intended to be limiting to the subject matter and scope of the invention, nor the appended claims.

EXAMPLES

Example 1: Presentation of Alternative Embodiments Via Schematic Illustrations (FIG. 1-7)

Figure 1:
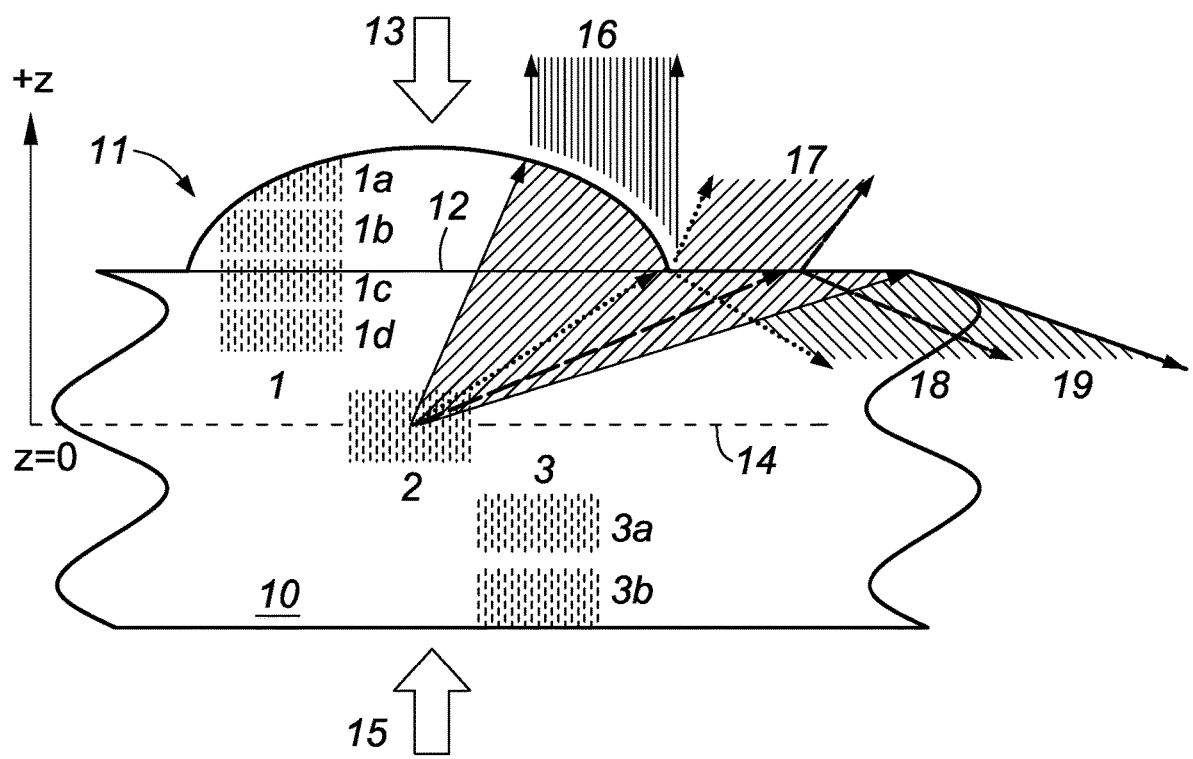
FIG. 1: illustrates schematically embodiments of an optical device in cross-section, that comprise a refractive microlens and laser-fabricated patterns or structures, showing various positioning options for the patterns or structures. They include those shown above the focal plane of the microlenses (1a, 1b, 1c, 1d) with those at 1a penetrating through the microlens surface, those at 1b completely embedded in the lens, those at 1c partially in the lens and partially in the substrate, and those at 1d completely embedded in the material of the substrate. Those at 2 are located at or across the focal plane of the microlenses, whereas those at 3 are located below the focal plane, with those at 3a are completely embedded in the substrate and those at 3b penetrating through the surface of the substrate. Each laser-fabricated pattern of structure can be any of the following: i(a) continuous or (b) non-continuous/multilayer perpendicular to a substrate surface, ii(a) continuous or (b) non-continuous/multilayer slanted or oblique relative to a substrate surface, or alternatively to laser-fabricated patterns may be iii photonic crystals or other structures.

FIG. 1 schematically illustrates a cross-sectional view of a portion of an optical device as disclosed herein, showing various embodiments. Substrate 10 shown in cross-section comprises for example a polymer substrate material. Integral with or adhered to substrate 10 are microlenses, with only one microlens 11 shown in FIG. 1 for simplicity, again in cross-section. Boundary 12 may represent a region of adherence of microlens 11 to substrate 10, or alternatively boundary 12 may be non-existent for embodiments in which the microlenses are integral with, and comprised of the same substrate material, as the substrate 10. Incident light 13 that enters microlens 11 is focused by microlens 11 generally into focal plane 14, marking an axial position z=0 for laser beam propagation along the +z 10 or −z axis 13. Incident light 15 may also enter the substrate 10 on a side thereof opposite microlens 11.

FIG. 1 further illustrates various positions for arrays of laser-fabricated patterns, shown generally at 1, 2, and 3, each at a different "depth" in the substrate relative to the surfaces of the substrate material and/or the microlenses. In each case the patterns are shown as a multiplicity of vertical dashed lines schematically indicating the presence of arrays of discontinuous laser-modified tracks. However, this is for illustrative purposes only. Such patterns each may constitute any form of laser-modified pattern or structure, single or multi-layer laser-modified tracks, filaments or non-filament gratings either perpendicular or non-perpendicular to a surface of the substrate or to the focal plane of the microlenses. Alternatively, such laser-modified patterns or structures may comprise diffraction gratings or photonic crystals. In selected embodiments the laser-modified patterns or structures are three-dimensional in terms of their structure within the substrate material, rather than two-dimensional.

Arrays of laser-fabricated patterns shown generally as 1 in FIG. 1 include four examples of differently positioned options for the patterns as 1a, 1b, 1c and 1d. Pattern 1a is located at or close to a surface of microlens 11 and includes portions that penetrate the surface of microlens 11. Pattern 1b is completely embedded within microlens 11 but extends entirely between an exterior surface of microlens 11 and boundary 12. Pattern 1c straddles boundary 12 such that the pattern is partially within microlens 11 and partially within substrate 10, but remains clear of focal plane 14. Pattern 1d is completely embedded within substrate 10 but also remains clear of focal plane 14.

Pattern 2, however, embedded within substrate 10, straddles focal plane 14. As illustrated with respect to pattern 2, incident light 13 (and optionally 15) undergoes diffraction by pattern 2 such that at least some of several resulting diffractive light paths may be generated. For example, a portion of the diffracted light may be diffracted back through the microlens at 16, for possible observation by an observer. Another portion of the diffracted light may exit the optical device away from or adjacent microlens 11 at 17, with partial transmission away from an observer's eyes. Another portion of the diffracted light may undergo partial internal reflection at 18, at a surface of the substrate near to the microlens 11, whereas yet another portion of the diffracted light may undergo total internal reflection 19 at the same surface. The degrees of diffraction, emission angles, and degrees of internal reflection will depend upon the nature of the incident light and the properties and positioning of the laser-fabricated patterns within the microlenses and substrate material present.

Figure 2:
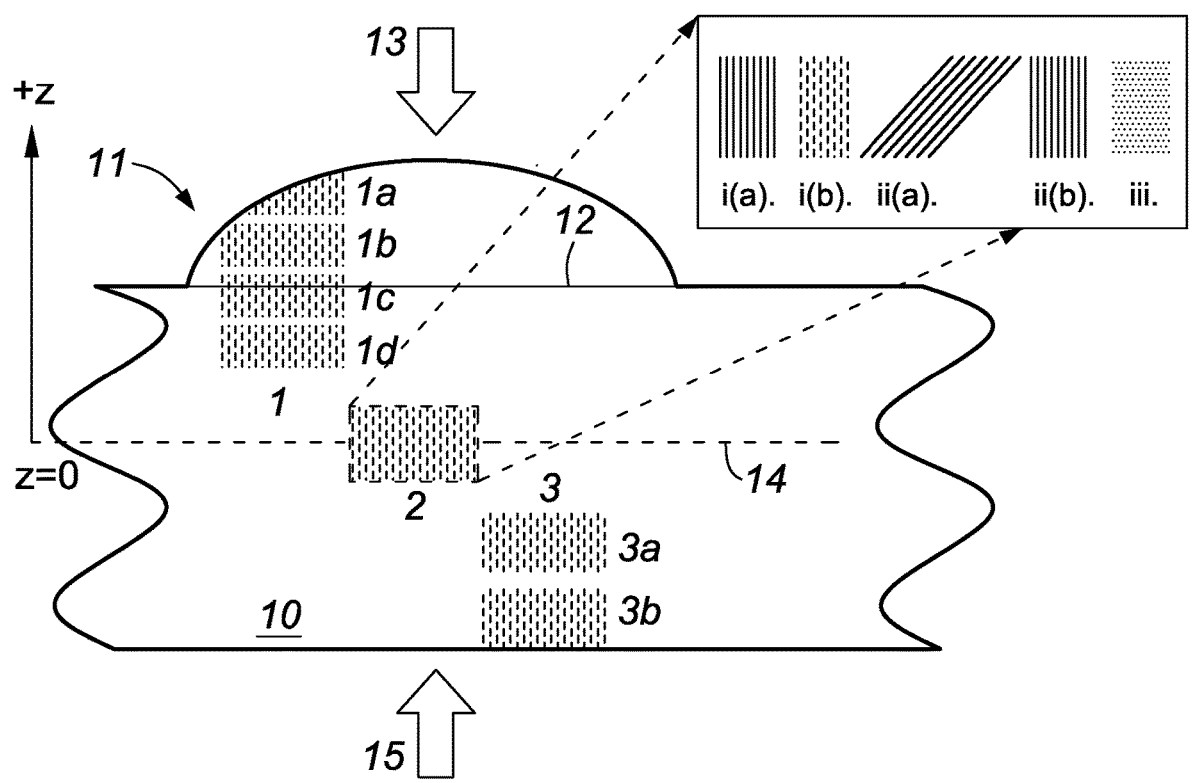
FIG. 2: illustrates schematically embodiments of an optical device in cross-section, that comprises a refractive microlens and laser-fabricated patterns or structures, illustrating various options for positioning and types of patterns or structures within the laser fabrication volume. They include those shown above the focal plane of the microlenses (1a, 1b, 1c, 1d) with those at 1a penetrating through the microlens surface, those at 1b completely embedded in the lens, those at 1c partially in the lens and partially in the substrate, and those at 1d completely embedded in the material of the substrate. Those at 2 are located at or across the focal plane of the microlenses, whereas those at 3 are located below the focal plane, with those at 3a are completely embedded in the substrate and those at 3b penetrating through the surface of the substrate. Each laser-fabricated pattern of structure can be any of the following: i(a) continuous or (b) non-continuous/multilayer perpendicular to a substrate surface, ii(a) continuous or (b) non-continuous/multilayer slanted or oblique relative to a substrate surface, or alternatively to laser-fabricated patterns may be iii photonic crystals or other structures.

FIG. 2 also schematically illustrates a cross-sectional view of a portion of an optical device as disclosed herein, showing various embodiments in accordance with FIG. 1. However, further options are shown with respect to the nature of the laser-fabricated patterns. For ease of illustration such options are presented with regard to pattern 2, but may apply partially or completely to any of the patterns shown in the figure. The inset option of FIG. 2 shows an enlargement of pattern 2 showing various options for the three-dimensional structure of the pattern. Option i(a) illustrates a cross-section through an array of continuous laser-modified tracks or a non-filament diffraction grating as herein defined, whereas option i(b) illustrates a cross-section through an array of discontinuous or multi-layered laser-modified tracks or non-filament diffraction gratings. For such options, the filaments or gratings extend generally perpendicular to focal plane 14. However, in options ii(a) and ii(b) the laser-modified tracks or diffraction gratings extend non-perpendicular to focal place 14. Option ii(a) illustrates in cross-section a single array of continuous laser-modified tracks or diffraction gratings extending obliquely to the focal plane 14. Option ii(b) in contrast illustrates a cross-section through an array of discontinuous or multi-layered laser-modified tracks or non-filament diffraction gratings extending obliquely to the focal plane 14. Option iii illustrates a cross-section though a pattern of multi-layered laser-modified tracks, wherein the track lengths are shortened to facilitate close packing density of the layers (i.e., small c period, vertically). The 2D patterns in i(b), ii(b), and iii comprise photonic crystal structure with different symmetry, elongation, and periodicity options. Moreover, periodic patterning on the third dimension (perpendicular to the image) is an option for certain embodiments to convey or simulate a 3D photonic crystal structure.

Figure 3:
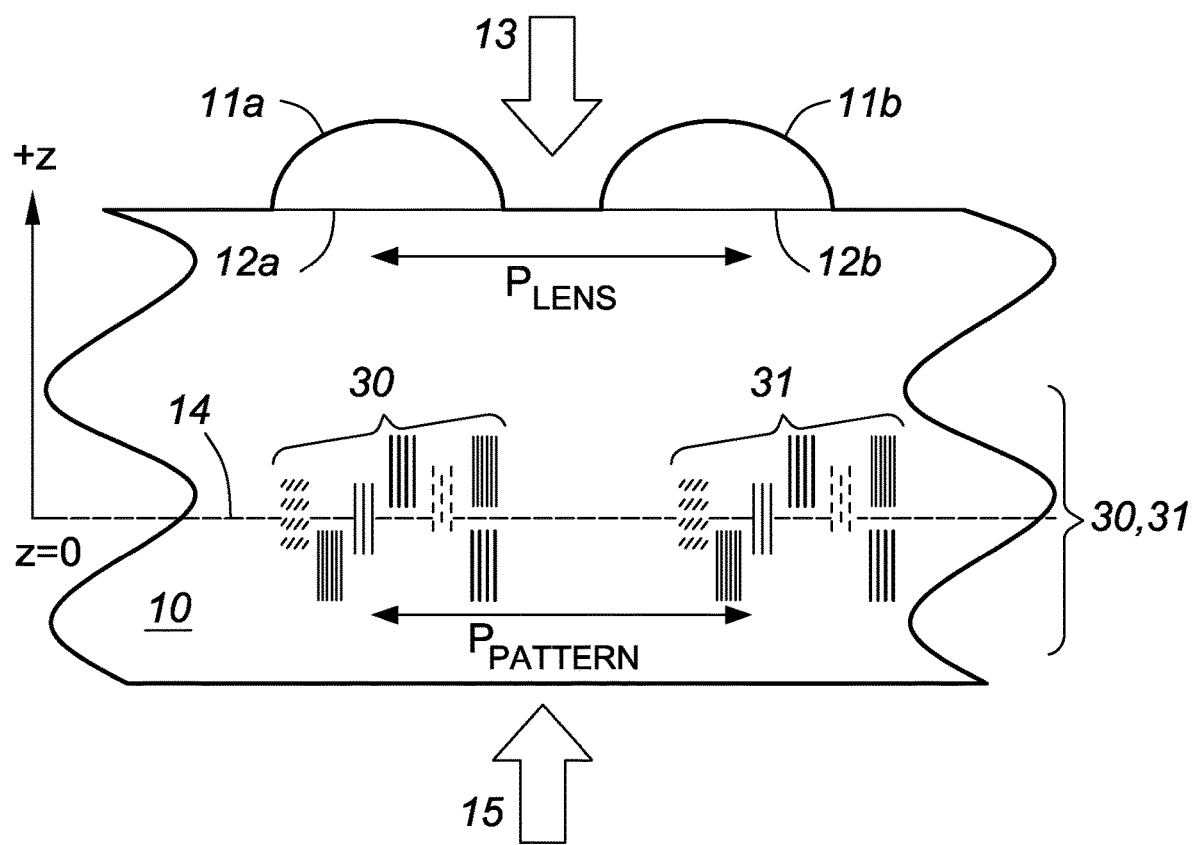
FIG. 3: illustrates schematically an embodiment of an optical device in cross-section, that comprises refractive microlenses and laser-fabricated patterns or structures operatively associated with one another. $P_{PATTERN}$=XX % OF $P_{LENS}$ Each sub-pattern of the laser-fabricated patterns can be any of the following non-limiting group: i. arrays of continuous or non-continuous laser modified tracks perpendicular to the substrate surface; ii. arrays of continuous or non-continuous laser modified tracks slanted or oblique relative to the substrate surface; iii. in the alternative photonic crystals or other structures; and iv. combinations of any of i. to iii.

FIG. 3 also schematically illustrates a cross-sectional view of a portion of an optical device as disclosed herein, showing various embodiments in accordance with FIG. 1. However, for illustration of the embodiment shown, two microlenses 11a and 11b are illustrated, each with a boundary 12a and 12b respectively with substrate 10. FIG. 3 illustrates the variability with which patterns may be fabricated within substrate 10 to achieve certain optical effects. For example, FIG. 3 illustrates how a single pattern such as 30 or 31 may comprise a multiplicity and a variety of different sub-patterns that may be at any position within the substrate relative to one another, and which may have different structures or configurations relative to one another. Each of pattern 30 and 31 as illustrated comprises sub-patterns at different "depths" within the substrate relative to the microlenses, such that some patterns may extend within the substrate between microlenses 11a, 11b and focal plane 14, others may extend within the substrate between focal plane 14 and a surface of the substrate opposite the microlenses, while still others may extend across the focal plane 14 ($z=0$). Moreover, the sub-patterns as illustrated for patterns 30 and 31 each comprise a variety of structures for example in accordance with those described as options i(a), i(b), ii(a), ii(b), and iii with respect to FIG. 2.

In FIG. 3, patterns 30 and 31 are illustrated as identical to one another in terms of their overall structure. However, further embodiments encompass an optical device with arrays of laser-modified patterns that are different from another within the same array to achieve certain optical effects. Further, in FIG. 3 pattern 30 is illustrated 'beneath' microlens 11a, whereas pattern 31 is illustrated 'beneath' microlens 11b. The periodicity, positioning, offset, structure and substructure of the patterns within a two-dimensional array of such patterns, relative to a periodicity, position and properties of the two-dimensional array of microlenses, may also determine the resultant optical effect including but not limited to one or more of: moiré effects, float effects, sink effects, depth effects, motion effects, colour change effects, and emission angle effects upon the laser-fabricated patterns. A further embodiment recognizes the illustrated patterns appearing separated in two layers (i.e., $z_1 \neq z_2$) may be positioned to be partially or fully overlapping, influencing the diffractive properties of the combined patterns.

Figure 4:
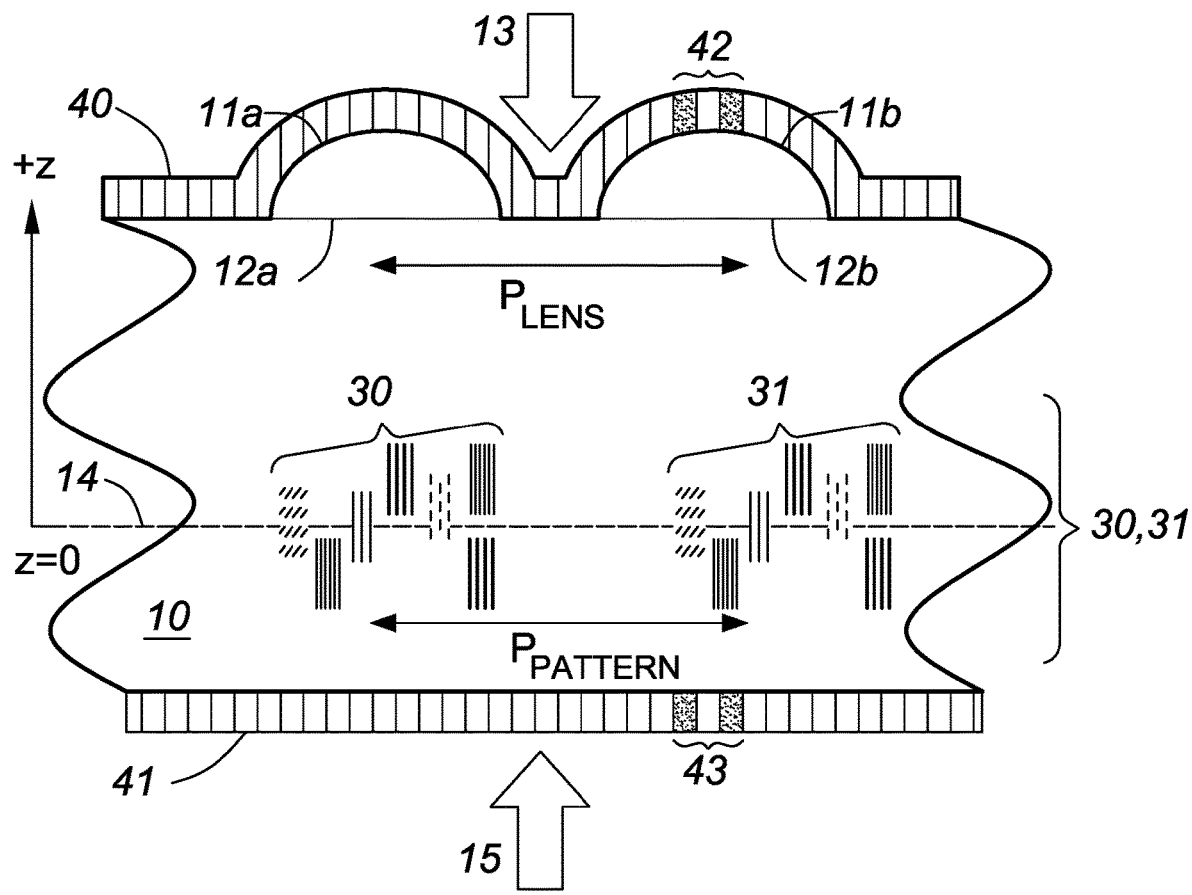
FIG. 4: illustrates schematically an embodiment of an optical device in cross-section, that comprises refractive microlenses and laser-fabricated patterns or structures operatively associated with one another, together with metalized surface layers optionally containing patterned features therein. $P_{PATTERN}$=XX % OF $P_{LENS}$ Each sub-pattern of the laser-fabricated patterns can be any of the following non-limiting group: i. arrays of continuous or non-continuous laser modified tracks perpendicular to the substrate surface; ii. arrays of continuous or non-continuous laser modified tracks slanted or oblique relative to the substrate surface; iii. In the alternative photonic crystals or other structures; and iv. combinations of any of i. to iii.

FIG. 4 schematically illustrates a cross-sectional view of a portion of an optical device as disclosed herein, showing various embodiments corresponding to FIG. 3. In addition to FIG. 3, however, FIG. 4 illustrates the option to add metalized surface layers to the optical device. Metalized surface layer 40 overlays microlenses 11a, 11b as well as substrate surface therebetween. Metalized surface layer 41 overlays a surface of the substrate opposite microlenses 11a, 11b. Either or both of metalized surface layers, where present, may optionally include laser patterns or markings shown as 42 and 43 for layers 40, 41 respectively. Each metalized surface layer may comprise any metals or combination of metals, such as those selected from the following non-limiting group: Al, Cr, Cu, Ni, Ag and Au. Moreover, each metalized surface layer, where present, may be opaque, translucent or transparent to incident light and/or diffracted or reflected light, as required for the optical effect. In addition, in some embodiments the laser marks provide further modification of the optical properties, for example, to improve transmission and/or to reduce reflection with the laser opening of a void partially or fully through the film layer. The collective optical response from the laser patterns provides additional avenues for generating diffractive and interference effects accorded by the relative size, arrangement, and periodicity of the laser patterns.

Figure 5:
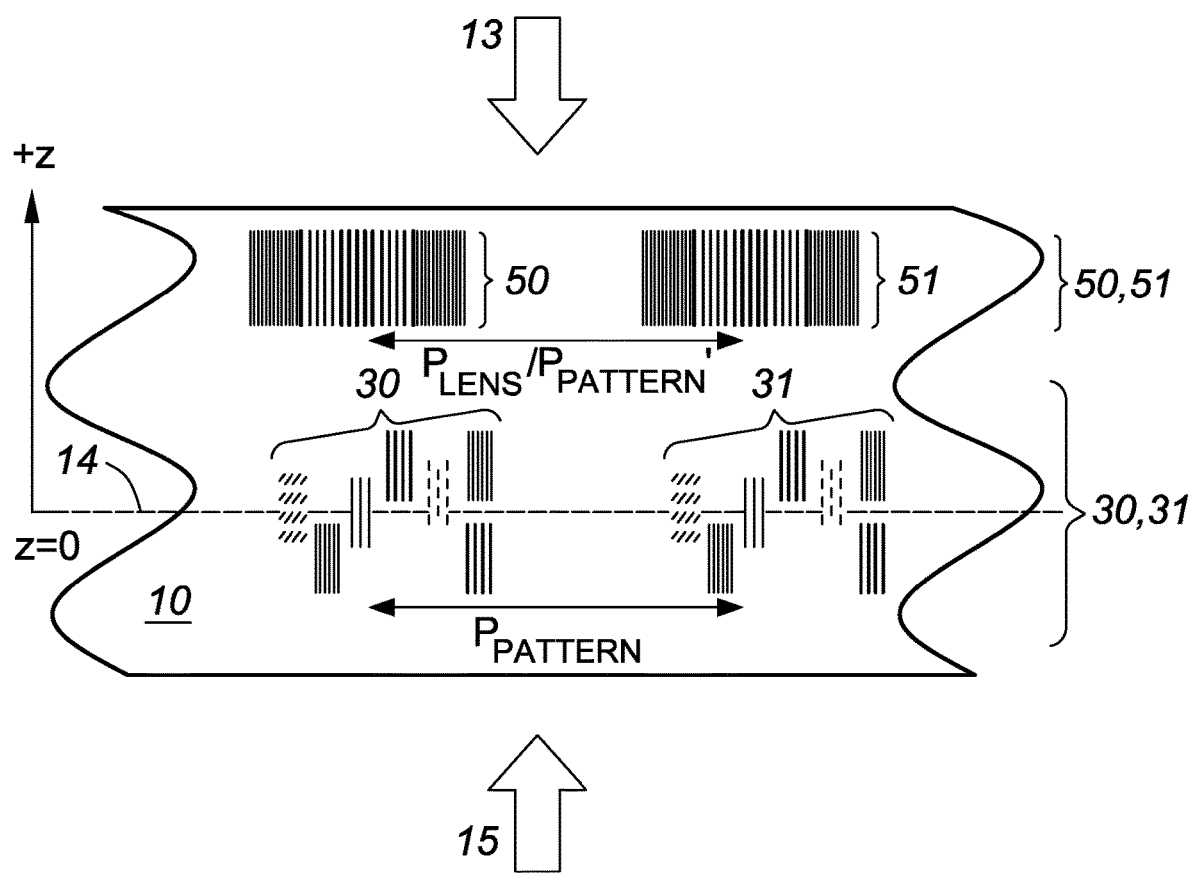
FIG. 5: illustrates schematically an embodiment of an optical device in cross-section, that comprises diffractive optical microlenses and laser-fabricated patterns or structures operatively associated with one another. $P_{PATTERN}$=XX % OF $P_{LENS}$ Each sub-pattern of the laser-fabricated patterns can be any of the following non-limiting group: i. arrays of continuous or non-continuous laser modified tracks perpendicular to the substrate surface; ii. arrays of continuous or non-continuous laser modified tracks slanted or oblique relative to the substrate surface; iii. In the alternative photonic crystals or other structures; and iv. combinations of any of i. to iii.

FIG. 5 schematically illustrates a cross-sectional view of a portion of an optical device as disclosed herein, showing various embodiments corresponding to FIG. 3. Substrate 10 thus comprises patterns 30, 31 each comprised of various diffractive sub-patterns within the substrate. However, in contrast to FIG. 3 the device does not include refractive microlenses that protrude from a surface of the device. Instead, the device illustrated in FIG. 5 includes diffractive periodic patterns (with periodicity $P_{pattern}$) or diffractive microlenses (with periodicity $P_{lens}$) 50 and 51 each generally shown in cross-section.

For example, in the case of employing diffractive microlenses, radial chirping of the grating period from large period (at centre) to smaller period (on outside perimeter) anticipates formation of a Fresnel microlens 50, 51. In a top view (not shown), the Fresnel microlens may comprise generally of circular arrays of laser-modified tracks arranged in concentric rings, with each concentric ring of each Fresnel lens comprising alternative laser-modified tracks or laser-modified track arrangements (e.g. in terms of position, periodicity, length etc.) so that each concentric ring of laser-modified tracks has a different diffractive or refractive index compared to adjacent concentric rings of laser-modified tracks within each microlens 50, 51.

In another embodiment, the patterning of the diffractive microlenses 50,51 does not entail formation of a conventional lensing effect, and yet provides a beam steering effect, for example, by sinusoidal or saw-tooth chirping of the diffractive elements in a way that generates the desired optical effects when combined with the laser modification pattern 30, 31.

Therefore, laser modification of the substrate 10, to introduce laser-modified tracks in the arrangement illustrated and described, enables fabrication of an array or arrays of laser-modified tracks that collectively form a diffractive pattern or Fresnel lens embedded within the substrate 10, which collectively define focal plane 14 about which patterns 30, 31 are arranged. In another embodiment of the diffractive microlens 50, 51, the grating periodicity may chirp laterally in sinusoidal oscillation that further provides a focusing or imaging effect, where in the chirp period and chirp amplitude control an effective focal length of each chirp zone. Selected embodiments thus provide using one- and two-dimensional chirping of diffractive optical layers to provide 1D and 2D arrays of imaging or focusing microlenses, akin to a cylindrical lens array and a spherical lens array, respectively.

In a similar manner to the arrangement illustrated with respect to FIG. 3, pattern 30 is illustrated 'beneath' diffractive pattern or Fresnel microlens 50, whereas pattern 31 is illustrated 'beneath' diffractive pattern or Fresnel microlens 51. The periodicity, positioning, offset, structure and substructure of the patterns within a two-dimensional array of such patterns, relative to a periodicity, position and properties of the two-dimensional array of diffractive pattern or Fresnel microlenses, may also determine the resultant optical effect including but not limited to one or more of: moiré effects, float effects, sink effects, depth effects, motion effects, colour change effects, and emission angle effects upon the laser-fabricated patterns.

Figure 6:
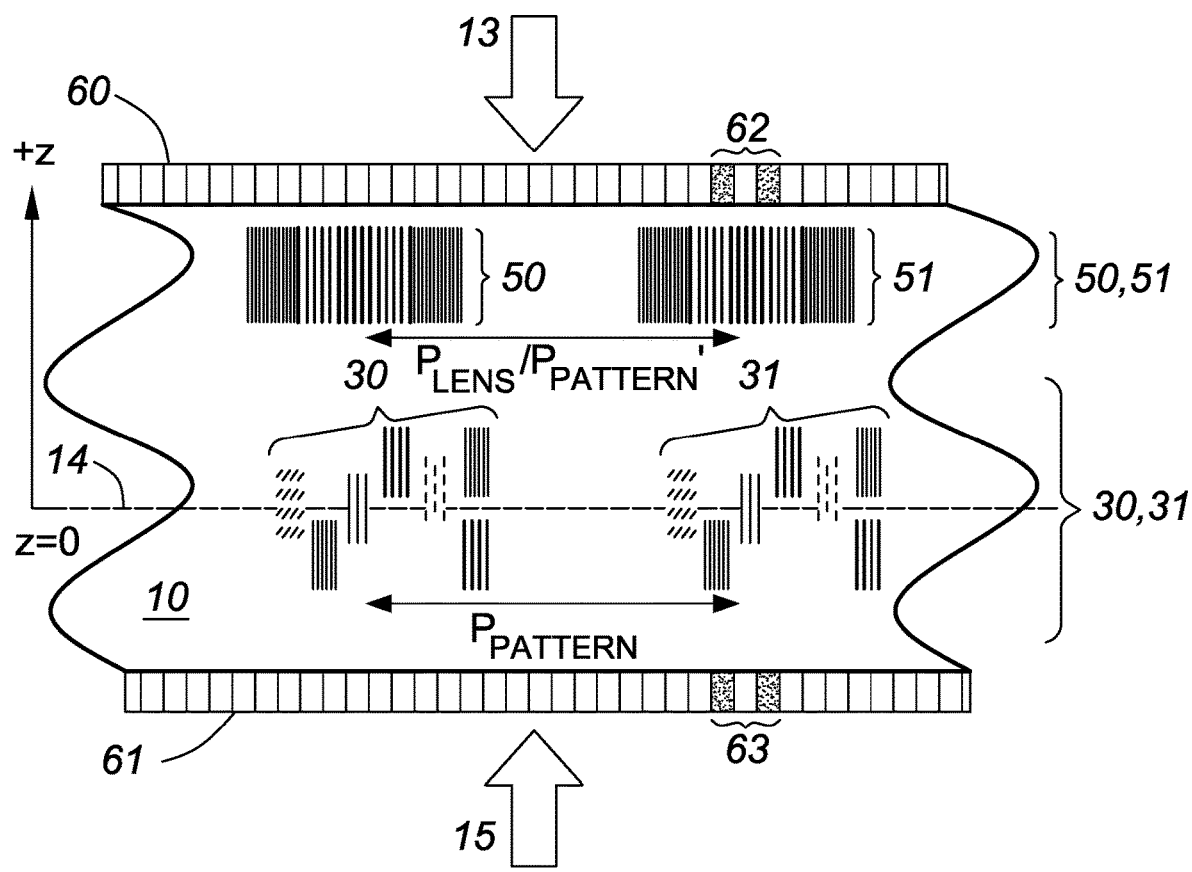
FIG. 6: illustrates schematically an embodiment of an optical device in cross-section, that comprises diffractive optical microlenses and laser-fabricated patterns or structures operatively associated with one another, together with metalized surface layers optionally containing patterned features therein. $P_{PATTERN}$=XX % OF $P_{LENS}$ Each sub-pattern of the laser-fabricated patterns can be any of the following non-limiting group: i. arrays of continuous or non-continuous laser modified tracks perpendicular to the substrate surface; ii. arrays of continuous or non-continuous laser modified tracks slanted or oblique relative to the substrate surface; iii. In the alternative photonic crystals or other structures; and iv. combinations of any of i. to iii.

FIG. 6 schematically illustrates a cross-sectional view of a portion of an optical device as disclosed herein, showing various embodiments corresponding to FIG. 5. In addition to FIG. 5, however, FIG. 6 illustrates the option to add metalized surface layers to the optical device. Metalized surface layer 60 overlays a surface of substrate 10 adjacent diffractive patterns or Fresnel microlenses 50, 51. Metalized surface layer 61 overlays a surface of the substrate generally opposite diffractive patterns or Fresnel microlenses 50, 51. Either or both of metalized surface layers, where present, may optionally include laser patterns or markings shown as 62 and 63 for layers 60, 61 respectively. Each metalized surface layer may comprise any metals or combination of metals, such as those selected from the following non-limiting group: Al, Cr, Cu, Ni, Ag and Au. Moreover, each metalized surface layer, where present, may be opaque, translucent or transparent to incident light and/or diffracted or reflected light, as required for the optical effect.

Although not illustrated in any of FIGS. 1 to 6, each optical device, or each two-dimensional array of each optical device, may comprise a combination of refractor-type microlenses (as illustrated schematically for example in FIGS. 1 to 4) and diffractor-type patterns including but not limited to Fresnel microlenses (as illustrated schematically for example in FIGS. 5 and 6). For example, different areas of an optical device, or different areas of a two-dimensional array of microlenses, may include different types of microlenses as required. Other portions of an optical device, or other portions of a two-dimensional array of microlenses, may comprise both refractor-type microlenses (as illustrated schematically in FIGS. 1 to 4) and diffractor patterns including but not limited to Fresnel microlenses (as illustrated schematically in FIGS. 5 and 6) in operative association with one another such that the optical input and/or output from the optical device is dependent upon both types of refractor-type or diffractor-type elements present.

Figure 7:
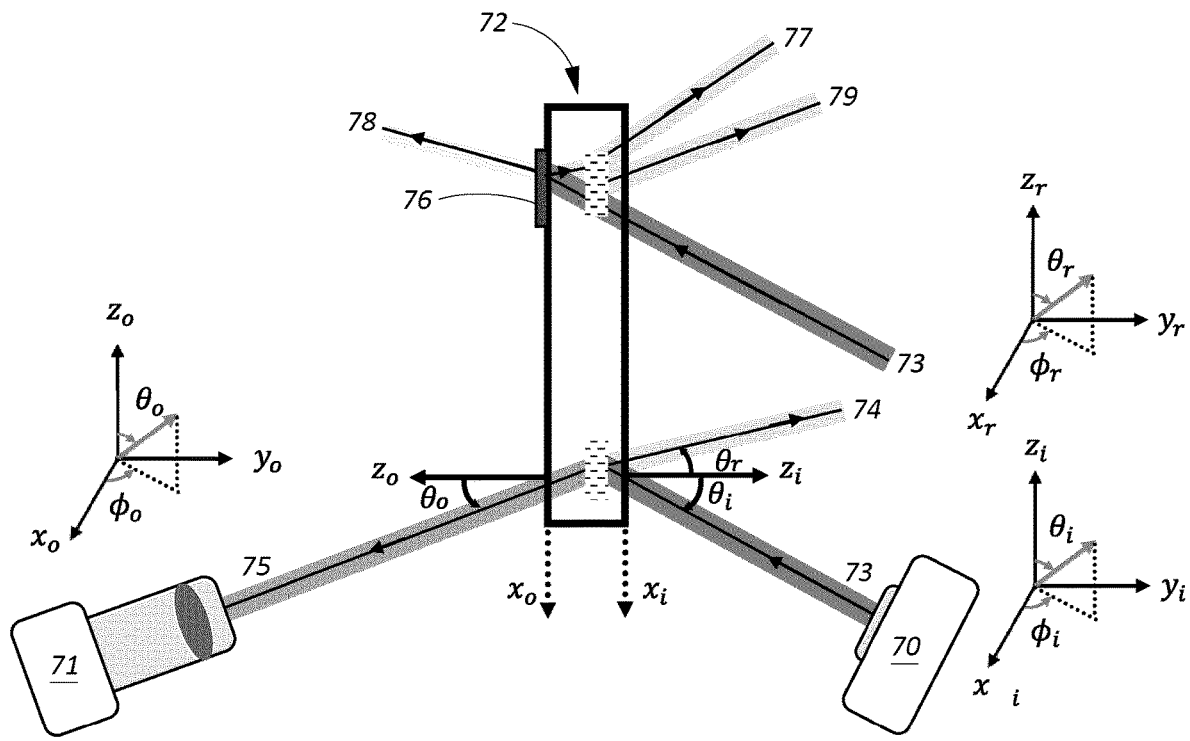
FIG. 7: illustrates schematically one embodiment for collimated illumination of an optical device in cross-section, that comprises an external optical beam illuminating an internal laser-fabricated pattern or structure, and undergoing diffraction into transmitted or reflected beams that are detected externally, with incident and diffracted angles, and with or without internal reflection from a metalized surface layer.

FIG. 7 schematically illustrates optical light pathways through an optical device 72 comprising laser fabricated patterns or features (not shown for simplicity), for illumination and observation of various optical effects. In FIG. 7 (lower portion), illumination system 70 comprises a light source that may include but is not limited to sunlight, incandescent or fluorescent light sources, lasers, displays, and LEDs, and combinations thereof. The light source can optionally be collimated or uncollimated. The observation system 71 as shown includes but is not limited to the human eye, any imaging system, including cameras and corresponding optical systems. The optical device 72 is any device or feature as herein described, optionally comprising a combination of the lensing and diffractive devices illustrated for example in FIGS. 1 to 6. The irradiation (arrows 73) from illumination system 70 irradiates the optical device 72 at a variety of irradiation angles described by incident angle $\theta_i$ or azimuthal angle $\phi_i$. Aside from Fresnel reflections at the interfaces of the optical device, a portion of the incident light rays are reflected by diffraction (arrows 74) from the laser fabricated pattern, leaving the optical device 'backwards' at angles $\theta_r$ and $\phi_r$. The other part of the illumination irradiation 73 may be transmitted on 'forward' diffraction (arrow 75) through the optical device 72 for example at a laser fabricated pattern in the device, leaving the sample second surface at angles of $\theta_o$ and $\phi_o$ for a particular order of diffraction, and that may include multiple beams dependent on the periodicity of the diffracting optic and the wavelength of light as known to those of skill the art. As illustrated, the observation system 71 (e.g. an imaging camera with lens) receives radiation 75 as an observed optical effect from the optical device, by collecting the light 75 transmitted by one diffraction order through the optical device. The anticipated optical effects are, for example, assisted by the presence of a lens array or lens array, or diffractive optical lens or lens array or diffractive layer, as described for example with respect to the various embodiments shown in FIGS. 1-6. However, the lensing devices are not illustrated in FIG. 7 to simplify the schematic. It is further understood that the optical effects provided by the optical device 72 may be observed in reflection from the diffractive modification layer (e.g. laser modified tracks) by placing the camera, or optical sensor, or eye in alignment with the reflected beam (arrow 74). The relation of angles normal to surface ($\theta_i$, $\theta_o$, $\theta_r$) and the azimuthal angles ($\phi_i$, $\phi_o$, $\phi_r$) are defined according to the cartesian xyz coordinate axes, as given in FIG. 7.

In a further embodiment shown in FIG. 7 (upper portion), alternative illumination and diffraction pathways through the optical device 72 are illustrated, with the optical device hosting a metalized reflection coating 76 on a surface opposite from the illumination source. The metalized surface layer serves as a strong or partial reflector, permitting a further variety of reflection and/or transmission paths (arrows 77 and 78 respectively) to induce the optical effects in combination with lens arrays. The coating 76 may further serve as a spectral filter, with reflection, transmission, and polarization properties varying with the spectrum of light, controlled by the material and thickness of the metallic coating or coatings. In one embodiment, a portion of illumination light 73 entering the optical device undergoes diffractive reflection in the laser fabricated pattern, emerging as a diffracted external light beam (arrow 79). Another part of the incident light passes by diffraction through the fabricated laser pattern, resulting in a partially transmitted beam (arrow 78) akin to the beam 75, or reflecting from the metalized surface layer to return and diffract through the laser fabricated pattern of or within the device to emerge as a reflected beam 77. In this latter way, the light passes twice through (see 73 and 77) the laser fabricated pattern. It is understood that, in some embodiments, the diffraction by the optical device may include many orders of interference, in two dimensions, and that zero-order diffraction is also anticipated.

Example 2: Beam Delivery Systems

Figure 8:
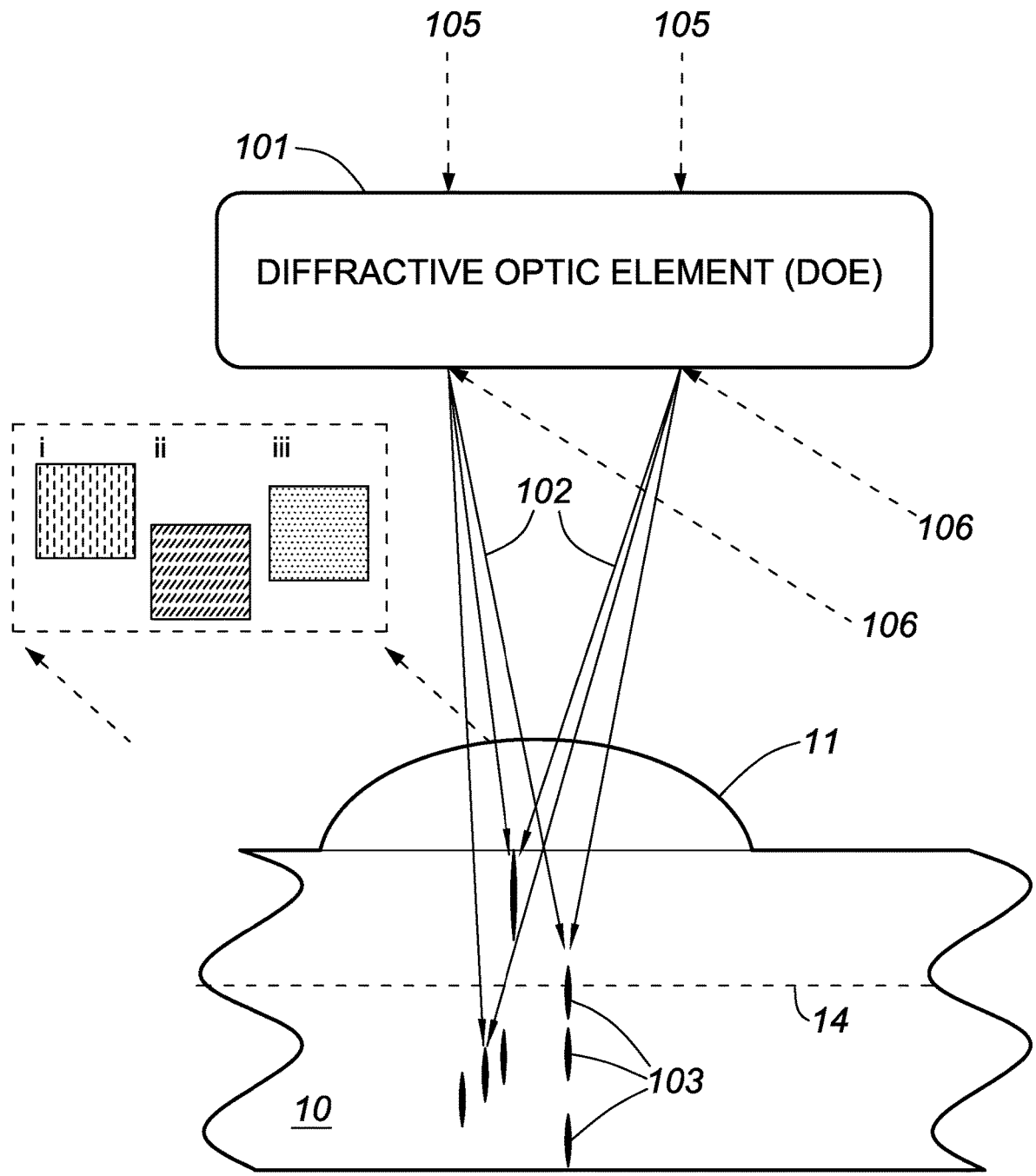
FIG. 8: schematically illustrates a beam delivery arrangement for modification of a femtolaser beam shape by a reflective or transmissive diffractive optic element (DOE) in order to control the focal shape of a single pulse inside of an optically transparent substrate or film, or to further separate the single pulse into multiple focal spots, each with a control shape and to facilitate parallel fabrication of diffractive optical elements with controllable positions and patterns (inset i, ii, and iii) in the substrate.
Figure 9:
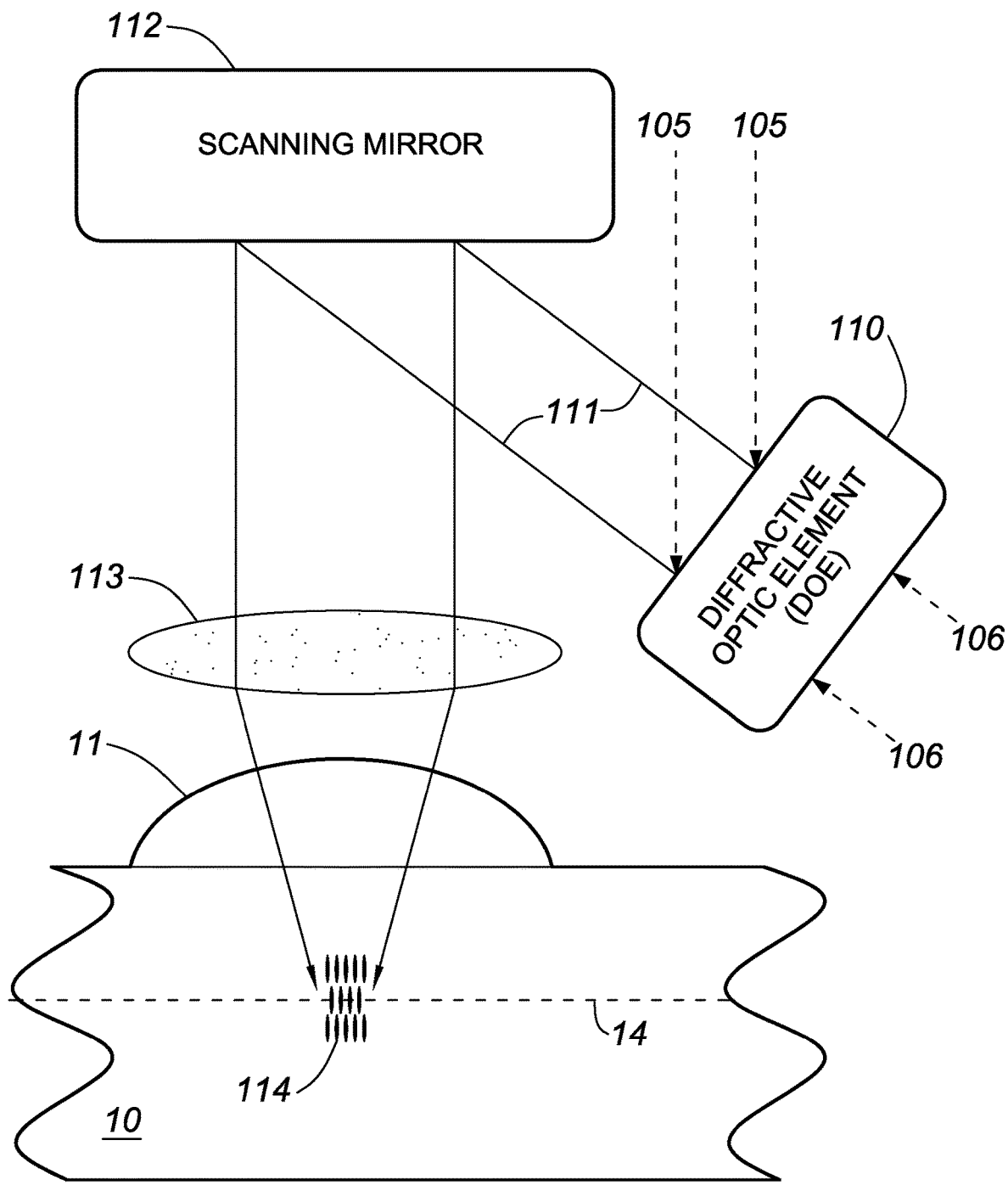
FIG. 9: schematically illustrates a femtolaser beam delivery arrangement combining laser beam shaping by a reflective or transmissive diffractive optic element (DOE) with a scanning mirror (e.g. galvanometer) for facilitating high-speed and parallel fabrication of laser-modified tracks or other forms of laser modification inside of a transparent substrate material.
Figure 10:
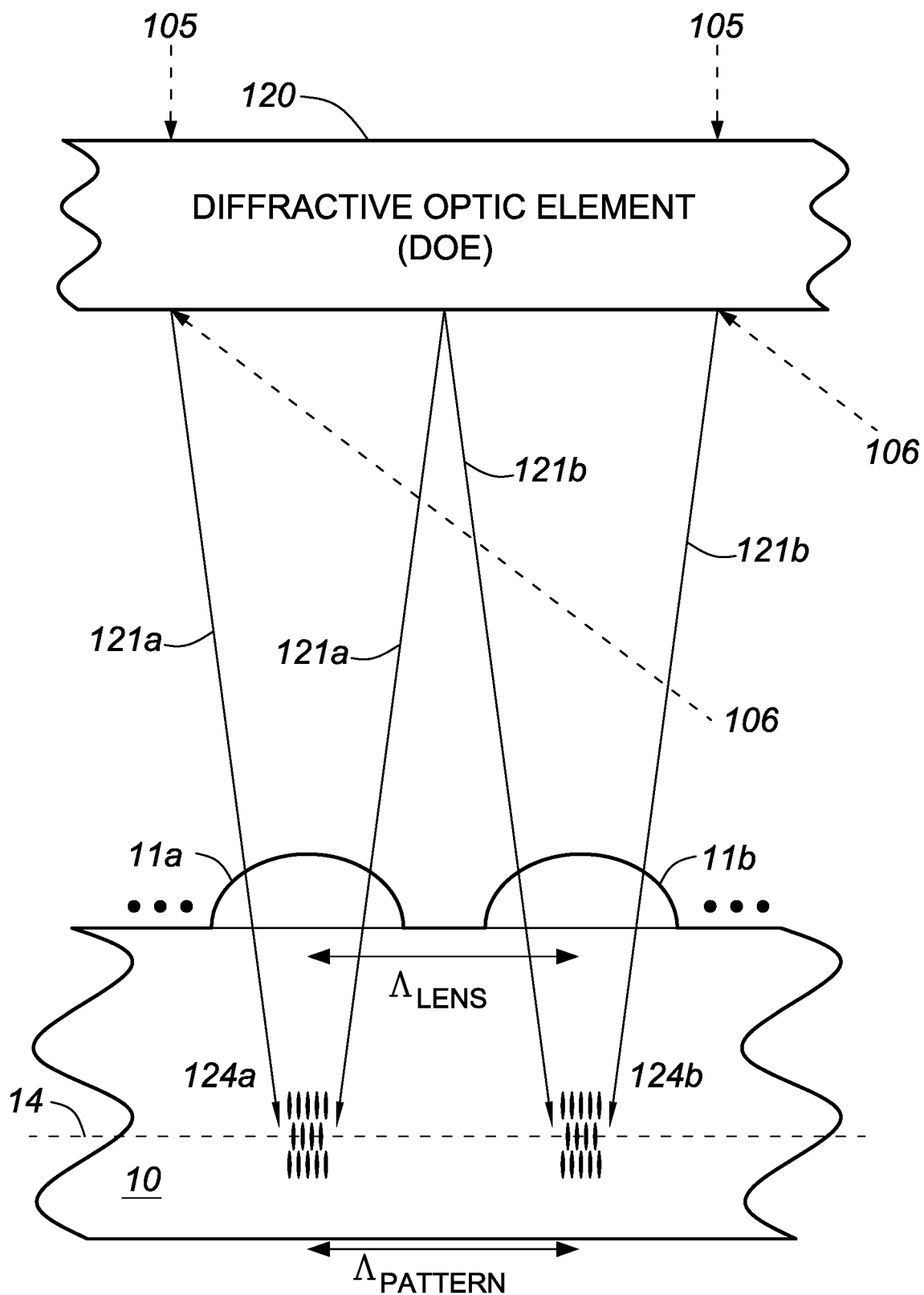
FIG. 10: schematically illustrates a femtolaser beam delivery arrangement by beam shaping with a reflective or transmissive diffractive optical element (DOE) for separating and shaping pulses into groups, shown separated and focused into two different microlens zones, for parallel and high speed fabrication of laser-modified tracks or other laser modification inside of a transparent substrate.

FIGS. 8, 9 and 10 schematically illustrate various example options for methods to generate laser-fabricated patterns within a substrate, such as a polymer substrate, that employ a diffractive optical element (DOE) of any type and form. In selected embodiments the use of a DOE as an alternative to, a spatial light modulator (SLM) may present certain advantages in relation to production speed and accuracy for optical devices as described. For example, rapid production of such optical devices on an industrial scale may be desired in the field of document security production, such as bank note production. Selected methods employ each pulse of laser radiation or beam splitting of the laser to form multiple points of entry into the substrate material/and or microlenses simultaneously.

In FIG. 8, an arrangement of a substrate material 10 and projecting refractive microlens 11, having focal plane 14, is illustrated in a manner similar to FIG. 1. A transmissive or reflective DOE 101 with respective incoming femtolaser pulses 105, 106, respectively, may employ iterative algorithms or other algorithms to generate a phase pattern for the laser light 102 emanating from DOE 101. Furthermore, the DOE pattern of laser irradiation may be designed by way of splitting a laser beam into multiple spots for example at desired focal points 103, each of which may be positioned as required in three-dimensions upon x, y and z spatial axes. In this way, laser-fabricated three-dimensional structures or patterns within the substrate material 10 may be generated, through diffraction from a single laser pulse (schematically illustrated in FIG. 8 inset, as i. discontinuous perpendicular laser-modified tracks, ii. discontinuous non-perpendicular laser-modified tracks, or iii. photonic crystal lattice). This in turn may facilitate higher-speed fabrication of such laser-fabricated structures or patterns better suited to mass production. Such DOEs may also comprise an active diffractive optic such as a spatial light modulator (SLMs) for varying the number of parallel beams and their arrangement in the processing volume, or passive diffractive optic with fixed focussing pattern.

FIG. 9 schematically illustrates a substrate and microlens configuration corresponding to a modified version of beam delivery in FIG. 8. In this embodiment laser light 111 emanating therefrom passes from or is reflected from DOE 110 and reflects off scanning mirror 112, before being focused by fabrication lens 113. Scanning mirror 112 provides added flexibility and rapid processing opportunities for the laser light 111 for example by rapid repositioning of a laser focusing volume containing multiple pulses generated by the DOE and thereby to fabricate pattern or structure 114, which in the embodiment as shown spans the focal plane 14 of microlens 11. In other embodiments multiple scanning mirrors or polygon mirrors and/or lasers may be employed for fabricating patterns or sub-patterns at multiple positions within the substrate 10 simultaneously or in rapid succession. Such beam scanners accommodate a high flow rate of pulses from high repetition rate lasers (kHz to GHz).

FIG. 10 schematically illustrates a further embodiment similar to FIG. 9, but with generation of multiple patterns 124a, 124b in association with microlenses 11a, 11b respectively. In this embodiment the DOE 120 is designed to provide multiple points of laser irradiation 121a, 121b within substrate 10 simultaneously in order to fabricate patterns 124a, 124b, for example by splitting one laser beam or laser pulse into multiple beams which are farther apart. Therefore, the desired pattern could be fabricated underneath each microlenses simultaneously. This allows another degree of enhancement in processing speed in a production line. In such embodiments, the laser focusing may be provided by any one or more of the following: the DOE, other optics present (now shown) and the microlenses.

While the embodiments illustrated in FIGS. 8, 9 and 10 illustrate passing a laser though microlens 11 (or microlenses 11a, 11b) to modify the substrate 10 and/or the internal structure of microlens or microlenses, it may be preferable in some embodiments for the laser to enter the substrate on a side of the optical device opposite the microlens. For example, this alternative approach (not illustrated) may avoid the need for corrections to the laser position resulting from the presence of the microlens 11 and passage therethrough by the laser beam. Further, in the embodiments illustrated in FIGS. 8, 9 and 10 the focussing of the laser irradiation or laser beam may be conducted by the DOE or other features or optics external to the optical device, and not necessarily or entirely by the microlenses present in the optical device. This in turn permits fabrication of laser-fabricated patterns and structures within the microlenses and/or substrate independent to the focal plane and optical properties of the microlenses present. In fact, for some embodiments in which the laser beam or laser irradiation passes through the microlenses present, correction may be needed to ensure the laser focus occurs at a desired position within the substrate and/or microlens, if the microlenses affect the path of the laser.

Although FIGS. 8, 9 and 10 illustrate embodiments of optical devices comprising microlenses extending from the substrate, such microlenses may be substituted by, or used in combination with, laser-fabricated diffractive pattern including but not limited to microlenses as herein described.

Figure 11:
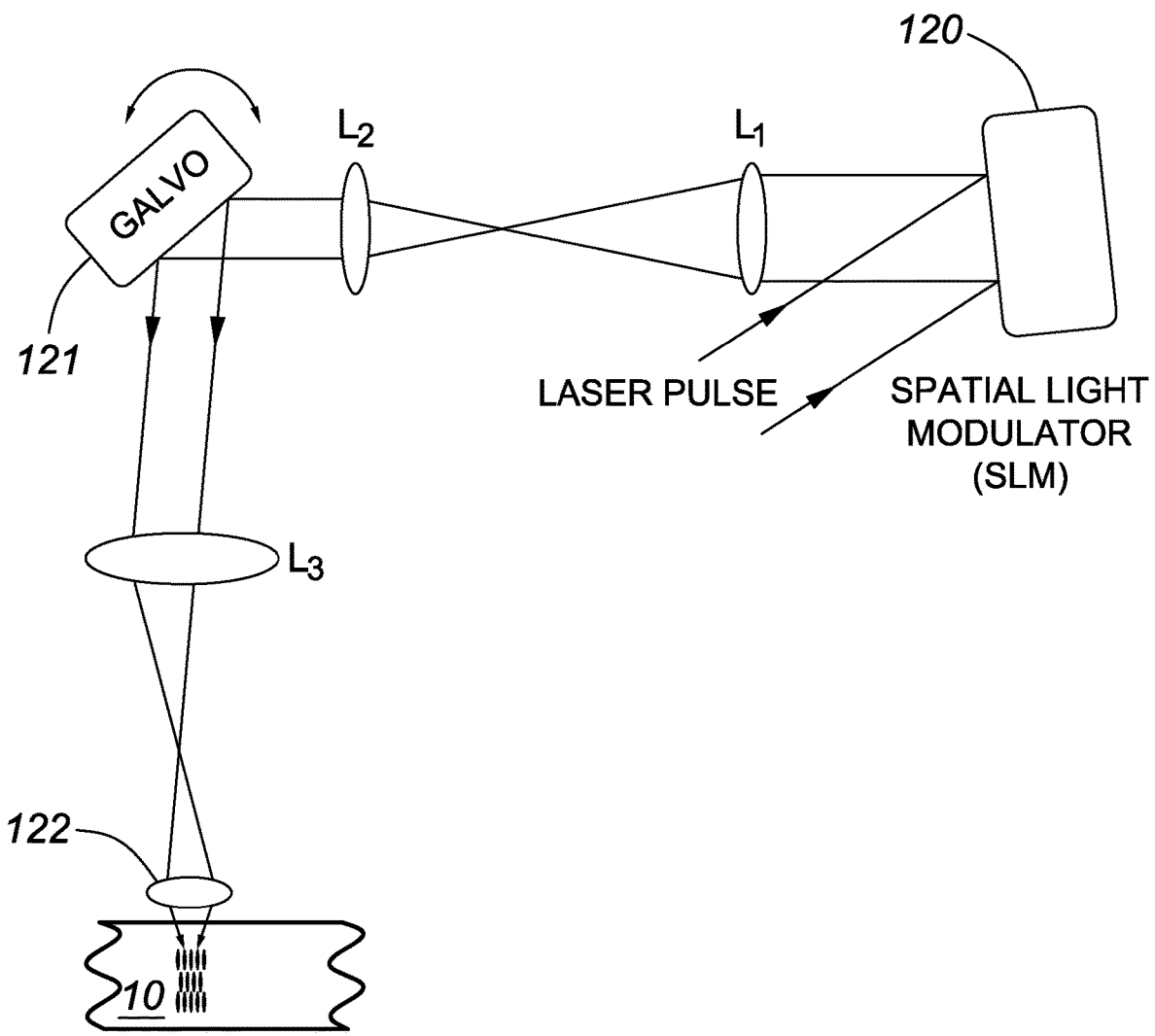
FIG. 11: illustrates schematically a beam delivery system with a reflective spatial light modulator (SLM) in combination with a mirror galvanometer scanner and relay focusing lenses for parallel and rapid scanning of a laser beam pattern to induce high-speed modification inside a transparent substrate sample.

FIG. 11 illustrates schematically an example of a system and method described with respect to FIG. 9, to generate laser-fabricated patterns within a substrate, such as a polymer substrate, that employs a reflective spatial light modulator (SLM) 120 as a diffractive optical element (DOE) and a galvanometer 121 as a scanning mirror. The arrangement facilitates precision in beam splitting, flexibility in beam shaping, and high-speed in large area fabrication of optical devices, such as those as described for example in FIGS. 1 to 6. The beam delivery harnesses a reflection type SLM based on liquid crystal on silicon (LCOS) phase modulation, imposing a computer-controlled phase pattern in a two-dimensional array on an incoming Gaussian-shaped femto-laser pulse. The phase patterns are determined by methods well known in the field, including but not limited to iterative Fourier transform. In this way, conical phase fronts to elongate the focal volume into a filament or to generate multi-spot patterns with well-defined positions may be imposed after propagation through fabrication lens 122, where a Fourier transform of the SLM phase modulation appears at the focal plane. The laser modification to the transparent substrate is provided by positioning the substrate in the vicinity of the focal plane of the fabrication lens 122. The further combination of lenses $L_1$ (f1=85 cm) and $L_2$ (f2=35 cm) define a 4f arrangement to demagnify the image formed on the SLM plane by 2.43 times, relaying the pattern in the vicinity of the galvanometer scanning mirrors. The demagnified modulated laser beam is reflected and steered by the galvanometer on both x- and y-axis deflections. Lens $L_3$, with focal length of f3=6.35 cm, was positioned at 2f3=— 12.7 cm away from the focal plane of $L_2$ and 2f3=~12.7 cm before the fabrication lens. This arrangement of $L_3$ enabled beam steering of about ±1 degree through the fabrication lens (NewFocus, 5722-A-H, f=4.5 mm, and NA=0.55) with negligible aberrations and pattern distortions, providing a working field of about 100 µm by 100 µm in the focal volume of the fabrication lens. The beam delivery arrangement provided a spot size of ~1 µm at the focus of the fabrication lens in the substrate.

Example 3: Fabricating Directly on a Microlens Array Substrate

Selected examples illustrated in FIG. 12 employ a specific substrate type (PET substrate with UV curable microlens) and a specific laser system in the form of a Yb-doped fiber femtosecond laser system (Amplitude Systemes, Satsuma) provided Gaussian-shaped pulses (beam quality: $M^2$=1.14) of 515 nm wavelength (frequency doubled or halved wavelength) with a pulse duration of ~250 fs. Such substrates and laser systems are merely exemplary, and the claimed embodiments are not limited in this regard. Other substrates and systems to generate the devices as discussed may be employed as required.

Moreover, such examples have employed laser beam shaping to generate a single laser-modified track or aberration upon or within the substrate. An aspherical air-focusing lens of 0.55 NA (NewFocus, 5722-A-H) was used to focus the laser into the substrate. A near-uniform narrow laser-modified track beam shaped with high aspect ratio was generated through a combination of Kerr nonlinear and longitudinal aberration effects when the laser was focused through fused silica glass plate of 2-mm thickness, prior to striking the substrate. By controlling the pulse energy in the range of 132 nJ to 351 nJ and using a fused silica glass plate with a thickness of 2 mm, laser-modified tracks of varying lengths and widths were produced in biaxially-oriented polypropylene (BOPP). Single or multiple pulses may be applied to the same interaction zone, to accumulate a larger overall modification change. Multiple pulses can be applied while moving the sample with respect to the laser focal (or vice versa).

Figure 12A:
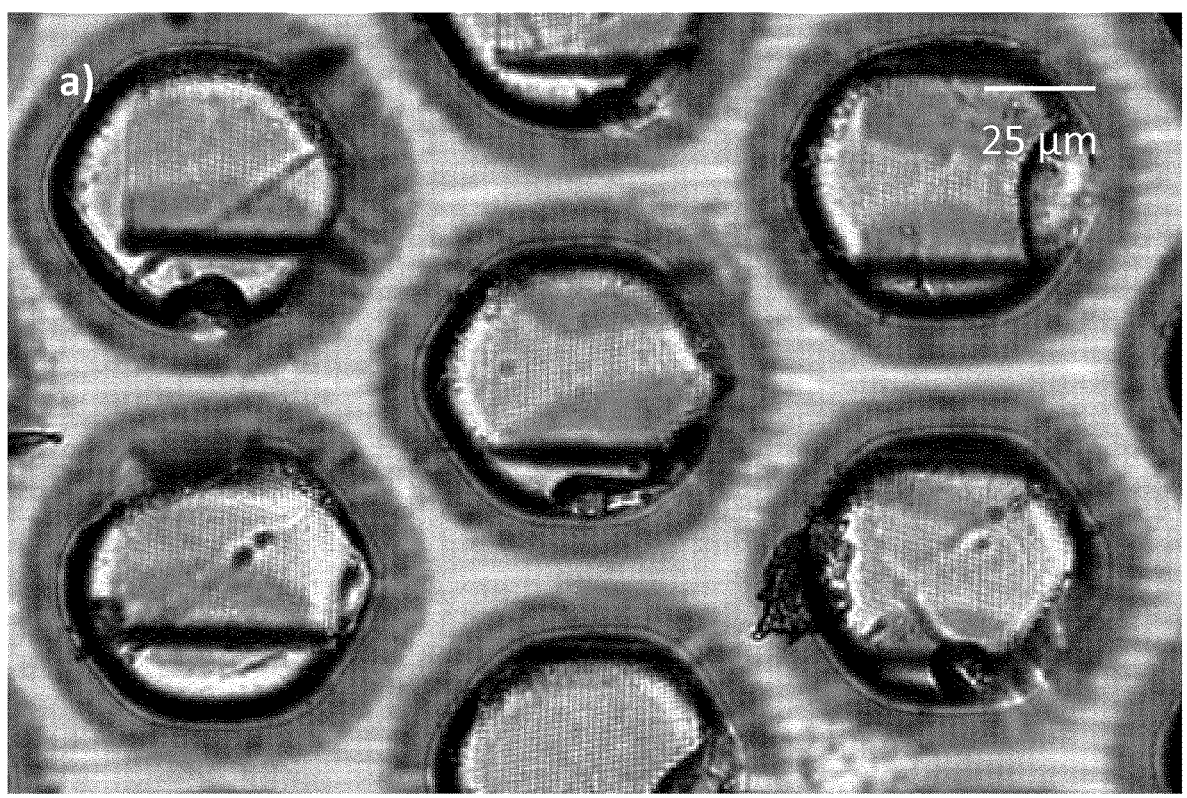
FIG. 12a: provides an optical microscope image of two-dimensional arrays of laser-modified tracks each fabricated within a microlens and extended into the substrate, with the laser irradiation applied through the surface of the optical device opposing the microlens surface. The arrays each extend over 50-μm-by-50-μm area and comprise individual laser-modified tracks arranged on a period of 1.5 μm and embedded partially in the micro-lens and the substrate. Each track was formed with a laser pulse energy of 345.0 nJ.
Figure 12B:
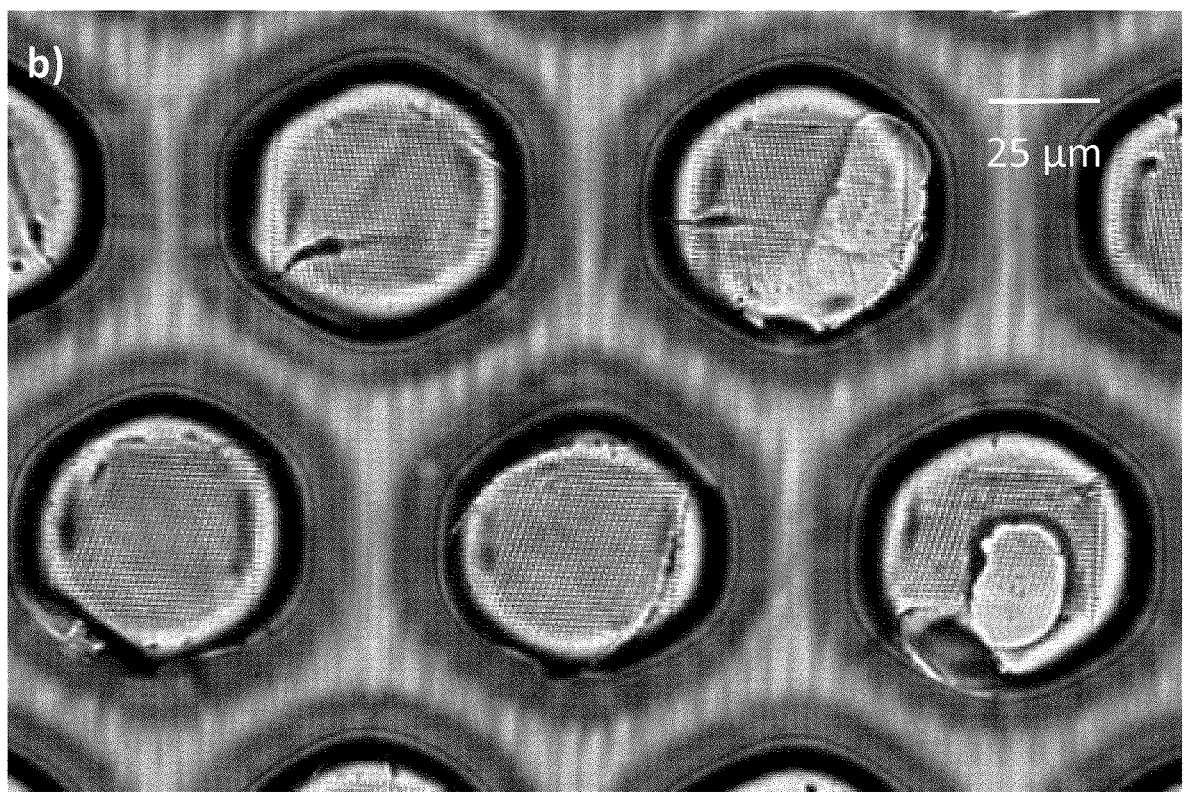
FIG. 12b: provides an optical microscope image of two-dimensional arrays of laser-modified tracks each fabricated within a microlens and extended into the substrate, with the laser irradiation applied incident upon the microlens surfaces. The arrays each extend over a 50-μm-by-50-μm area and comprise of individual laser-modified tracks arranged on a period of 1.5 μm and embedded partially in the micro-lens and the substrate. Each track was formed with a laser pulse energy of 345.0 nJ.
Figure 12C:
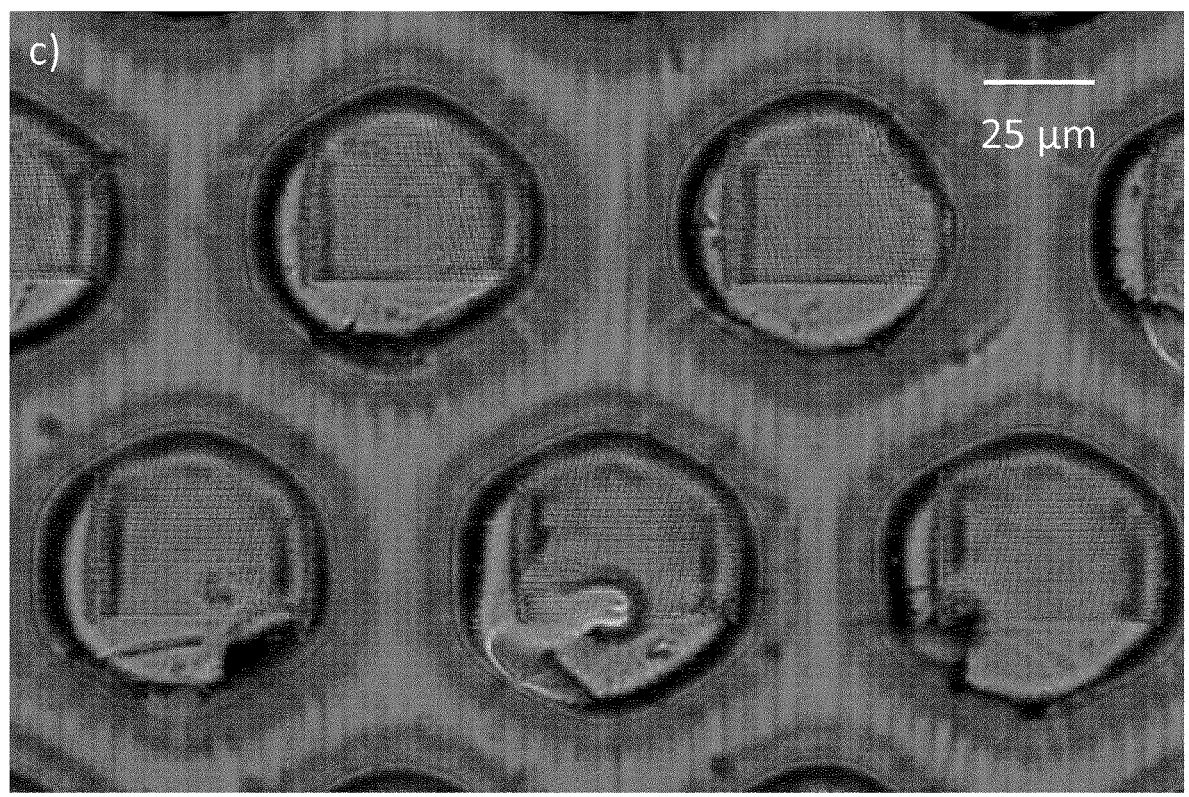
FIG. 12c: provides an optical microscope image of two-dimensional arrays of laser-modified tracks each fabricated within a microlens, with the laser-modified tracks embedded in the microlenses and extending to the surface of the microlenses. The laser was irradiated through and incident on the microlens surface. The arrays each extend over 50-μm-by-50-μm area and comprise of individual modified tracks arranged on a period of 1.5 μm and embedded partially in the micro-lens and the substrate. Each track was formed with a laser pulse energy of 133.0 nJ.
Figure 12D:
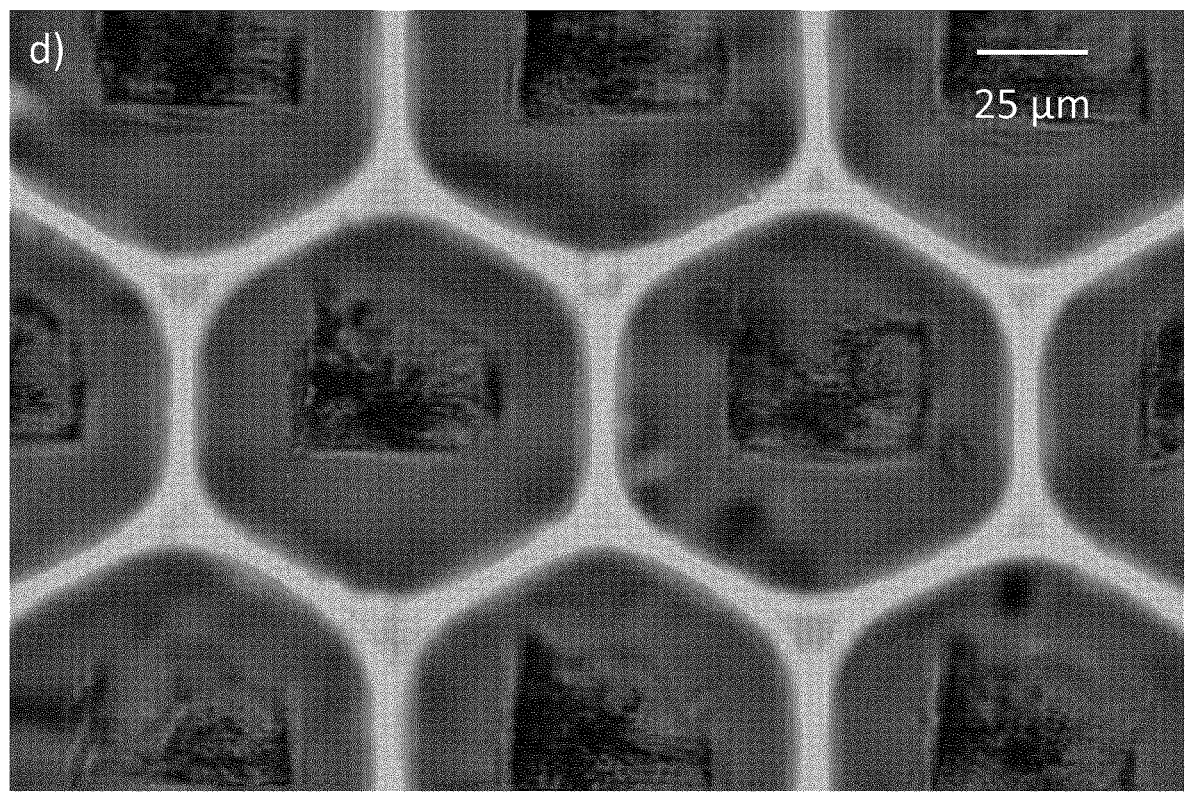
FIG. 12d: provides an optical microscope image of two-dimensional arrays of laser-modified tracks each fabricated within a microlens. The laser was irradiated through and incident on the microlens surface. The arrays each extend over a 50-μm-by-50-μm area and comprise of individual modification tracks arranged on a period of 1.5 μm and embedded partially in the micro-lens and the substrate. Each track was formed with a laser pulse energy of 133.0 nJ.
Figure 12E:
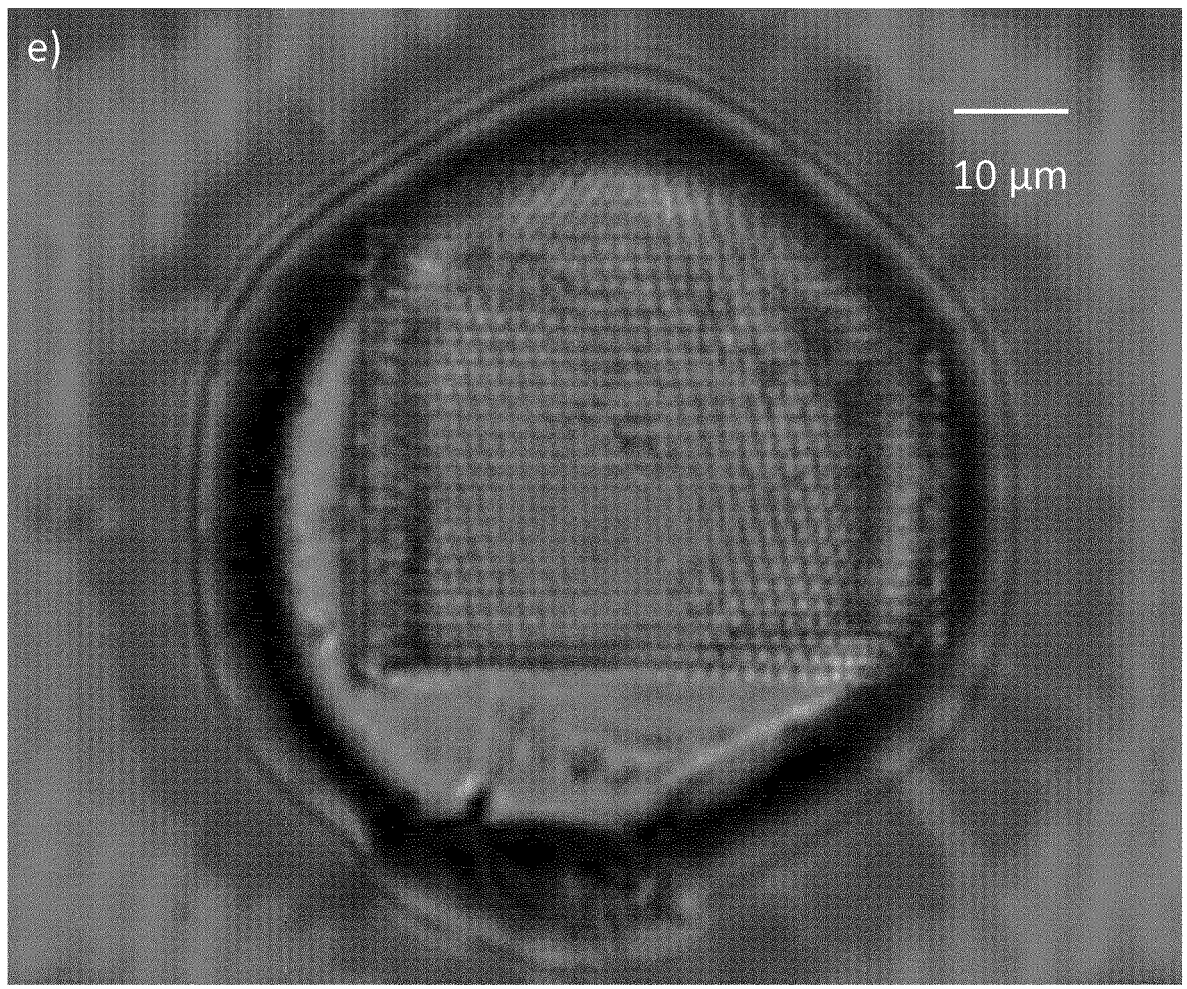
FIG. 12e: provides an enlarged optical microscope image of one of the microlens/array arrangements from FIG. 12c.

FIGS. 12*a* and 12*b* provide top view optical microscope images of laser-fabricated 50-µm-by-50-µm arrays or zones of laser-modified tracks, wherein each zone comprises of laser-modified tracks with 1.5-µm periodicity, with each track forming with pulse energy of 351.0 nJ and 343.5 nJ, respectively, wherein each zone is embedded partially in a single micro-lens and the substrate part of the microlens array. The laser was focused through the flat substrate surface for filament fabrication in FIG. 12*a*, and through the lens surface for FIG. 12*b*. FIG. 12*c* shows a top view optical microscope image of laser-fabricated 50-µm-by-50-µm arrays of laser-modified tracks, with each array fabricated within a micro-lens, with protrusion of at least some of the laser-modified tracks to the lens surfaces. FIG. 12*d* shows a top view optical microscope image of laser-fabricated 50-µm-by-50-µm arrays of laser-modified tracks, with each array completely embedded within the substrate. FIGS. 12*c* and 12*d* were fabricated with the laser focusing from the lens surface with a pulse energy of 133 nJ. FIG. 12*e* is an enlarged image of one of the microlens-embedded arrays of laser-modified track from FIG. 12*c*.

Example 4: Laser Fabricated Patterns in PET Overlayed with a Sheet Comprising a Microlens Array Selected examples illustrated in FIG. 13 employ a specific substrate type (PET substrate without microlenses) and a particular laser system, described in Example 3 (FIG. 12). Such substrates and laser systems are merely exemplary, and the claimed embodiments are not limited in this regard. Other substrates and systems to generate the devices as discussed may be employed as required.

Figure 13A:
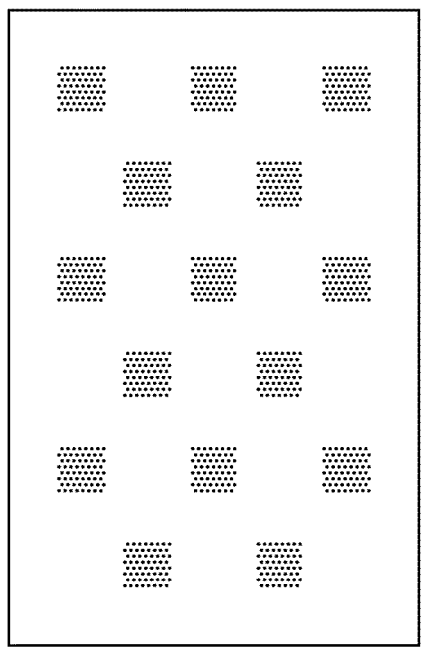
FIG. 13a: illustrates schematically a hexagonal arrangement of distinct arrays of laser-modified zones, arranged on a pitch of $P_{pattern}$, wherein each distinct modified zone is a separate diffractive element consisting of laser modified tracks assembled in arrays of smaller pitch.
Figure 13B:
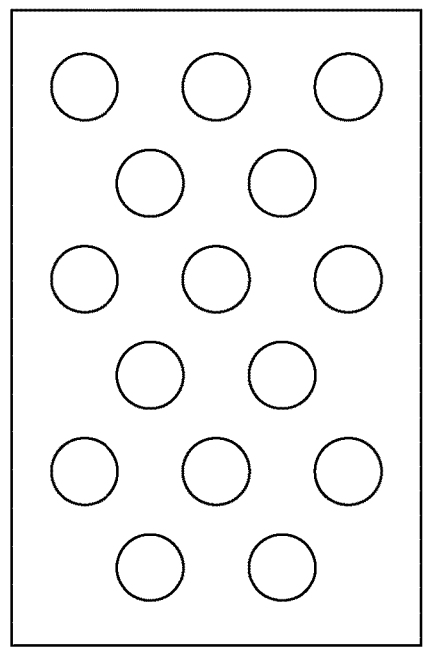
FIG. 13b illustrates schematically a hexagonal arrangement of microlenses, with each microlens depicted by circular shape and arranged in an array with a pitch of $P_{lens}$.

FIGS. 13*a* and 13*b* illustrate schematically an arrangement of distinct arrays of laser-modified zones or tracks, each forming a diffractive optic, and microlens arrays, respectively, where $P_{pattern}$ is the hexagonal pitch of the diffractive optic arrays and P lens is the hexagonal pitch of the micro-lens array. FIG. 13*c* shows an optical image of an arrangement of distinct arrays of laser-modified zones comprising isolated diffractive optics with a misaligned pitch, $P_{pattern}$=~102% of $P_{lens}$=100 µm, wherein each diffractive optic comprises a sub-array of laser-fabricated filament tracks having formed with a pulse energy of 132 nJ in PET. FIGS. 13*d*, 13*e*, and 13*f* are optical images of a polymer sheet comprising an array of micro-lenses with periodicity $P_{lens}$=98 µm placed on top of the arrangement of distinct arrays of laser-modified tracks (c), and then progressively rotated with respect to one another, whilst in contact or near contact with the arrays of laser-modified tracks, at varying angles to provide different degrees of moiré magnification and floating optical effects for the arrays of laser-modified tracks.

Example 5: Employing an SLM as a Diffractive Optic Element for Beam Splitting

Figure 14A:
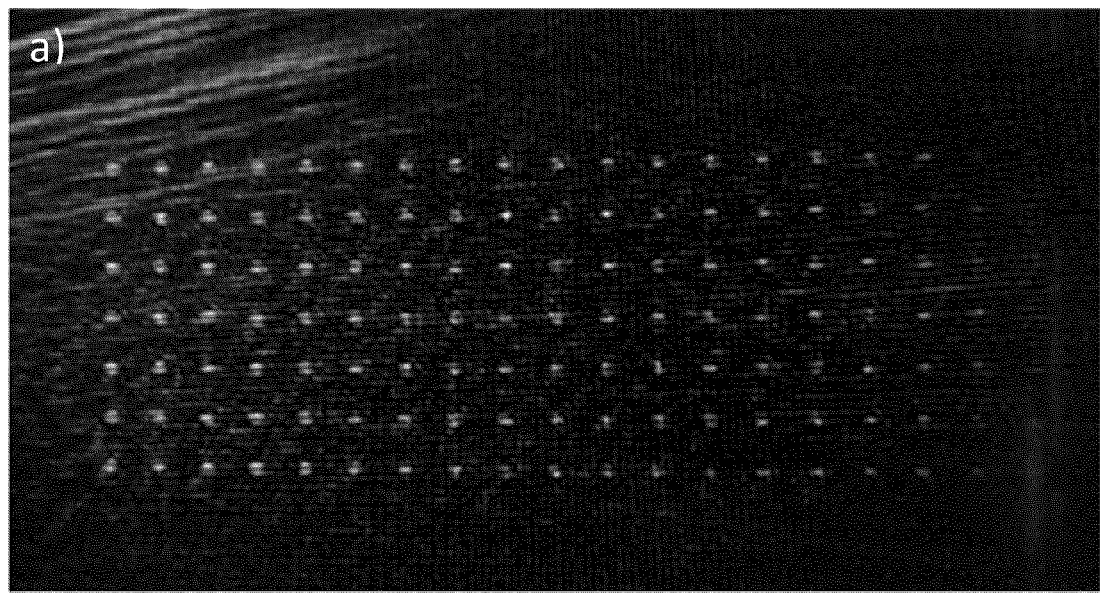
FIG. 14a shows a magnified optical image of the top surface of a fused silica substrate recording surface reflection of a single laser pulse, where the laser beam was pre-modified with a spatial light modulator (SLM) to separate into 133 distinct beams of near equal energy, arranged into a rectangular array of 7-by-19 focal "spots" on 5 μm period.
Figure 14B:
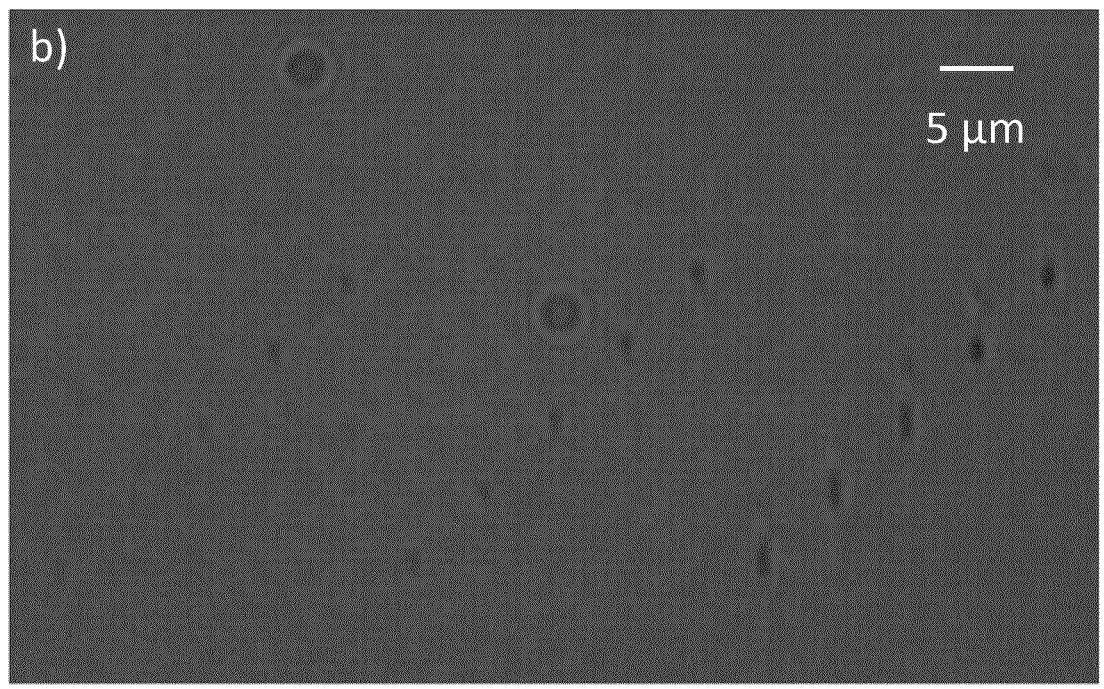
FIG. 14b shows an optical microscope image of the cross-section of a fused silica substrate after modification with a single laser pulse arriving from above the image, and pre-modified by a SLM to separate into 5 focal spots, each separated laterally by 5 μm period, separated vertically by 5 μm period, and skewed laterally by 45° from horizontal, forming with 0.65 (left), 1.03 (middle) and 1.96 (right) μJ net pulse energy.
Figure 14C:
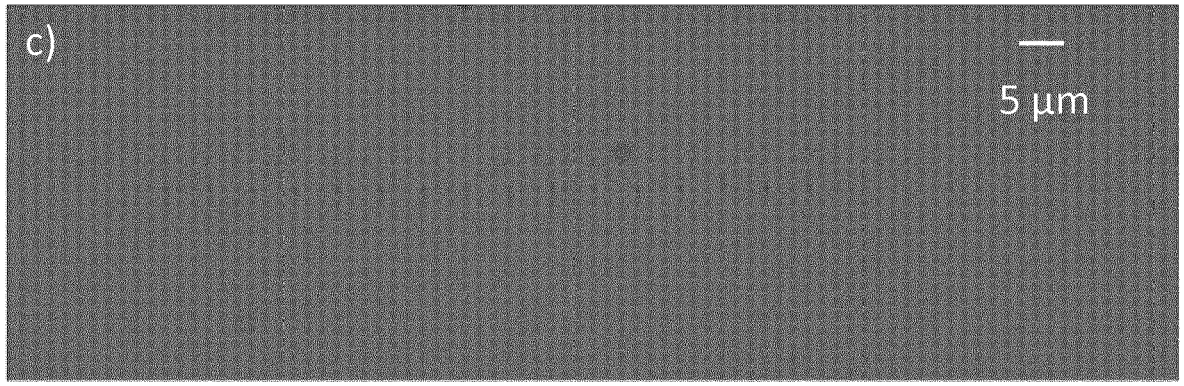
FIG. 14c shows a similar image as in FIG. 14b where a single femtolaser pulse (from top) was separated into 19 distinct focal spots arranged horizontally on a uniform 5 μm period with a net pulse energy of 4.23 μJ.
Figure 14D:
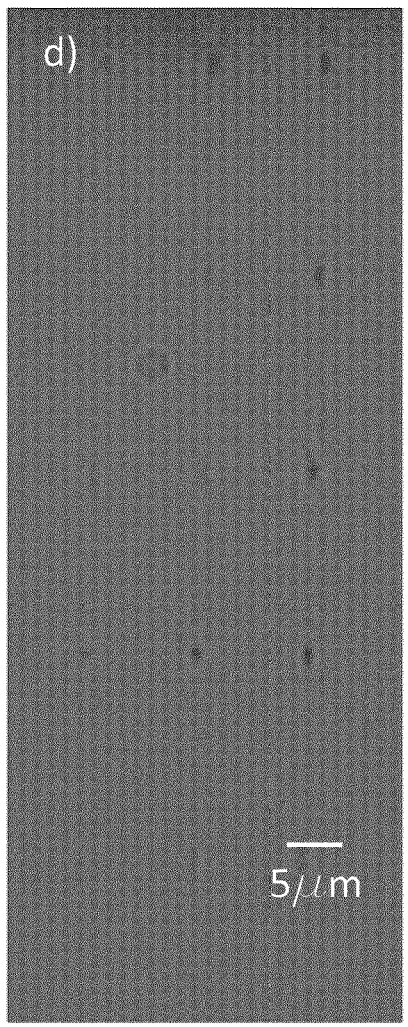
FIG. 14d shows 3 exposures of a femtolaser pulse, wherein each beam in each exposure (0.65, 1.03, and 1.96 μJ from left to right) was separated into 5 focal spots arranged vertically on uniform 18 μm period generated in the same manner as in FIG. 14b.

The division of the femtolaser pulse into multiple focal spots was assisted with the SLM arrangement of FIG. 11, but excluding the beam steering components of the galvanometer 121 and relay lens L3 in FIG. 11. With this arrangement, FIG. 14a shows a CCD camera image of laser light reflecting from the surface of a fused silica substrate, wherein the laser beam was shaped by an SLM to separate and align into a rectangular array of nearly equal-energy spots on a 7-by-19 array, demonstrating the facility for SLM beam splitting to enable high speed parallel processing of diffractive optics. This direction is reflected in FIGS. 14b to 14d, and subsequent figures. FIG. 14b shows a microscope image of the side facet of a fused silica substrate where 3 sets of 5 modification spots were formed by single laser pulses, however, with each set of 5 spots generated by a single laser pulse reflecting and diffracting from an SLM. The 5 spots of each set were separated by 5-µm apart in a lateral direction and 5-µm in the optical axis (vertical) direction having pulses energies of 0.65 µJ (left), 1.03 µJ (middle), and 1.96 µJ (right). FIG. 14c shows a single set of 19 modification spots, in a linear array, generated and viewed in the same manner as in FIG. 14b. The modification spots were separated by 5-µm laterally, and all spots were formed simultaneously with a single pulse of total energy of 4.23 µJ divided by the SLM. FIG. 14d shows 3 sets of 5 modification spots with each set of 5 spots generated and viewed in the same manner as in FIG. 14b. The spots of each set were separated by 18-µm in the optical axis direction having pulses energies of 0.65 µJ (left), 1.03 µJ (middle), and 1.96 µJ (right). The combination of images in FIG. 14 thus demonstrate the beams splitting shaping of the SLM to separate a single pulse into multiple pulses forming multiple isolated focal spots arranged into linear or 2D arrays, with arrangements laterally (FIG. 14a, 14c) or vertically (FIG. 14c) or at oblique angles (FIG. 14b).

Figure 15A:
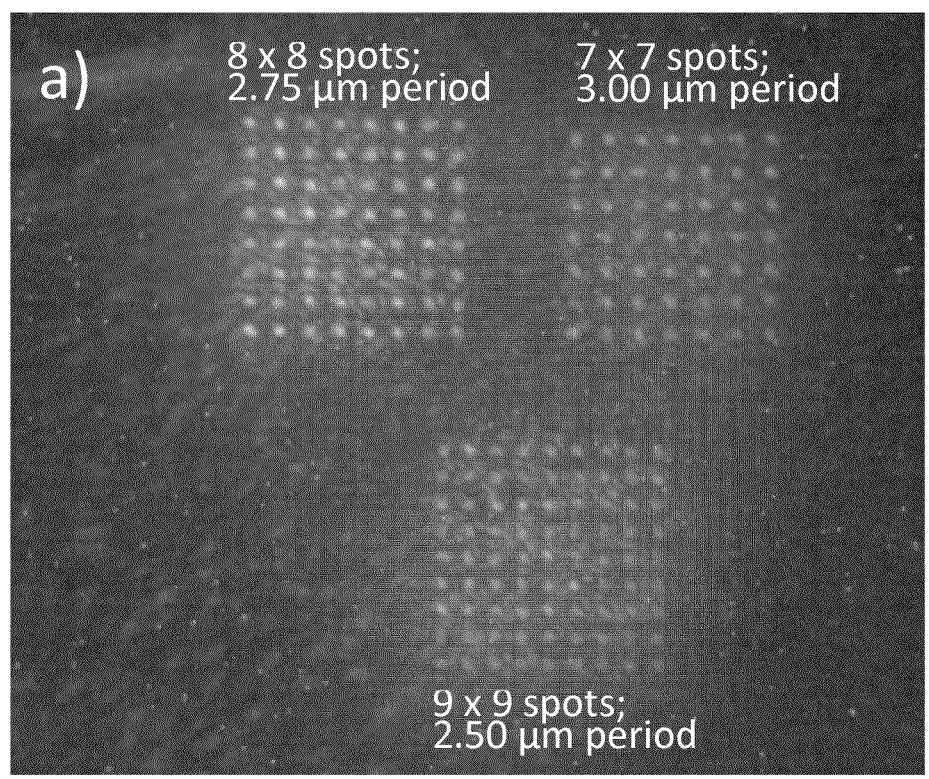
FIG. 15a shows a magnified optical image of the top surface of PET substrate recording surface reflection of a single femtolaser pulse, where the laser beam was pre-modified with a spatial light modulator (SLM) to separate into 194 distinct beams of near equal energy, arranged into a square grid of 7-by-7 focal "spots" on 3 μm period (top right), 8-by-8 spots on 2.75-μm period (top left), and 9-by-9 spots on 2.50-μm period (bottom).
Figure 15B:
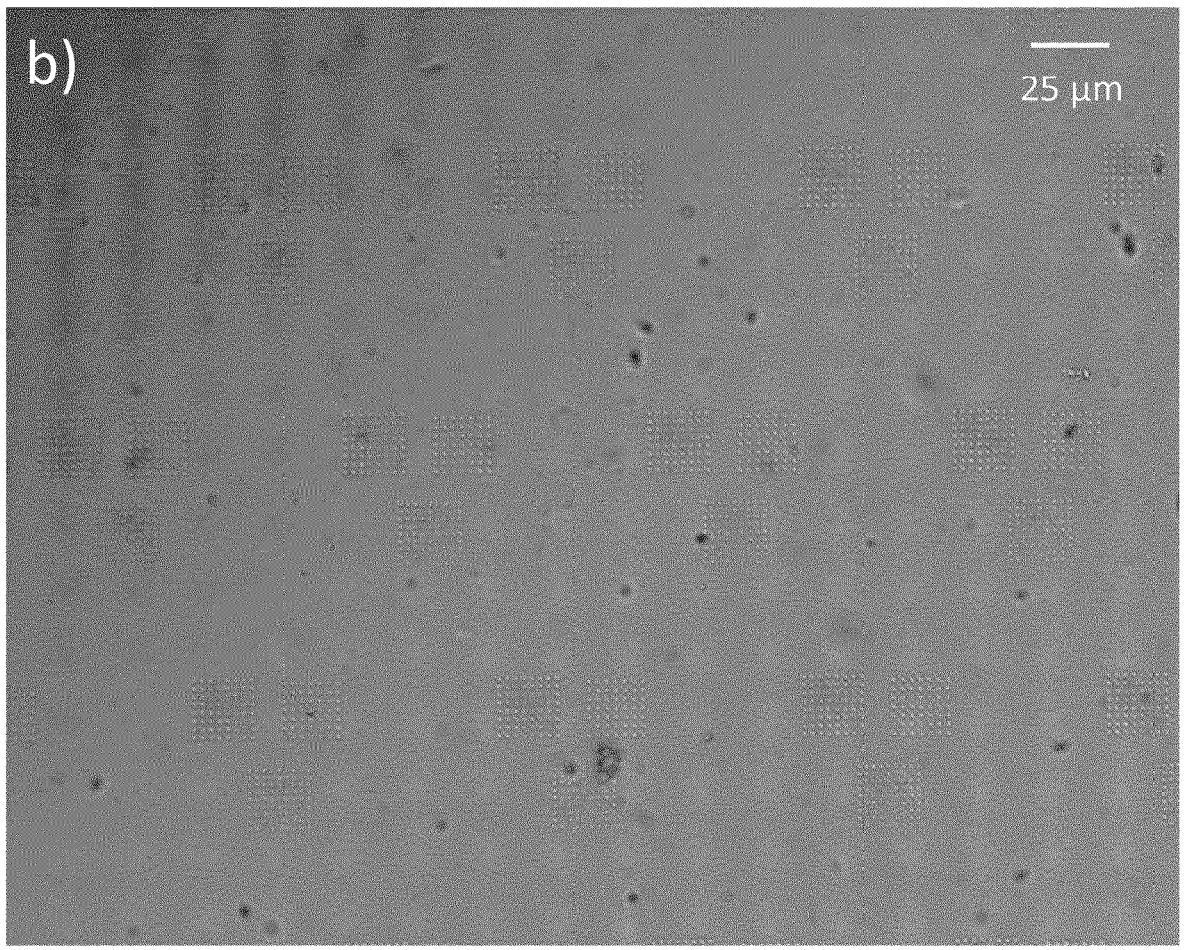
FIG. 15b provides a top view optical microscope image of the PET film after modification by a femtolaser, with beam shaping into the arrays as illustrated in FIG. 15a, with each diffractive element fabricated by a single laser pulse, and each triplet group replicated on a two-dimensional grid of uniform hexagonal pitch of 100 µm, and 5 mm by 5 mm total modification area.

FIG. 15a shows a magnified optical image of the top surface of PET substrate, recording the surface reflection of a single femtolaser pulse, where the laser beam was pre-modified with a spatial light modulator (SLM) to separate into 194 distinct beams of near equal energy, arranged into a square grid of 7-by-7 focal "spots" on 3 µm period, 8-by-8 spots on 2.75-µm period, and 9-by-9 spots on 2.50-µm period. FIG. 15b provides a top view optical microscope image of the PET film after modification by a femtolaser, with beam shaping into the arrays as illustrated in FIG. 15a, with each diffractive element fabricated by a single laser pulse with an energy of 3.55 µl (which provides ~18.3 nJ per spot), and each triplet group replicated on a two-dimensional grid of uniform hexagonal pitch of 100 µm, and 5 mm by 5 mm total modification area. FIGS. 15c, 15d, and 15e are optical images with 'white' light illumination from a cellular phone LED, captured by diffractive reflection from different substrate angles, of the array of diffractive elements shown in FIG. 15b.

Various methods may be employed for 'beam-splitting' of a laser into multiple beams, to generate multiple incident points of interaction or radiation of the laser upon a substrate, or for 'beam shaping' of the laser. Such methods may include, but are not limited to, Iterative Fourier methods [26,27] employed to find a phase distribution required in the front focal plane of the fabrication lens to direct the beam into a desired intensity distribution in the Fourier plane of the lens (i.e. fabrication plane). For instance, an algorithm called Gerchberg-Saxton (GS) [27] can be applied to find the target phase distribution. The target phase distribution in the GS algorithm is found by starting with an initial random phase distribution and the Gaussian beam's amplitude. Then a Fourier transform is calculated to account for propagation to the Fourier plane of the fabrication lens $L_3$, corresponding to the focal plane of the lens, where the field phase of the calculation is retained and the field amplitude of the calculation is replaced by the desired field amplitude (i.e., multipulse pattern). By calculating an inverse Fourier transform, the resulting phase distribution is considered for the diffractive optic plane as a way to reconstruct the target amplitude in the Fourier plane. By iteratively repeating this process, the phase reconstruction error will be minimized. The resulting mathematical phase distribution on the inverse Fourier transform can be applied to the laser beam by an active DOE to thereby generate the desired beam pattern in the focal plane of the fabrication lens. The uniformity of the intensity distribution in the Fourier plane of this lens can be further improved by applying weighted GS algorithms. [28,29] Such iterative algorithms can be applied to generate a wide range of simple to complex intensity distributions, making these methods attractive in beam shaping. [31-33]

Example 6: Employing High-Speed Laser Fabrication Techniques to Pattern a Transparent Material to Demonstrate Various Moiré Optical Effects The beam delivery arrangement schematically shown in FIG. 11 was employed to fabricate laser patterns in BOPP film, shown in FIGS. 16 to 18, with the femtolaser (Amplitude Systemes, Satsuma) described previously. The optical system described in FIG. 11 enabled high-speed and precise fabrication of optical devices in various embodiments. The fabrication procedure included positioning multiple spots generated by the SLM on a periodicity of $P_{spot}$ in the focal plane of the fabrication lens $L_3$ (FIG. 11). Galvanometer x-y mirror rotation was manipulated to overlay similar patterns of laser spots and fill in a diffractive pattern of laser modification spots on variable periodicities of $\Lambda_x=\Lambda_y=0.25$ µm to 5 µm. Further galvanometer scanning permitted a repeated pattern of the fundamental diffractive element in a hexagonal pattern with a pitch of $P_{pattern}$. The writing procedure permitted sufficient large separation of neighbouring laser spots, $P_{spot}=10$ µm, to avoid accumulating thermal effects at high laser repetition rates such as 1000 Hz, limiting over-heating, pyrolysis, and charring of the exposure zones. The laser-fabricated hexagonal patterns were formed in BOPP films and then overlaid by a microlens sheet with a hexagonal array pitched by a mismatching period, $P_{lens}$, for inducing various moiré optical effects.

FIG. 16 presents an example of laser-fabricated square patterns of 40 µm by 40 µm area with filament tracks forming on periodicity $\Lambda_x=\Lambda_y=1.25$ µm. An SLM pattern was generated by the iterative Fourier method to generate multiple laser spots. A converging conical phase front with an angle of 0.207 mrad was superimposed on the SLM pattern for multi-spot formation. The converging conical phase front elongated the depth of focus for each spot from ~4 µm to >10 µm when the laser was focused at 35 µm below the surface of BOPP.

Figure 16A:
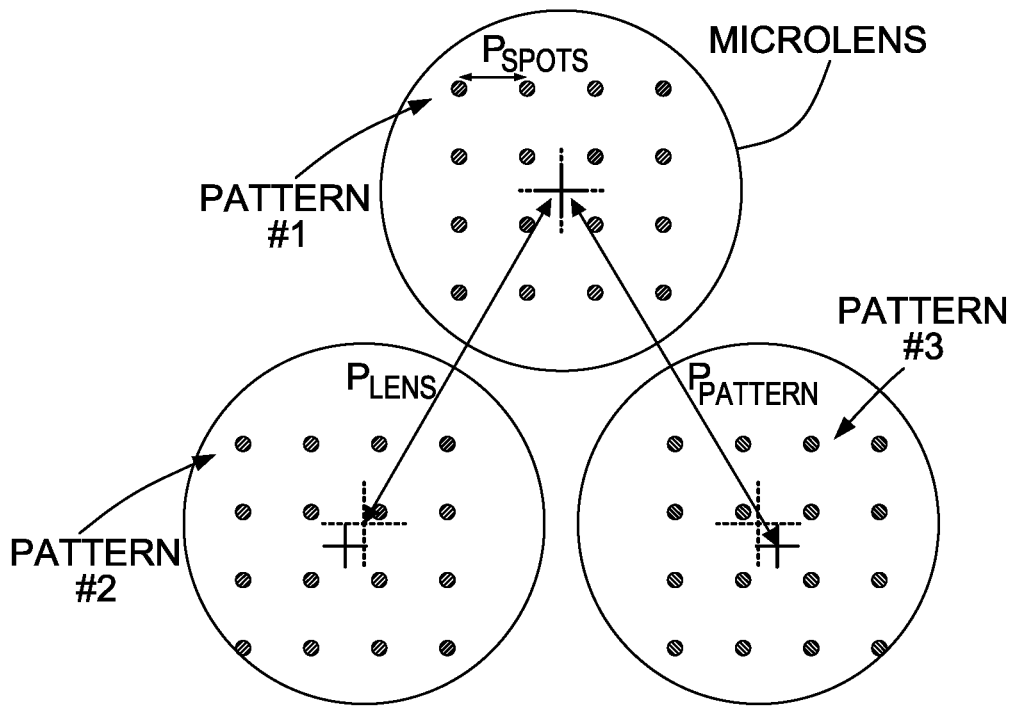
FIG. 16a illustrates schematically a matrix of laser focal spots generated from a single pulse after modulation by a SLM, forming in a plane inside of a transparent substrate. The pattern comprises of three similar arrays of 16 spots each, arranged hexagonally on a pitch of $P_{pattern}$ (centered on solid crosses) and with laser-to-laser pitch of $P_{spot}$ in each array. The circles represent the position of microlenses, also on a hexagonal pattern but with a smaller pitch of $P_{lens}$ (centered on dashed crosses).

A matrix of a total of 48 spots, in three square patterns as schematically shown in FIG. 16a, was generated by SLM in the focal plane of the fabrication lens inside the substrate. The SLM generated three arrays of 16 spots, with a spot-to-spot separation of $P_{spot}$, to simultaneously fabricate the three patterns on a hexagonal grid with a pitch of $P_{pattern}$. Each multi-spot pattern was intended to align approximately under a microlens, as schematically shown with circles in FIG. 16a. The microlens array had a pitch of $P_{lens}$. For the sink sample, the mismatching array periodicity of $P_{pattern}=0.98\times P_{lens}$ was applied while for the float sample, the periodicity relationship of $P_{pattern}=1.02 \times P_{lens}$ was applied, each resulting in about 50 times Moiré magnification. For the intended microlens array with a pitch of $P_{lens}=54$ µm, a substrate demonstrating the moiré sink effect was fabricated with array pitch of $P_{pattern}=52.92$ µm yielding the results in FIGS. 16d, f, h, j, l, and n while a substrate demonstrating the moiré float effect was fabricated with array pitch of $P_{pattern}=55.08$ µm yielding the results in FIGS. 16c, e, g, k, and m.

Figure 16B:
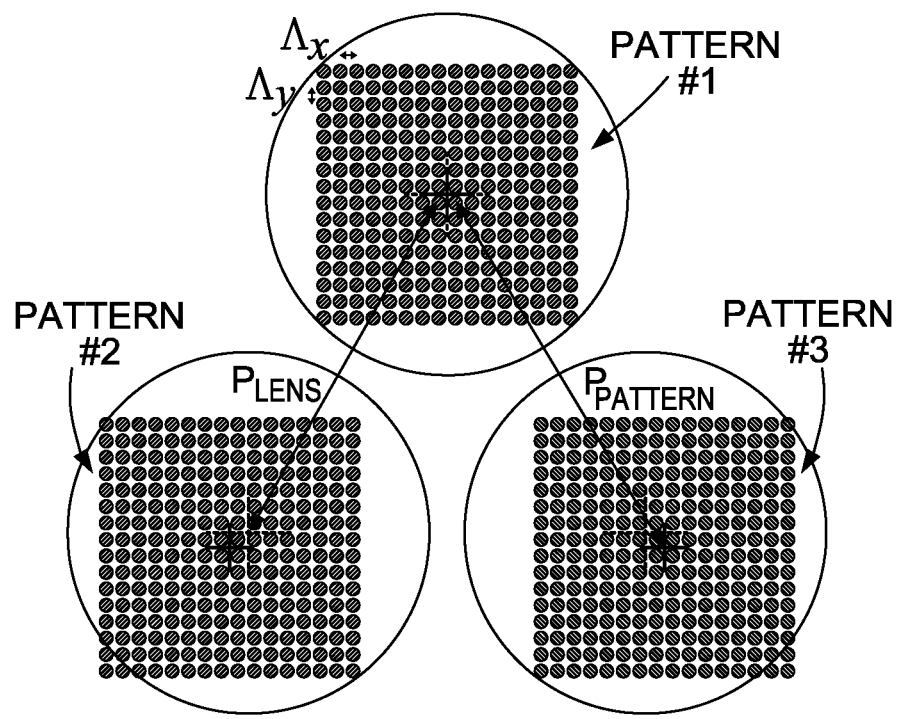
FIG. 16b illustrates schematically a pattern of laser modification spots formed in a transparent substrate following multiple laser pulse exposures of the arrangement in FIG. 16a applied while scanning both x- and y-axes of a mirror galvanometer system to sub-divide the SLM pattern on periodicity $P_{spots}$ (FIG. 16a) into finer periodic structure with periodicity of $\Lambda_x$ and $\Lambda_y$ in the x and y directions, respectively.

FIG. 16b illustrates schematically the final pattern scanned with the combination of galvanometer and the Matrix array generated by SLM in FIG. 11, provide fine periods of $\Lambda_x=1.25$ µm and $\Lambda_y=1.25$ µm in the x and y directions, respectively. The parallel writing was applied with a period $P_{spot}$ of 10 µm and with pulse energy per spot divided to 7.7 nJ to produce high contrast filament gratings and avoid thermal damage due to high-speed galvanometer scanning with laser repetition of 1 kHz. The diffractive patterns for sink and float were fabricated over a 10 mm by 12 mm area.

FIGS. 16c and 16d are optical microscope images of a portion of the respective sink and float substrates. The areas enclosed by the dotted rectangles in were enlarged in FIGS. 16e and 16f, respectively. The microscope images in FIGS. 16c, 16d, 16e, and 16f demonstrate the precise positioning of laser fabrication spots forming in parallel on sub-micron scale from the optical fabrication system of FIG. 11 combining a beam scanning mirror galvanometer with a reflective diffractive optical element (i.e., SLM) that work in concert to increase the production speed. This way, an example of the conceptual beam delivery system schematically shown in FIG. 9 was implemented. Moreover, the SLM enabled the simultaneous manufacturing of laser-modified patterns for three intended microlenses, expanding on the embodiment described in FIG. 10 which showed parallel processing through two microlenses.

The microscope images in FIGS. 16e and 16f show minimal charring of the BOPP at the focal volume of the laser. The microscope images confirm that the selected spot-to-spot spacing of $P_{spot}=10$ µm as provided by the SLM and the further infilling by the galvanometer scanning to $\Lambda_x=\Lambda_y=1.25$ periodicity enabled a moderate processing rate of 1 kHz repetition rate for the fabrication of diffractive patterns #1, #2, and #3 in FIG. 16b over large area hexagonal structure with periodicities of $P_{pattern}=52.92$ µm and $P_{pattern}=55.08$ µm for sink and float, respectively. Therefore, the beam delivery example shown in FIG. 11, of combining a DOE and scanning mirror as schematically shown in FIG. 9, enabled high-speed production of laser modification patterns without accumulating deleterious thermal effects, pyrolysis, and charring in a zone of collateral damage outside of each laser filament.

The combination of FIGS. 16g, 16h, 16i, 16j, 16k, 16l, 16m, and 16n demonstrate the moiré optical effects observed when the microlens array was overlaid on the laser fabricated device. The samples were illuminated with a non-collimated halogen fibre-bundle light source following the diffractive transmission arrangement of FIG. 7 (bottom, beam 73 to 75).

FIGS. 16g and 16h show camera-captured images in lower resolution resembling what could be observed with the human eye with no optical aid. FIGS. 16g and 16h show float and sink effects, respectively. Moreover, the samples in FIGS. 16g and 16f were inspected by eye over various observation $\theta_o$ and $\phi_o$ angles, where different patterns were seen, demonstrating a depth effect and a movement of the pattern with moving angle.

The images in FIGS. 16i, 16k, and 16m were captured at higher magnification with observation angles of $\theta_o=10$ degrees, and $\phi_o=0$ degree to demonstrate the float effect. The images in FIGS. 16j, 16l, and 16n were recorded similarly for the sink substrate device, but captured with angles $\theta_o=25$ degrees and $\phi_o=0$ degree.

In assessing the float images, FIG. 16i shows a moiré magnified square pattern recorded with the zoom lens imaged at position z=~+3.5 mm (see FIGS. 1-6), located in front of the microlens plane (z=0), where a float pattern was expected to form. The Moiré image plane position with respect to the focal plane of the lens (z=0), S', could be approximately calculated by $S'=f \times P_{lens}/\delta$, where f is the focal length of microlens, and delta is the periodicity misalignment $\delta=P_{pattern}-P_{lens}$. The FIG. 16i image at z=~+3.5 mm matches with the moiré image plane equation above and appears sharp and in focus due to an expected moiré float effect for $P_{pattern}/P_{lens}=1.02$. A blurry and out-of-focus image of the square-shaped diffractive patterns was observed at z=~−3.5 mm (FIG. 16m). When imaging at the focal plane of the microlens (z=0), the camera captured a nearly focused outline of the lens arrays, but again without a good contrast on the diffractive square pattern.

A similar sequence of images appears reversed for the moiré float device, where sharp imaging of the diffractive squares was observed (FIG. 16n) at the z=~−3.5 mm imaging plane, matching again with the moiré image plane equation for the case of $P_{pattern}/P_{lens}=0.98$. Blurry and out-of-focus images of diffraction squares was otherwise observed for the float sample at the z=~+3.5 mm (FIG. 16j) and z=~0 mm (FIG. 16l) imaging planes.

The Moiré optical effects could be observed in both transmission and reflection. As an example, FIGS. 17a and 17b show camera-captured images of the sink sample (FIG. 16) in reflection and transmission, respectively. Here, the moiré magnification and other optical effects are also observed in reflection mode.

Another float sample was fabricated with square diffractive patterns in BOPP with a pulse energy per spot of 5.8 nJ, and with periodicities of $P_{Pattern}=100$ µm, and $\Lambda_x=\Lambda_y=1.25$ µm overlaid with a microlens sheet of periodicity $P_{lens}=98$ µm. The sample was illuminated with a collimated halogen fibre-bundle light source at various $\theta_i$ angles and at a fixed $\phi_i=0°$ angle (FIG. 7). The observation angle was $\theta_o=26°$ and $\phi_o=0°$. The moiré optical effects, including colour filtering, magnification, float, and depth, were observed in the images in FIGS. 18a, 18b, 18c, 18d, and 18f. The irradiation angles of (a) $\theta_i=0°$, (b) $\theta_i=~15°$, (c) $\theta_i=~20°$, (d) $\theta_i=~26°$, (e) $\theta_i=~30°$, and (f) $\theta_i=~35°$ were applied.

In FIGS. 18a, 18b, 18c, 18d, 18e, and 18f moiré float effects similar to FIGS. 16g, 16i, 16k, and 16m were observed but with a different magnification.

At $\theta_i=0°$, a white background with dark magnified squares was observed. At $\theta_i=15°$, a black background with white squares was observed. By increasing the irradiation angle to 20°, 26°, 30°, and 35°, the background colour changed to green, yellow, orange-red, and deep red, respectively. This points to a colour filtering effect induced by the combination of microlens array and the grating effect of the laser-fabricated patterns. Possibly the sample shows a waveguiding effect for the diffracted light inside the BOPP for different irradiation angles.

Example 7: Laser Fabrication of Filament Grating Patterns at Various Depths Relative to the Microlens Array Focal Plane Moiré sink and float effects were observed as demonstrated in FIG. 16, and moiré colouring effects as was shown in FIG. 18. These aforementioned moiré effects could be observed both with the light being transmitted or reflected as shown in FIG. 17. To further these optical effects, the BOPP sample fabricated in FIG. 16d and FIG. 16f with the SLM and galvanometer combination setup, shown in FIG. 11, at a pulse energy per spot of 7.7 nJ, and periodicities of $P_{pattern}=52.92$ μm, and $\Lambda_x=\Lambda_y=1.25$ μm, was placed under a microlens array of with periodicity of $P_{lens}=54$ μm and a focal length of 75 μm, and aligned with various microlens array sheet thicknesses. The different microlens array sheet thicknesses provided the means to observe the optical effects due to the placement of the filament gratings/arrays of laser modified tracks/patterns at various locations relative to the focal plane of the microlens array defined as z=0 μm in FIGS. 1 through 6. With the centre of the square arrays of laser modified tracks placed at the focal plane of the microlens array (z=0 μm), all the moiré optical effects including magnification, sink, motion, depth, and colouring effects were observed with sharp edged and in-focus square images as expected. With the centre of the square arrays of laser modified tracks placed at z=+25 μm (i.e. the patterns are embedded in the BOPP substrate and above the microlens focal plane as described in case 1 in FIG. 1) in FIG. 19a and at z=-75 μm (i.e. the patterns are embedded in the BOPP substrate and below the microlens focal plane as described in case 3 in FIG. 1) in FIG. 19c, the moiré effects as observed in FIG. 19b with z=0 μm are still present except the edges of the magnified square patterns were blurred. The observation of these moiré optical effects with the square arrays of laser modified tracks positioned away from the microlens focal plane demonstrates the robustness of these moiré optical effects.

Example 8: Employing High-Speed Laser Fabrication Techniques to Pattern Transparent Material with Different Diffraction Grating Periods to Demonstrate Various Moiré Optical Effects Similar to Example 6, the arrangement schematically shown in FIG. 11 was employed to fabricate the laser modification patterns in BOPP hosting zones with two different periods ($\Lambda_{x1}=\Lambda_{y1}=1.25$ μm and $\Lambda_{x2}=\Lambda_{y2}=625$ nm) in each microlens field, to observe moiré optical effects. The parameters of $P_{spots}=10$ μm and $P_{pattern}=0.98\times P_{lens}=54$ μm (sink sample) were applied. A matrix of 15 spots, as schematically shown in FIG. 20a, was generated by the SLM beam splitting to appear in the focal plane of the fabrication lens inside the substrate. The SLM generated three arrays of 5 spots, with a spot-to-spot separation of $P_{spot}$, to simultaneously fabricate three similar modification patterns with a pitch of $P_{pattern}$. Similar to FIG. 16a, each multi-spot pattern was intended to be under a microlens, as schematically shown with circles in FIG. 20a.

Pulse energies per spot of 12 nJ and 7 nJ were applied to pattern the sample with $\Lambda_{x1}=\Lambda_{y1}=1.25$ μm (left) and $\Lambda_{x2}=\Lambda_{y2}=625$ nm (right), respectively, in FIG. 20a. The galvanometer was employed to scan the array generated by SLM (FIG. 20a) an infill a finer periodic mesh of $\Lambda_{x1}$ and $\Lambda_{y1}$ for Patterns #1, #2, and #3, and $\Lambda_{x2}$ and $\Lambda_{y2}$ for Patterns #4, #5, and #6 to pattern the device as schematically illustrated in FIG. 20b. Similar to example 6, the beam delivery arrangement (schematically shown in FIG. 11) was used to exploit the concept of combining DOE and scanning mirror (schematically shown in FIG. 9) to enable the high-speed production of laser patterns with minimal thermal charring effect.

A diffractive device of 5 mm by 6 mm area containing laser-fabricated patterns, schematically illustrated in FIG. 20b (bottom), was manufactured. FIGS. 16c and 16d are optical microscope images of a portion of the samples. The areas indicated with dotted rectangles in FIG. 20c were enlarged in FIG. 20d. Similar to Example 6 (FIGS. 16c and 16d), the microscope image in FIGS. 20c and 20d demonstrates a successful application of the beam delivery and steering system shown in FIG. 11 for precise positioning of laser fabrication spots and patterns, while also enabling high-speed laser parallel fabrication.

FIGS. 20e, 20f, 20g, and 20h show the moiré optical effects observed when the microlens array overlaid the fabricated two-periods sample (shown in FIGS. 20c and 20d). The samples were illuminated with a non-collimated halogen fibre-bundle light source.

FIG. 20e shows camera-captured images resembling what could be observed with the human eye with no aid. The moiré sink, magnification (~50 times), and depth effects were captured by the camera image. The sample was inspected by eye at various observation angles, depicting the depth effect and movement of the pattern effects with angle. Moreover, red (left, $\Lambda_{x1}=\Lambda_{y1}=1.25$ μm) and blue (right, $\Lambda_{x2}=\Lambda_{y2}=625$ nm) colours in the moiré magnified pattern produced by the grating structure beneath the microlens array are shown in the image. The coloured patterns were generated by the diffracted light from the grating pattern structures when transmitted through the substrate and microlens array, as schematically illustrated in FIG. 7.

To further characterize the moiré optical effects, a zoom imaging system with a camera (schematically illustrated in FIG. 7) was employed in transmission. FIGS. 20f, 20g, and 20h show camera-captured images through zoom imaging optics at the illumination angle of $\theta_i=0°$ and the observation angle of $\theta_o=30°$ with respect to the normal of the sample. The image was captured with $\phi_i=\phi_o=0°$.

The image in FIG. 20f shows a blurry and out-of-focus moiré magnified square diffraction pattern forming when imaging to the z=~+3.5 mm plane (see FIGS. 1-6) in front of the microlens plane (z=0; FIG. 20g). In contrast, imaging at the z=~-3.5 mm plane, a sharp image of the squares was formed (FIG. 20h), confirming the moiré sink effect for the geometric pattern in FIG. 20c, as expected from the moiré image plane equation stated above in Example 6.

The periods of the diffractive grating structures could be tailored to provide various colours at various observation and illumination angles. Here, an example of generating colours at two far ends of the visible spectrum was presented at the stated characterization angles and grating periods. Sharp squares as small as 10 μm by 10 μm were observed in the moiré sink image in FIG. 20h, which opens up colourful and high-resolution moiré imaging capabilities enabled by laser fabricated grating patterns in combination with a microlens array.

Example 9: Laser Fabrication of Filament Grating Patterns Sandwiched Between Two Microlens Arrays Moiré float optical effects were observed in FIGS. 16g and 16i for the laser fabricated filament grating square patterns formed in BOPP, as shown magnified in FIG. 16c and FIG. 16e, using the SLM and galvanometer combination setup, as shown in FIG. 11, at a pulse energy per spot of 7.7 nJ, and periodicities of $P_{pattern}=55.08$ μm, and $\Lambda_x=\Lambda_y=1.25$ μm, when placed under a single sheet of microlens array of periodicity of $P_{lens}=54$ μm with a focal length of 75 μm.

With an additional sheet of microlens array placed at the opposing second surface of the laser patterned BOPP sample, further optical effects were observed. With the two microlens array sheets significantly misaligned with respect to each other, moiré effects (such as magnification) from both the laser fabricated pattern in BOPP and the two misaligned microlens array sheets could be observed simultaneously in the camera-captured images shown in FIGS. 21a and 21b. The image shown in FIG. 21a was captured with the camera focused on the moiré pattern generated by the laser patterned BOPP and the microlens arrays, showing the magnified square patterns at the centre of the image. The blurry white spots in the entire image are the moiré magnified microlens pattern generated by the two misaligned microlens array sheets. In FIG. 21b, the camera was focused on the moiré pattern generated by the two misaligned microlens array sheets, showing clear and sharp white dots (moiré magnified microlens patterns) with blurry moiré magnified square patterns from the laser patterned BOPP and the microlens array sheets. By misaligning the two microlens array sheets only slightly, a large moiré magnified microlens pattern was observed as shown in the camera-captured image in FIG. 21c as expected. As the two microlens array sheets approach a perfect overlay alignment, only the moiré effects generated by the laser patterned BOPP and the microlens sheets could be observed as shown in the camera-captured image in FIG. 21d, which is similar to the moiré effects observed in FIG. 16c with only a single microlens array sheet placed on the laser patterned BOPP substrate.

Example 10: Two Stacked Filament Grating Square Patterned Layers Under One Microlens Array Moiré sink and float effects were observed as demonstrated in FIG. 16 with filament grating square patterns, with pitches of $P_{pattern}$=52.92 µm (labelled as Pattern 1 in FIG. 22) and $P_{pattern}$=55.08 µm (labelled as Pattern 2 in FIG. 22), respectively, laser fabricated in BOPP with the SLM and galvanometer combination setup, shown in FIG. 11, at a pulse energy per spot of 7.7 nJ and fine pitch periodicity of $\Lambda_x=\Lambda_y$=1.25 µm, when placed under microlens array of periodicity $P_{lens}$=54 µm and a focal length of 75 µm.

In the absence of a microlens array, the stacking of the Pattern 1 layer on top of the Pattern 2 layer, with these two patterns having a slightly different pitch overlapping at the centre of the camera-captured image as shown in FIG. 22a, further induces moiré optical effects showing magnified dark square patterns within the expected diffracted colours due to the small period of the filament array. FIGS. 22b and 22c show the camera-captured images of the overlapping BOPP samples, described in FIG. 22a, overlaying with a sheet of microlens of periodicity $P_{lens}$=54 µm. FIG. 22b was captured with the camera imaging focused at the plane of moiré effects generated by the moiré sink layer (Pattern 1) with the $P_{pattern}$=52.92 µm. The moiré magnified sink square patterns from Pattern 1 on the right can be observed to continue into the overlapping region at the centre of the image in FIG. 22b.

FIG. 22c was captured with the camera imaging focused on the moiré effects generated by the moiré float layer (Pattern 2) with the periodicity $P_{pattern}$=55.08 µm. The moiré magnified float square patterns from Pattern 2 on the left can be observed to continue into the overlapping region at the centre of the image in FIG. 22c. The demonstrations in FIGS. 22b and 22c seen in the center overlapping region of Pattern 1 and Pattern 2, together with the microlens array, show that both the moiré sink and float effects can be induced simultaneously.

Example 11: Metalized Surface Reflective Layer on Laser Fabricated Filament Grating Patterns Previous examples demonstrate various moiré effects including moiré sink, moiré float, and moiré colouring effects with laser fabricated filament grating patterns in various transparent materials, including PET and BOPP, with the appropriate microlens array. The optical effects were generated with the incident light either transmitting through once or reflecting from the patterns in the grating samples. To further induce new optical effects from the filament grating patterns, a portion of the BOPP sample with 50-µm square patterns shown in FIG. 18, that was fabricated with the SLM and galvanometer combination setup, shown in FIG. 11, at a pulse energy per spot of 5.8 nJ, $P_{pattern}$=100 µm, and $\Lambda_x=\Lambda_y$=1.25 µm, was coated with a ~100-nm layer of gold as shown in the camera-captured image in FIG. 23a. This reflective gold layer could provide more optical pathways, as shown in FIG. 7, to induce new optical effects. With the gold coating layer at the back surface facing away from the illuminating halogen fiber bundle light source, the camera-captured image in FIG. 23a shows a green light reflected from the filament grating patterns (array of laser modified tracks in square patterns) from the uncoated region and a bright white light saturating the camera at the gold coated region due to the highly reflective metalized layer. The reflected light from the grating pattern is dominated by the reflected light from the gold coating. Overlaying a microlens array sheet with a $P_{lens}$=98 µm, moiré magnification and float effects could be observed both with the illumination source transmitting through and reflecting by the filament grating patterns (arrays of laser modified tracks in square patterns) in the gold coated and uncoated regions as shown in the camera captured images in FIG. 23a and FIG. 23b, respectively. The moiré magnified square patterns appear in white colour in both the gold coated and uncoated regions in FIG. 23b, with the brightness of the white squares lower in the gold coated region. Since the thin gold layer only allows a partially transmission of light, the moiré patterns were less bright in the gold coated region. The moiré magnified square patterns appear as dark squares in both the gold coated and uncoated regions in FIG. 23b, with the dark squares brighter in the gold coated region. Since the reflective gold layer reflects light that is transmitted through the grating pattern and passes through the grating twice, the moiré patterns were brighter in the gold coated region.

It is understood that the optical devices and features, and methods for their production and use, and related technology employed in the illustrative embodiments may be modified in a variety of ways which will become readily apparent to those skilled in the art of having the benefit of the teachings disclosed herein. All such modifications and variations of the illustrative embodiments thereof shall be deemed to be within the scope and spirit of the present invention as defined, or defined in part, by the claims appended hereto.

REFERENCES

1. R. R. Gattass and E. Mazur, "Femtosecond laser micromachining in transparent materials," Nature photonics 2, 219-225 (2008).

2. Y. Shimotsuma, P. G. Kazansky, J. Qiu, and K. Hirao, "Self-organized nanogratings in glass irradiated by ultrashort light pulses," Physical Review Letters 91, 247405 (2003).
3. R. S. Taylor, C. Hnatovsky, E. Simova, D. M. Rayner, V. R. Bhardwaj, and P. B. Corkum, "Femtosecond laser fabrication of nanostructures in silica glass," Optics Letters 28, 1043-1045 (2003).
4. R. Taylor, C. Hnatovsky, and E. Simova, "Applications of femtosecond laser induced self-organized planar nanocracks inside fused silica glass," Laser and Photonics Reviews 2, 26-46 (2008).
5. K. Kumar, K. K. Lee, J. Li, J. Nogami, N. P. Kherani, and P. R. Herman, "Quantized structuring of transparent films with femtosecond laser interference," Light: Science and Applications 3, e157 (2014).
6. A. Couairon and A. Mysyrowicz, "Femtosecond filamentation in transparent media," Physics Reports 441, 47-189 (2007).
7. M. K. Bhuyan, F. Courvoisier, P. A. Lacourt, M. Jacquot, R. Salut, L. Furfaro, and J. M. Dudley, "High aspect ratio nanochannel machining using single shot femtosecond Bessel beams," Applied Physics Letters 97, 081102 (2010).
8. M. J. Booth, M. A. A. Neil, and T. Wilson, "Aberration correction for confocal imaging in refractive-index-mismatched media," Journal of Microscopy 192, 90-98 (1998).
9. C. Hnatovsky, R. S. Taylor, E. Simova, V. R. Bhardwaj, D. M. Rayner, and P. B. Corkum, "High-resolution study of photoinduced modification in fused silica produced by a tightly focused femtosecond laser beam in the presence of aberrations," Journal of Applied Physics 98, 013517 (2005).
10. M. J. Booth, "Adaptive optical microscopy: The ongoing quest for a perfect image," Light: Science and Applications 3, e165-e165 (2014).
11. Y. C. Chen, P. S. Salter, S. Knauer, L. Weng, A. C. Frangeskou, C. J. Stephen, S. N. Ishmael, P. R. Dolan, S. Johnson, B. L. Green, G. W. Morley, M. E. Newton, J. G. Rarity, M. J. Booth, and J. M. Smith, "Laser writing of coherent colour centres in diamond," Nature Photonics 11, 77-80 (2017).
12. L. Huang, P. S. Salter, F. Payne, and M. J. Booth, "Aberration correction for direct laser written waveguides in a transverse geometry," Optics Express 24, 10565-10574 (2016).
13. B. P. Cumming, M. D. Turner, G. E. Schroder-Turk, S. Debbarma, B. Luther-Davies, and M. Gu, "Adaptive optics enhanced direct laser writing of high refractive index gyroid photonic crystals in chalcogenide glass," Optics Express 22, 689-698 (2014).
14. D. Rayner, A. Naumov, and P. Corkum, "Ultrashort pulse non-linear optical absorption in transparent media.," Optics express 13, 3208-3217 (2005).
15. J. Li, E. Ertorer, and P. R. Herman, "Ultrafast laser burst-train filamentation for non-contact scribing of optical glasses," Optics Express 27, 25078 (2019).
16. R. Osellame, S. Taccheo, M. Marangoni, R. Ramponi, P. Laporta, D. Polli, S. De Silvestri, and G. Cerullo, "Femtosecond writing of active optical waveguides with astigmatically shaped beams," Journal of the Optical Society of America B 20, 1559-1567 (2003).
17. M. Ams, G. Marshall, D. Spence, and M. Withford, "Slit beam shaping method for femtosecond laser direct-write fabrication of symmetric waveguides in bulk glasses.," Optics Express 13, 5676-5681 (2005).
18. P. S. Salter, A. Jesacher, J. B. Spring, B. J. Metcalf, N. Thomas-Peter, R. D. Simmonds, N. K. Langford, I. A. Walmsley, and M. J. Booth, "Adaptive slit beam shaping for direct laser written waveguides," Optics Letters 37, 470-472 (2012).
19. A. Mathis, F. Courvoisier, L. Froehly, L. Furfaro, M. Jacquot, P. A. Lacourt, and J. M. Dudley, "Micromachining along a curve: Femtosecond laser micromachining of curved profiles in diamond and silicon using accelerating beams," Applied Physics Letters 101, 71110 (2012).
20. R. Kammel, R. Ackermann, J. Thomas, J. Gotte, S. Skupin, A. Tunnermann, and S. Nolte, "Enhancing precision in fs-laser material processing by simultaneous spatial and temporal focusing," Light: Science and Applications 3, e169-e169 (2014).
21. D. N. Vitek, E. Block, Y. Bellouard, D. E. Adams, S. Backus, D. Kleinfeld, C. G. Durfee, and J. a Squier, "Spatio-temporally focused femtosecond laser pulses for nonreciprocal writing in optically transparent materials.," Optics express 18, 24673-24678 (2010).
22. P. S. Salter and M. J. Booth, "Dynamic control of directional asymmetry observed in ultrafast laser direct writing," Applied Physics Letters 101, 141109 (2012).
23. A. Patel, Y. Svirko, C. Durfee, and P. G. Kazansky, "Direct Writing with Tilted-Front Femtosecond Pulses," Scientific Reports 7, 1-14 (2017).
24. H. Ren, H. Lin, X. Li, and M. Gu, "Three-dimensional parallel recording with a Debye diffraction-limited and aberration-free volumetric multifocal array," Optics Letters 39, 1621-1624 (2014).
25. B. Xu, W.-Q. Du, J.-W. Li, Y.-L. Hu, L. Yang, C.-C. Zhang, G.-Q. Li, Z.-X. Lao, J.-C. Ni, J.-R. Chu, D. Wu, S.-L. Liu, and K. Sugioka, "High efficiency integration of three-dimensional functional microdevices inside a microfluidic chip by using femtosecond laser multifoci parallel microfabrication," Scientific Reports 6, 19989 (2016).
26. O. Ripoll, V. Kettunen, and H. P. Herzig, "Review of iterative Fourier-transform algorithms for beam shaping applications," Optical Engineering 43, 2549-2556 (2004).
27. R. W. Gerchberg, "A practical algorithm for the determination of phase from image and diffraction plane pictures," Optik 35, 237-246 (1972).
28. D. Wang, "Adaptive-weight iterative algorithm for flat-top laser beam shaping,"
Optical Engineering 51, 074301 (2012).
29. R. Di Leonardo, F. Ianni, and G. Ruocco, "Computer generation of optimal holograms for optical trap arrays," Optics Express 15, 1913-1922 (2007).
30. H. Aagedal, M. Schmid, S. Egner, J. Müller-Quade, T. Beth, and F. Wyrowski, "Analytical beam shaping with application to laser-diode arrays," Journal of the Optical Society of America A 14, 1549-1553 (1997).
31. P. Zhou, Y. Li, S. Liu, and Y. Su, "Dynamic compensatory Gerchberg-Saxton algorithm for multiple-plane reconstruction in holographic displays," Optics Express 27, 8958-8967 (2019).
32. T. Haist, M. Schönleber, and H. J. Tiziani, "Computer-generated holograms from 3D-objects written on twisted-nematic liquid crystal displays," Optics Communications 140, 299-308 (1997).
33. P. Zhou, Y. Bi, M. Sun, H. Wang, F. Li, and Y. Qi, "Image quality enhancement and computation acceleration of 3D holographic display using a symmetrical 3D GS algorithm," Applied Optics 53, G209-G213 (2014).

The invention claimed is:

1. An optical device comprising:
   a periodic array of microlenses; and
   a periodic array of distinct laser-fabricated patterns, wherein the patterns are the same or different from one another, and each pattern comprises a periodic array of continuous or non-continuous laser-modified tracks in a polymer substrate material;
   wherein the substrate material has a general refractive index n, and each laser-modified track comprises a continuous or discontinuous elongate volume of modified polymer material at least 4 times longer than its narrowest width extending at least partially within and across a thickness of the substrate material, that comprises a modified form of the substrate material, that has a refractive index that is different to the general refractive index n of the substrate material from which each laser-modified track originated from;
   wherein the patterns, together with the microlenses, collectively provide an optical effect.

2. The optical device of claim 1, wherein the array of microlenses and the array of patterns overlie one another such that the position of the microlenses relative to the patterns contributes to the optical effect.

3. The optical device of claim 1, where the optical effect comprises one or more of:
   a moiré effect;
   a float effect;
   a sink effect;
   a depth effect;
   a motion effect;
   a colour change effect; and
   an emission angle effect;
   of the laser-fabricated patterns.

4. The optical device of claim 1, wherein the device comprises a polymer sheet, and the microlenses are individually selected from:
   refractive microlenses, each comprising a polymer or cross-polymerized UV resin protrusion extending from the substrate on one side thereof, or applied to one side thereof; or
   diffractive microlenses fabricated from the polymer substrate material,
   wherein the microlenses collectively focus light incident upon said one side into a focal plane between a surface of the lens and a surface of the substrate material opposite the microlenses.

5. The optical device of claim 1, wherein the device comprises a polymer sheet, and the microlenses comprise diffractive microlenses formed within a polymer material of the polymer sheet.

6. The optical device of claim 1, wherein independently each laser- fabricated pattern comprises laser-modified tracks within the polymer material that, relative to the array of microlenses, extend in one or more of the following ways:
   across, crossing or spanning the focal plane of the microlenses;
   between the focal plane and the microlenses;
   within the microlenses, optionally extending to a surface thereof; or on a side of the focal plane opposite the microlenses, optionally extending to a surface of the device opposite the microlenses.

7. The optical device of claim 1, wherein at least one laser-fabricated pattern comprises multiple laser-fabricated sub-patterns each with distinct diffractive properties relative to one another.

8. The optical device of claim 7, wherein independently each laser- fabricated sub-pattern comprises laser-modified tracks within the polymer material that, relative to the array of microlenses, extend in one or more of the following ways:
   across, crossing or spanning the focal plane of the microlenses;
   between the focal plane and the microlenses;
   within the microlenses, optionally extending to a surface thereof; or
   on a side of the focal plane opposite the microlenses, optionally extending to a surface of the device opposite the microlenses.

9. The optical device of claim 1, wherein each laser-fabricated pattern comprises at least one ordered two-dimensional array of discrete laser-modified tracks in the substrate material generated by a beam-shaped laser with laser light distributed along and/or about a laser propagation path extending within the substrate material,
   wherein for each two-dimensional ordered array, the laser-modified tracks collectively diffract light impinging on the optical device;
   and wherein optionally the modified substrate material comprises displaced polymer chains to create periodic voids, such that selected laser-modified tracks each comprise one or more voids extending generally non-parallel to the surfaces of the substrate material, thereby to cause each of said laser-modified tracks to have a different refractive index relative to the general refractive index n for the unmodified substrate material.

10. The optical device of claim 9, wherein for each laser-modified track, the elongate volume of modified substrate material is at least 5 times longer than its narrowest width, and optionally the laser propagation path within the substrate sheet is linear, curved, or helical.

11. The optical device of claim 9, wherein each elongate volume of modified substrate material of each laser-modified track is from 1-5000 nm in width on average, extending partially or entirely through the polymer material.

12. The optical device of claim 1, wherein each of the laser-modified tracks are generated by a femtolaser with a pulse duration in the range of 0.1 fs to 100 ps for each laser pulse, with beam-shaping of the femtolaser beam prior to or upon its interaction with the substrate.

13. The optical device of claim 1, having an average thickness of 10-3000 μm.

14. The optical device of claim 1, wherein the polymer material comprises polycarbonate, BOPP, BOPET, PEN, PP, PVDF, PVDF-TrFE, Nylon-55 or Nylon-66 or copolymers or derivatives thereof.

15. The optical device of claim 1, comprising at least one array of laser-modified tracks that are separated from one another by a periodicity of from 0.01 to 1000 μm on average by the material of the unmodified polymer.

16. The optical device of claim 1, wherein the laser-fabricated patterns, or if present the laser-fabricated sub-patterns, comprise arrays of laser-modified tracks in the polymer material that have different periodicities, lengths, shapes or orientations compared to the laser-modified tracks of at least one other laser-fabricated pattern or sub-pattern, such that the optical diffractive emissions from different laser-fabricated patterns or sub-patterns differ from one another, when the same or equivalent incident light concurrently impinges thereupon.

17. The optical device of claim 1, wherein at least one array of laser-modified tracks comprises laser-modified tracks that are one or more of:

continuous within the substrate material;
discontinuous within the substrate material;
parallel or non-parallel to one another;
extend perpendicular to the array of microlenses or to a focal plane thereof;
extend non-perpendicular or oblique to the array of microlenses or to a focal plane thereof; or
linear, non-linear or helical.

18. The optical device of claim 1, comprising laser-fabricated patterns at different depths relative to one another and the array of microlenses.

19. The optical device of claim 18, wherein a first array of laser-fabricated patterns at least partially overlies a second array of laser-fabricated patterns in the optical device relative to the array of microlenses, when the optical device is viewed in plan view thereof.

20. The optical device of claim 19, wherein the optical diffractive output of one of the first and second arrays is further diffracted by the other of the first and second arrays, when the substrate material is exposed to incident light.

21. The optical device of claim 19, wherein the optical diffractive output of the first and second arrays, when viewed concurrently, exhibits an interference or diffractive optical effect.

22. A security document comprising or consisting of, as a security feature, the optical device of claim 1.

* * * * *